United States Patent
Kashiwagi et al.

(10) Patent No.: US 10,641,448 B2
(45) Date of Patent: May 5, 2020

(54) DAYLIGHTING SHEET, DAYLIGHTING PANEL AND ROLL-UP DAYLIGHTING SCREEN

(71) Applicant: DAI NIPPON PRINTING CO., LTD., Tokyo-to (JP)

(72) Inventors: Tsuyoshi Kashiwagi, Tokyo-to (JP); Kazunobu Ogawa, Tokyo-to (JP); Hideki Miyata, Tokyo-to (JP); Tatsuaki Inoue, Tokyo-to (JP); Hiroshi Kojima, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 0 days.

(21) Appl. No.: 16/126,356

(22) Filed: Sep. 10, 2018

(65) Prior Publication Data

US 2019/0093840 A1    Mar. 28, 2019

Related U.S. Application Data

(63) Continuation-in-part of application No. 15/624,010, filed on Jun. 15, 2017, now Pat. No. 10,100,992,
(Continued)

(51) Int. Cl.
*F21S 11/00* (2006.01)
*G02B 5/02* (2006.01)
(Continued)

(52) U.S. Cl.
CPC .......... *F21S 11/007* (2013.01); *B29C 43/021* (2013.01); *B29C 43/28* (2013.01); *B29C 43/30* (2013.01);
(Continued)

(58) Field of Classification Search
CPC ..... G02B 5/04; G02B 19/0042; F21S 11/002; F21S 11/007; E06B 9/24
See application file for complete search history.

(56) References Cited

U.S. PATENT DOCUMENTS

| | | | |
|---|---|---|---|
| 5,461,496 A | 10/1995 | Kaneda et al. | |
| 5,880,886 A | 3/1999 | Milner | |
| (Continued) | | | |

FOREIGN PATENT DOCUMENTS

| | | |
|---|---|---|
| JP | 03-296469 A | 12/1991 |
| JP | 2000-015712 A | 1/2000 |
| (Continued) | | |

OTHER PUBLICATIONS

USPTO Office Action Summary dated Jan. 8, 2015 in connection with U.S. Appl. No. 14/122,035.
(Continued)

*Primary Examiner* — Christopher E Mahoney

(57) ABSTRACT

An object is to provide a daylighting sheet which efficiently performs daylighting and in which, when the daylighting sheet is applied to a window of a building or the like, it is possible to see an outdoor side.
The daylighting sheet includes a translucent base material layer; and a light deflection layer that is formed on the base material layer, and the light deflection layer includes: light transmission portions that are aligned along one surface of the base material layer so as to be able to transmit light, each of which including a groove at a portion being in a light entering side in a position where the light transmission portion is arranged in the opening portion of a building; and light deflection portions that are formed between the light transmission portions and filled with a material whose refractive index is lower than that of the light transmission portions.

8 Claims, 30 Drawing Sheets

Related U.S. Application Data which is a continuation of application No. 15/150,893, filed on May 10, 2016, now Pat. No. 9,708,847, which is a continuation-in-part of application No. 14/122,035, filed as application No. PCT/JP2013/058110 on Mar. 21, 2013, now Pat. No. 9,366,403.

(51) Int. Cl.

| | | |
|---|---|---|
| *E06B 9/24* | (2006.01) | |
| *B29D 11/00* | (2006.01) | |
| *E06B 9/40* | (2006.01) | |
| *B29C 43/30* | (2006.01) | |
| *B29C 43/28* | (2006.01) | |
| *B29C 43/02* | (2006.01) | |
| *E06B 9/42* | (2006.01) | |
| *G02B 5/20* | (2006.01) | |
| *F21V 33/00* | (2006.01) | |
| *G02B 5/22* | (2006.01) | |
| *B29C 43/22* | (2006.01) | |
| *B29C 43/24* | (2006.01) | |
| *B29K 101/00* | (2006.01) | |
| *B29L 31/00* | (2006.01) | |

(52) U.S. Cl.
CPC ........ *B29D 11/00* (2013.01); *B29D 11/00798* (2013.01); *E06B 9/24* (2013.01); *E06B 9/40* (2013.01); *E06B 9/42* (2013.01); *F21S 11/00* (2013.01); *F21V 33/006* (2013.01); *G02B 5/0231* (2013.01); *G02B 5/0242* (2013.01); *G02B 5/0247* (2013.01); *G02B 5/0278* (2013.01); *G02B 5/208* (2013.01); *G02B 5/223* (2013.01); *B29C 43/222* (2013.01); *B29C 43/24* (2013.01); *B29K 2101/00* (2013.01); *B29L 2031/778* (2013.01); *E06B 2009/2405* (2013.01); *E06B 2009/2417* (2013.01)

(56) References Cited

U.S. PATENT DOCUMENTS

| | | |
|---|---|---|
| 6,311,437 B1 | 11/2001 | Lorenz |
| 8,480,242 B2 | 7/2013 | Kashiwagi et al. |
| 2008/0030859 A1 | 2/2008 | Usami |
| 2008/0291541 A1 | 11/2008 | Padiyath et al. |
| 2009/0190211 A1 | 7/2009 | Kodama et al. |
| 2012/0033302 A1 | 2/2012 | Suzuki et al. |
| 2012/0327507 A1 | 12/2012 | Padiyath et al. |
| 2013/0033873 A1 | 2/2013 | Suzuki et al. |
| 2014/0104689 A1 | 4/2014 | Padiyath et al. |
| 2014/0211331 A1 | 7/2014 | Padiyath et al. |
| 2015/0226394 A1 | 8/2015 | Ueki et al. |

FOREIGN PATENT DOCUMENTS

| | | |
|---|---|---|
| JP | 2000-268610 A | 9/2000 |
| JP | 2001-090277 A | 4/2001 |
| JP | 2003-157707 A | 5/2003 |
| JP | 2006-106393 A | 4/2006 |
| JP | 2008-247623 A | 10/2008 |
| JP | 2009-058658 A | 3/2009 |
| JP | 2009-080193 A | 4/2009 |
| JP | 2009-139710 A | 6/2009 |
| JP | 2009-186879 IA | 8/2009 |
| JP | 2009-216778 A | 9/2009 |
| JP | 2009-266794 A | 11/2009 |
| JP | 2010-160502 A | 7/2010 |
| JP | 2010-259406 A | 11/2010 |
| JP | 2011-034060 A | 2/2011 |
| JP | 2011-123478 A | 6/2011 |
| JP | 2011-186370 A | 9/2011 |
| JP | 2011-227120 A | 11/2011 |
| JP | 2012-008320 A | 1/2012 |
| JP | 2012-038626 A | 2/2012 |
| JP | 2012-220739 A | 11/2012 |
| JP | 2012-255951 A | 12/2012 |
| WO | 93/25792 A1 | 12/1993 |
| WO | 97/31276 A1 | 8/1997 |
| WO | 2011/129069 A1 | 10/2011 |

OTHER PUBLICATIONS

USPTO FOA dated Oct. 5, 2015 in connection with U.S. Appl. No. 14/122,035.
USPTO NOA dated Feb. 12, 2016 in connection with U.S. Appl. No. 14/122,035.
USPTO Corrected Notice of Allowability dated Apr. 12, 2016 in connection with U.S. Appl. No. 14/122,035.
USPTO FOA dated Oct. 11, 2016 in connection with U.S. Appl. No. 15/150,893.
USPTO NOA dated Mar. 17, 2017 in connection with U.S. Appl. No. 15/150,893.
USPTO Corrected Notice of Allowability dated Jun. 6, 2017 in connection with U.S. Appl. No. 15/150,893.
USPTO NFOA dated Jan. 26, 2018 in connection with U.S. Appl. No. 15/624,010.
USPTO NOA dated Jun. 8, 2018 in connection with U.S. Appl. No. 15/624,010.
USPTO FOA dated Aug. 18, 2017 in connection with U.S. Appl. No. 15/624,010.

DAYLIGHTING SHEET, DAYLIGHTING PANEL AND ROLL-UP DAYLIGHTING SCREEN

TECHNICAL FIELD

The present invention relates to a daylighting sheet, a daylighting panel and a roll-up daylighting screen that are units for taking outside light such as sunlight into the interior of a building or the like.

BACKGROUND ART

It is well known that outside light such as sunlight is taken into the interior of a building through a so-called window glass or the like such that a comfortable indoor space is formed. By contrast, several technologies have so far been proposed in which direct sunlight is controlled such that outside light is taken in a more comfortable form.

For example, patent document 1 discloses a light control sheet that is arranged in a light taking-in portion which takes sunlight into a building and that is used for controlling the taking in of sunlight. In the light control sheet, the entire sheet is formed with a light transmission portion made of a light transmission material which transmits sunlight and a light shield portion group made of a light absorption material which absorbs sunlight, and in the light shield portion group, in one direction within the sheet, with a predetermined pitch, a plurality of a light shield portions made of the light absorption material are aligned.

According to technologies disclosed in patent documents 2 to 4, an interface that has a predetermined geometric configuration such as a prism and has a refractive index difference is utilized, and thus control is performed by deflecting and reflecting outside light such as sunlight in a desired direction.

RELATED ART DOCUMENT

Patent Document

Patent document 1: Japanese Unexamined Patent Application Publication No. 2010-259406
Patent document 2: International Publication No. WO93/25792
Patent document 3: Japanese Unexamined Patent Application Publication No. 2003-157707
Patent document 4: Japanese Unexamined Patent Application Publication No. 2000-15712

DISCLOSURE OF THE INVENTION

Problems to be Solved by the Invention

However, in the light control sheet configured as disclosed in patent document 1, since most of outside light (sunlight) is absorbed by the light shield portion group, when the light control sheet is applied to the window of a building or the like, it is difficult to efficiently take outside light into a room.

Although in the technologies disclosed in patent documents 2 to 4, it is possible to control light that enters from the outside, since an image is refracted by deflection or the like even when the outside is seen from an indoor side, sharpness for viewing outside scenery is insufficient.

In view of the foregoing problem, the present invention has an object to provide a daylighting sheet which allows efficient daylighting and with which it is possible to see an outdoor side from an indoor side when the daylighting sheet is applied to a building opening portion such as a window. A daylighting panel and a roll-up daylighting screen that use such a daylighting sheet is provided.

Means for Solving the Problem

The present invention will be described below.

One aspect of the present invention is a daylighting sheet that is arranged in an opening portion of a building and transmits light from an outdoor side to an indoor side, wherein the daylighting sheet is formed by stacking a plurality of layers, the layers include: a translucent base material layer; and a light deflection layer that is formed on the base material layer, and the light deflection layer includes: light transmission portions that are aligned along one surface of the base material layer so as to be able to transmit light, each of the light transmission portions including a groove at a portion being in a light entering side in a position where the light transmission portion is arranged in the opening portion of a building; and light deflection portions that are formed between the light transmission portions and filled with a material whose refractive index is lower than that of the light transmission portions.

In the above daylighting sheet, the light deflection portions may be filled with air.

In the above daylighting sheet, the light deflection portions may be filled with a transparent resin.

In the above daylighting sheet, at least one of other translucent layers may be arranged on a side of the light deflection layer opposite to the base material layer.

The light transmission portions may have a predetermined cross section and extend along the one surface of the base material layer, and may be aligned in a direction different from the direction in which the light transmission portions extend, and the light deflection portions may be arranged between the adjacent light transmission portions such that the light deflection portions extend in the same direction as the light transmission portions and may be aligned in the direction different from the direction in which the light transmission portions extend.

Also provided can be a daylighting panel comprising: a translucent plate-shaped panel; and the above daylighting sheet that is attached to one surface of the panel.

Also provided can be the panel that is a window glass that is provided in the opening portion of the building.

Also provided can be a roll-up daylighting screen comprising: the above daylighting sheet; and a shaft member that is arranged in the daylighting sheet such that the daylighting sheet can be wound and unwound.

Effects of the Invention

With the daylighting sheet, the daylighting panel and the roll-up daylighting screen of the present invention, it is possible to allow efficient daylighting and see an outdoor side from an indoor side when they are applied to an opening portion such as the window of a building.

BEST MODE FOR CARRYING OUT THE INVENTION

The effects and advantages of the present invention described above will become obvious from the following description of the embodiments of the invention. The present invention will be described below based on the embodiments shown in drawings. However, the present invention is not limited to the embodiments.

Figure 1:
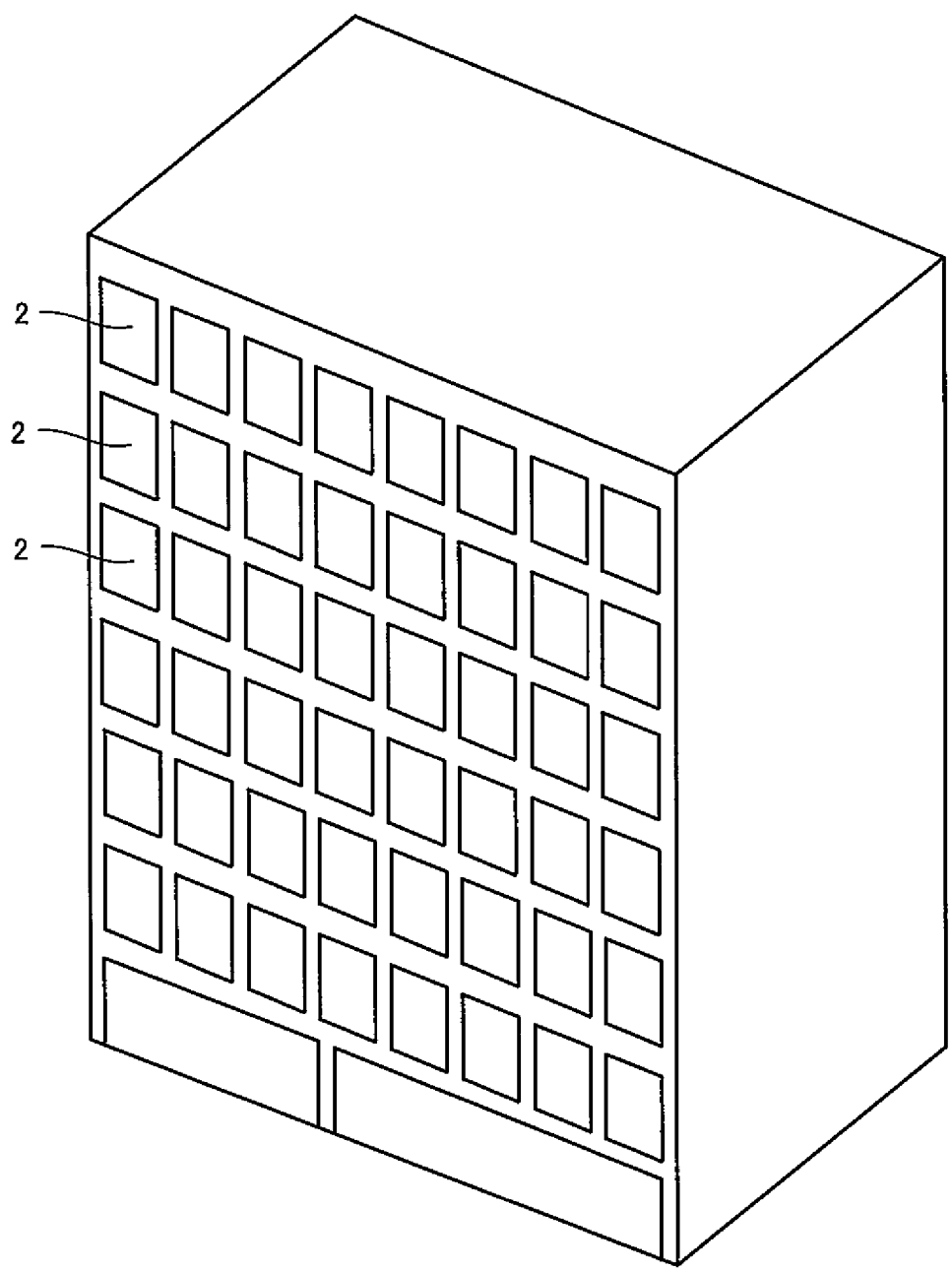
FIG. 1 A perspective view of a building 1 where windows 2 having daylighting panels 10 are arranged.
Figure 2:
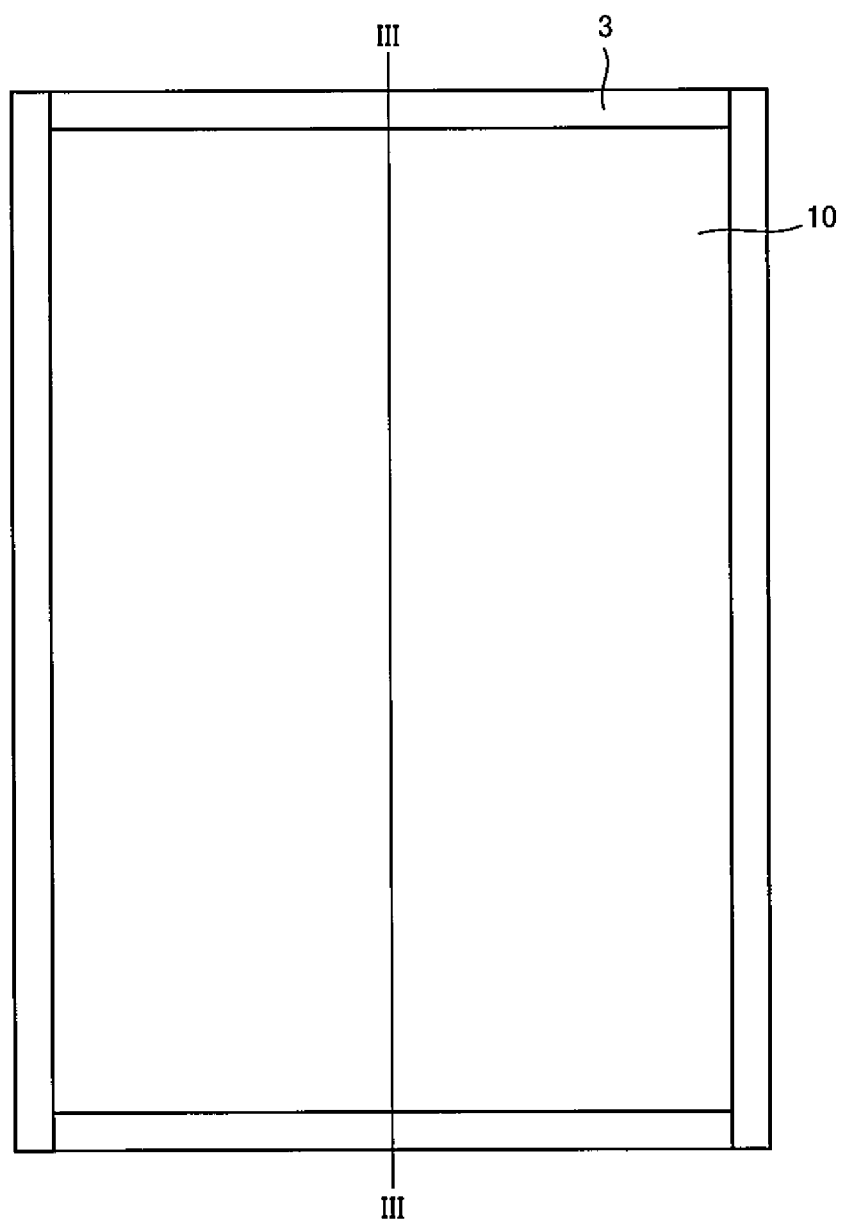
FIG. 2 A front view of the window 2 to which the daylighting panel 10 is applied.

FIG. 1 is a diagram illustrating a first embodiment, and is a perspective view of the appearance of a building 1 including windows 2 (see FIG. 2). The building 1 is a so-called office building, and in the outer wall on the south side, a plurality of opening portions communicating indoors and outdoors are provided, and here, the windows 2 including daylighting panels 10 are arranged.

In FIG. 2, the daylighting panel 10 is formed with a daylighting sheet 15 (see FIG. 3), and FIG. 2 is a diagram when the window 2 to which the daylighting panel 10 is applied is seen from the front. The window 2 is configured to include the daylighting panel 10 and at least a frame 3 that is arranged around the perimeter portion of a panel 11 (see FIG. 3) so as to frame the panel 11. The windows 2 are arranged in the opening portions of the building 1. The configuration itself in which, as described above, the window is formed by providing the frame and the panel within the frame is the same as a known configuration. Hence, a known shape can be applied to the shape of the frame 3.

Here, the window 2 can also be formed by adhering the daylighting sheet 15 to a window previously arranged in a building. In this case, since the building includes a normal panel and a frame that frames the perimeter portion thereof, the window 2 can be provided by adhering the daylighting sheet 15 to the panel.

Figure 3:
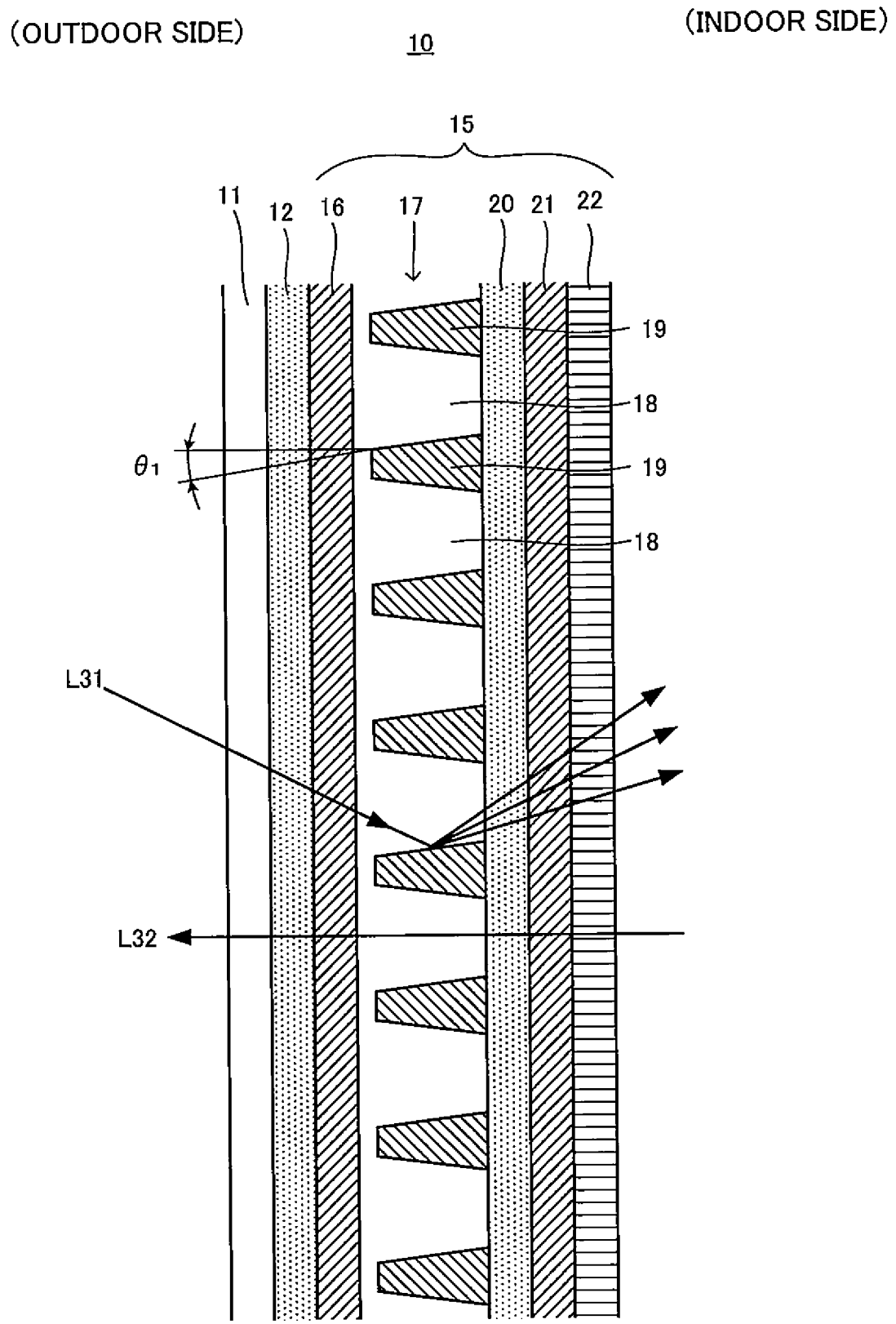
FIG. 3 A diagram showing a cross section of the daylighting panel 10 and schematically showing the configuration of its layers.

FIG. 3 is a cross-sectional view of a portion of the daylighting panel 10 among a cross-sectional view taken along line III-III of FIG. 2 in a vertical direction, and is a diagram schematically showing the configuration of its layers. In FIG. 3, for ease of illustration, some symbols will not be repeated (the same is true for drawings shown below).

The daylighting panel 10 includes the panel 11 and the daylighting sheet 15 that is adhered to the panel 11 with an adhesive layer 12. The daylighting sheet 15 includes a base material layer 16, a light deflection layer 17, an adhesive layer 20, a protective layer 21 and a hard coat layer 22. These constituent elements that constitute the daylighting panel 10 will be described below. FIG. 3 is shown in a position where the daylighting panel 10 is attached perpendicularly to the building or the like, and the left of the plane of FIG. 3 is the outdoor side, the right of the plane is the indoor side, the upper portion of the plane is the top and the lower portion of the plane is the bottom.

The panel 11 is a plate-shaped translucent panel, such as a window glass or a resin panel, that has translucency and is used for the window of a normal building or a normal vehicle. Hence, as a member of the panel 11, a known plate glass or a resin panel can be used.

Here, as the panel 11, a window glass that is previously arranged in a building as described above may be used. In other words, the daylighting panel 10 can be formed by adhering the daylighting sheet 15 to the window included in the building.

The adhesive layer 12 is a layer for adhering the daylighting sheet 15 to the panel 11. The material for the adhesive layer 12 is not particularly limited as long as the adhesion described above can be achieved, and, as the material for the adhesive layer 12, an adherence agent, an adhesive agent, a photo-curable resin, a thermosetting resin or the like that are known can be used. As an example of the adherence agent, there is an acrylic adherence agent, and furthermore, there is an adherence agent obtained by combining an acrylic copolymer and an isocyanate compound.

However, in terms of the property of the daylighting panel 10, the material of the adhesive layer 12 preferably has excellent translucency and weather resistance.

The thickness of the adhesive layer 12 is not particularly limited but is preferably equal to or more than 10 µm but equal to or less than 100 µm. When the adhesive layer 12 is excessively thin, the intimate contact between the panel 11 and the daylighting sheet 15 is likely to be degraded. When the adhesive layer 12 is excessively thick, it is difficult to make the thickness of the adhesive layer 12 uniform.

The adhesive layer 12 may have the function of absorbing at least one of an infrared ray, an ultraviolet ray and visible light. The "absorbing at least one of an infrared ray, an ultraviolet ray and visible light" means that an electromagnetic wave of a predetermined wavelength among electromagnetic waves classified into any of an infrared ray, an ultraviolet ray and visible light is absorbed. The "absorbing" means that 10% or more of the electromagnetic wave of the predetermined wavelength is absorbed.

In order for the layer to have the function described above, the layer preferably contains an absorption agent that can absorb at least one of an infrared ray, an ultraviolet ray and visible light.

Examples of the absorption agent that absorbs an infrared ray include metal oxide ultrafine particles such as an antimony-doped tin oxide (ATO), a tin-doped indium oxide (ITO) and a phthalocyanine compound. By the addition of or the application of these absorption agents to the surface, it is possible to absorb an infrared ray. As described above, the function of absorbing an infrared ray is added to the daylighting sheet, and thus, for example, the effect of reducing the increase in an indoor temperature in summer to decrease the use of air conditioning is provided.

Examples of the absorption agent that absorbs an ultraviolet ray include: benzotriazole ultraviolet absorption agents (TINUVIN P, TINUVIN P FL, TINUVIN 234, TINUVIN 326, TINUVIN 326 FL, TINUVIN 328, TINUVIN 329 and TINUVIN 329 FL all of which are made by BASF Japan Ltd.); a triazine ultraviolet absorption agent (TINUVIN 1577 ED made by BASF Japan Ltd.); benzophenone ultraviolet absorption agents (CHIMASSORB 81 and CHIMASSORB 81 FL all of which are made by BASF Japan Ltd.); and a benzoate ultraviolet absorption agent (TINUVIN 120 made by BASF Japan Ltd.). By the addition of or the application of these absorption agents to the surface, it is possible to absorb an ultraviolet ray. The function of absorbing an ultraviolet ray is added to the daylighting sheet, and thus, for example, the effect of reducing the adverse effect on the skin of a person within a room and the effect of reducing the color degradation of furniture within a room are provided.

As the absorption agent that absorbs visible light, light absorption colored particles such as carbon black are preferably used. However, the absorption agent is not limited to them, for example, colored particles that selectively absorb a predetermined wavelength according to the characteristics of light that needs to be absorbed may be used. Specific examples of the colored particles include: metal salts such as carbon black, graphite and black iron oxide; organic fine particles that are colored by dyes, pigments or the like; and colored glass beads. Among them, in terms of cost, quality, availability and the like, the colored organic fine particles are preferably used. More specifically, acrylic cross-linked fine particles containing carbon black, urethane cross-linked fine particles containing carbon black and the like are preferably used. By the addition of or the application of these absorption agents to the surface, it is possible to absorb visible light. The function of absorbing visible light is added to the daylighting sheet, and thus, for example, it is possible to decrease glare within a room.

The absorption agents described above are contained, and thus it is possible to provide, when the daylighting sheet is arranged in the daylighting portion of a building, a more comfortable indoor environment. The absorption agent preferably absorbs an electromagnetic wave of a predetermined wavelength among electromagnetic waves classified into any of an infrared ray, an ultraviolet ray and visible light. The absorption agent may be configured to absorb only an infrared ray, may be configured to absorb only an ultraviolet ray, may be configured to absorb only visible light or may be configured to be able to absorb two or more types of an infrared ray, an ultraviolet ray and visible light. Which wavelength's electromagnetic wave can be absorbed can be selected as necessary according to the place where the daylighting sheet is arranged and the purpose of the arrangement. The wavelength and the rate of absorption of an electromagnetic wave that is absorbed can be adjusted by adjusting, as necessary, the type and amount of the absorption agent described above.

The rate of absorption of the electromagnetic wave of the predetermined wavelength described above in the layer containing the absorption agent is preferably equal to or more than 10% but equal to or less than 90%. When the rate of absorption is less than 10%, it is difficult to obtain the effect of containing the absorption agent whereas when the rate of absorption is set at 90% or less, it is easy to adjust a composition constituting the absorption agent.

The base material layer 16 is a layer that is a base material for forming the light deflection layer 17, has translucency and supports the light deflection layer 17 to prevent it from deforming. In terms of what has been described above, specific examples of the material of the base material layer 16 include a transparent resin that has, as main ingredients, one or more of acrylic, styrene, polycarbonate, polyethylene terephthalate, acrylonitrile and the like and epoxy acrylate and urethane acrylate reactive resins (ionizing radiation curable resin and the like).

The thickness of the base material layer 16 is not particularly limited but is preferably equal to or more than 25 µm but equal to or less than 300 µm. When the thickness of the base material layer 16 does not fall within this range, a problem is likely to occur in processing. For example, when the base material layer 16 is excessively thin, a crease is more likely to occur. Moreover, when the base material layer 16 is excessively thick, it is difficult to perform winding in an intermediate process.

The light deflection layer 17 is a layer that can diffuse light entering the light deflection layer 17 through one surface side (as will be described later, in particular, light entering the light deflection layer 17 in a direction from obliquely above to down) and emit it through the other surface side. The light deflection layer 17 is shaped to have a cross section shown in FIG. 3 and extend from the back side of the plane of the figure to the front side. Specifically, in the cross section in FIG. 3, the light deflection layer 17 includes light deflection portions 19 in which a cross section formed between a trapezoidal light transmission portion 18 and the adjacent light transmission portion 18 is formed within a concave portion of the trapezoids. In the present embodiment, the light transmission portions 18 on the side of the base material layer 16 are coupled with each other. The light transmission portion 18 and the light deflection portion 19 having the cross section extend in one direction (in the present embodiment, the horizontal direction) of the sheet surface, and a plurality of light transmission portions 18 and light deflection portions 19 are aligned in a direction (in the present embodiment, the vertical direction) different from the one direction.

Any part of the light deflection layer 17 may contain an absorption agent that can absorb at least one of an infrared ray, an ultraviolet ray and visible light. In particular, an infrared absorption agent is contained, and thus when it is in summer with the solar altitude high, it is cool because infrared rays are more likely to be absorbed by the light deflection layer whereas when it is in winter with the solar altitude low, it is warm because infrared rays are unlikely to be absorbed by the light deflection layer, with the result that it is possible to achieve a comfortable indoor environment.

The light transmission portion 18 is a part that transmits light, and the surface of the light transmission portion 18 on the side of the base material layer 16 and the surface (the surface on the side of the protective layer 21) on the opposite side are preferably formed parallel to each other. Thus, as will be described later, when the daylighting panel 10 is applied to the window 2, scenery on the outdoor side is more easily seen from the indoor side. Preferably, the light transmission portion 18 transmits light without the light scattered. In this way, the ease with which scenery on the back surface side is seen is enhanced. Here, the "transmits light without the light scattered" means that the part is formed without the intentional addition of a material for scattering the light or the like, and it is allowed that the light is inevitably scattered when the light is in the process of passing through the material.

The material of the light transmission portion 18 may be the same as that of the base material layer 16 or may be different from that of the base material layer 16. However, since a refractive index difference between the both is more likely to cause light to be deflected in their interface, it is preferable that the same material be used or that different materials having a low refractive index difference or no refractive index difference be used.

When the light transmission portion 18 and the base material layer 16 are formed of the same material, it is possible to integrally form the base material layer 16 and the light transmission portion 18. Even when the light transmission portion 18 and the base material layer 16 are formed of different materials or when the light transmission portion 18 and the base material layer 16 are formed of the same material, the base material layer 16 and the light transmission portion 18 may be separately formed and stacked in layers with a known means.

A specific example of a method of forming the light transmission portion 18 will be described later.

Examples of the material of the light transmission portion 18 include a transparent resin that has, as main ingredients, one or more of acrylic, styrene, polycarbonate, polyethylene terephthalate, acrylonitrile and the like and epoxy acrylate and urethane acrylate reactive resins (ionizing radiation curable resin and the like).

The light transmission portions 18 are aligned in a predetermined distance in a direction along the sheet surface. Hence, between the adjacent light transmission portions 18, the concave portion having a trapezoidal cross section is formed. The concave portion is a groove that has a trapezoidal cross section having a lower base on the side of the upper base of the light transmission portion 18 and an upper base on the side of the lower base of the light transmission portion 18, and the light deflection portions 19 is formed by filling this portion with a necessary material described later. In other words, in the cross section shown in FIG. 3, the light transmission portion 18 is an element that has a trapezoidal cross section having the lower base on the surface on the side of the base material layer 16 and the upper base shorter than the lower base on the opposite side.

The light deflection portion 19 is a part that deflects the incoming light, and in the present embodiment, is formed to diffuse and reflect and then deflect the incoming light. The light deflection portion 19 described above can be formed by filling the concave portion between the adjacent light transmission portions 18 with, for example, the following material. In the present embodiment, the material of the light deflection portion 19 is preferably cryptic, and examples thereof include white pigments and silver pigments. Examples of the white pigment include metal oxides such as a titanium oxide, a titanium dioxide, a magnesium oxide and a zinc oxide. On the other hand, examples of the silver pigment include metals such as aluminum and chromium.

In order to easily diffuse and reflect light in the interface between the light deflection portion 19 and the light transmission portion 18, the interface between the light transmission portion 18 and the light deflection portion 19 may be formed into a mat surface.

As described above, the light deflection portion 19 is formed in the concave portion between the adjacent light transmission portions 18, and its shape is along the concave portion. Hence, in the present embodiment, the light deflection portion 19 has a substantially trapezoidal cross section having the short upper base on the side of the base material layer 16 and the long lower base on the side of the protective layer 21, and has oblique sides between them. The oblique side forms the interface with the light transmission portion 18, and is the common oblique side.

An angle $\theta_1$ of the oblique side in the cross section of the light deflection portion 19 (the light transmission portion 18) is preferably equal to or more than 0 degrees but equal to or less than 20 degrees with respect to the normal to the sheet surface. When the light deflection portion 19 is formed such that $\theta_1$ is less than 0 degrees (this means that in the cross section shown in FIG. 3, the width of the light deflection portion 19 on the side of the protective layer 21 is shorter than that on the side of the base material layer 16), it is difficult to produce a mold used for forming the light deflection layer 17 as described later, and a problem is likely to occur in the mold release even if the mold is produced. On the other hand, when $\theta_1$ is excessively large, it is difficult to increase the aspect ratio of the opening width (in the cross section shown in FIG. 3, the width of the light deflection portion 19 on the side of the protective layer 21) to the height (the size in the direction of thickness of the light deflection layer 17), with the result that it is difficult to obtain a desired effect described later by the light deflection layer 17.

The pitch with which the light deflection portions 19 are aligned is not particularly limited but is preferably equal to or more than 10 μm but equal to or less than 20 μm, and is more preferably equal to or more than 100 μm but equal to or less than 200 μm. When the pitch of the light deflection portion 19 is excessively narrow, it is difficult to obtain the desired effect described later by the light deflection layer 17, and an image transmitted through the light transmission portion 18 is disadvantageously likely to be formed into shape of a rainbow by a diffraction phenomenon. When the pitch of the light deflection portion 19 is excessively wide, it is disadvantageously likely that it is difficult to form the light deflection portion 19 and that a problem occurs in the release and the processing of the mold when the light deflection layer 17 is produced as described later. The opening width of the light deflection portion 19 (in the cross section shown in FIG. 3, the width on the side of the protective layer 21) is not particularly limited but is preferably equal to or more than 5 µm but equal to or less than 150 µm. When the opening width of the light deflection portion 19 is excessively narrow, it is difficult to obtain the desired effect described later by the light deflection layer 17. When the opening width of the light deflection portion 19 is excessively wide, it is disadvantageously likely that it is difficult to form the light deflection portion 19 and that a problem occurs in the release and the processing of the mold when the light deflection layer 17 is produced as described later.

The thickness of the light deflection layer 17 is not particularly limited but is preferably equal to or more than 50 µm but equal to or less than 300 µm. When the light deflection layer 17 is excessively thin, it is likely that it is difficult to obtain the desired effect described later and to perform fine processing (such as the formation of the light deflection portion 19). When the light deflection layer 17 is excessively thick, it is disadvantageously likely that a problem occurs in the processing such as the release of the mold when the light deflection layer 17 is produced as described later.

In the present invention, the shapes of the light transmission portion and the light deflection portion are not limited to the form shown in FIG. 3. Hence, in a cross section corresponding to the cross section shown in FIG. 3, the light transmission portion may be rectangular, and a portion corresponding to the oblique side of the trapezoid described above may be formed in the shape of a curve (the tangent of the curve preferably has the same condition as $\theta_1$ described above at each portion) or a polygonal line (each line of the polygonal line preferably has the same condition as $\theta_1$ described above).

The adhesive layer 20 is a layer that attaches the protective layer 21 to the side of the light deflection layer 17 opposite to the base material layer 16, and various types of layers having such a function can be used. The material used for the adhesive layer 20 is not particularly limited but the same material as the adhesive layer 12 can be used. The preferable thickness of the adhesive layer 20 is the same as the adhesive layer 12.

The protective layer 21 is a layer that pairs with the base material layer 16 and that is arranged to sandwich the light deflection layer 17, and has the function of protecting the light deflection layer 17 together with the base material layer 16. As long as the protective layer 21 has such a function, its material is not particularly limited, and for example, the protective layer 21 can be formed of the same material as the base material layer 16.

The hard coat layer 22 is a layer that, in order to protect the surface, is provided closest to the surface in the daylighting panel 10 on the opposite side of the panel 11. The hard coat layer 22 can be formed as a transparent resin layer, and, in terms of resistance of scratches and surface contamination, is preferably formed as a cured resin layer obtained by curing a curable resin.

Specifically, an ionizing radiation curable resin, a known curable resin or the like is preferably adopted as necessary according to required performance. Examples of the ionizing radiation curable resin include an acrylate resin, an oxetane resin and a silicone resin. For example, the acrylate ionizing radiation curable resin is formed of: a (meth) acrylic acid ester monomer such as a monofunctional (meth) acrylate monomer, a bifunctional (meth) acrylate monomer or a three or more functional (meth) acrylate monomer; a (meth) acrylic acid ester oligomer such as a urethane (meth) acrylate, an epoxy (meth) acrylate, a polyester (meth) acrylates; and a (meth) acrylic acid ester prepolymer. Furthermore, examples of the three or more functional (meth) acrylate monomer include a trimethylolpropane tri(meth) acrylate, a pentaerythritol tetra(meth) acrylate and a dipentaerythritol hexa(meth) acrylate.

The function of enhancing contamination resistance may be added to the hard coat layer 22. This can be achieved by adding, for example, a silicone compound or a fluorine compound. Furthermore, as another function, the hard coat layer 22 may have the function of enhancing the antistatic characteristic or the function of enhancing water repellency. As the material that can be used for enhancing the antistatic characteristic, in an electrically conductive type, there are PEDOT-PSS (PEDOT (poly (3,4-ethylenedioxythiophene); 3,4-ethylenedioxy thiophene polymer) and PSS (poly(styrenesulfonate); styrene sulfonic acid polymer) are present together) or the like. In an ionic conductive type, there are lithium salts and the like. As the material that can be used for enhancing the water repellency, there is a fluorine compound or the like.

The daylighting panel 10 described above can be manufactured as follows, for example.

The daylighting panel 10 can be manufactured by adhering the daylighting sheet 15 to the panel 11 with the adhesive layer 12. For example, the daylighting sheet 15 is manufactured as follows.

The light deflection layer 17 is first formed by a method using a mold roll. Specifically, the mold roll is prepared in which on the outer circumferential surface of a cylindrical roll, projections and recesses that can transfer the light transmission portion 18 of the light deflection layer 17 are prepared. Then, between the mold roll and a nip roll arranged opposite it, the base material that is the base material layer 16 is inserted. Here, preferably, on one surface of the base material, the adhesive layer 12 is previously formed. Then, while the composition of the light transmission portion 18 is being supplied between the surface of the base material on the side where the adhesive layer 12 is not arranged and the mold roll, the mold roll and the nip roll are rotated. Thus, the recess portions of the projections and recesses formed on the surface of the mold roll are filled with the composition of the light transmission portion 18, and thus the composition is formed along the shape of the surface of the projections and recesses of the mold roll.

Here, as the composition of the light transmission portion 18, the composition described above is preferably used, and more specifically, the composition is as follows. That is, a photo-curable resin composition obtained by mixing a reactive diluent monomer (M1) and a photopolymerization initiator (I1) to a photo-curable prepolymer (P1) can be used.

Examples of the photo-curable prepolymer (P1) include epoxy acrylate, urethane acrylate, polyether acrylate, polyester acrylate and polythiol prepolymers.

Examples of the reactive diluent monomer (M1) include vinylpyrrolidone, 2-ethylhexyl acrylate, β-hydroxyethyl acrylate and tetrahydrofurfuryl acrylate.

Examples of the photopolymerization initiator (I1) include hydroxybenzoyl compounds (such as 2-hydroxy-2-methyl-1-phenylpropan-1-one, 1-hydroxy cyclohexyl phenyl ketone and benzoin alkyl ether), benzoylformate compounds (such as methyl benzoyl formate), thioxanthone compound (such as isopropylthioxanthone), benzophenones (such as benzophenone), phosphoric acid ester compounds (such as 1,3,5-trimethyl benzoyl diphenyl phosphine oxide, bis (2,4,6-trimethyl benzoyl)-phenyl phosphine oxide) and benzyl dimethyl ketal. Selection is arbitrarily made among them in terms of an application device for curing the photo-curable resin composition and the curability of the photo-curable resin composition. In order to prevent the light transmission portion 18 from being colored, 2-hydroxy-2-methyl-1-phenylpropan-1-one, or 1-hydroxy cyclohexyl phenyl ketone and bis (2,4,6-trimethyl benzoyl)-phenyl phosphine oxide is preferably used.

One type of the photo-curable prepolymer (P1), the reactive diluent monomer (M1) and the photopolymerization initiator (I1) can be used or two types or more thereof can be combined and used.

Light is applied from the base material side by a light application device to the composition of the light transmission portion 18 that is sandwiched between the mold roll and the base material and that fills that portion. Thus, it is possible to cure the composition of the light transmission portion 18 and fix its shape. With a mold release roll, the base material layer 16 and the molded light transmission portion 18 are released from the mold roll.

Then, the recess portion of the light transmission portion 18 is filled with the composition of the light deflection portion 19, and the composition is cured, and thus it is possible to form the light deflection portion 19. Specifically, the recess portion of the light transmission portion 18 is excessively filled with the composition of the light deflection portion 19, and the excessive composition is scraped off with a blade to adjust the amount of composition, with the result that the recess portion is filled with the composition. Then, the composition filling the recess portion is cured with an appropriate method.

In this way, it is possible to form the light deflection layer 17 on the base material layer 16.

On the other hand, a stack member in which the hard coat layer 22 is stacked on one surface of the protective layer 21 and the adhesive layer 20 is stacked on the other surface is prepared, and they are stacked such that the adhesive layer 20 of the stack member is in contact with the light deflection layer 17. When the adhesive layer 20 is formed of an ultraviolet curable resin, a photo-curable resin or the like, ultraviolet rays or light is preferably applied to cure the adhesive layer 20 after the stacking.

The daylighting sheet 15 produced as described above is adhered to the panel 11 with the adhesive layer 12 to form the daylighting panel 10. In the daylighting panel 10, instead of the adhesive layer 12, an absorption agent that can absorb at least one of an infrared ray, an ultraviolet ray and visible light may be contained in any one of the layers described above.

Then, main optical paths in a case where the windows 2 are formed with the daylighting panels 10 and they are arranged in the opening portions of the building 1 will be described. Schematic examples of the optical path are shown in FIG. 3. The examples of the optical path are schematically shown, and the degrees of refraction and reflection and the like are not exactly shown.

Outside light L31 applied to the daylighting panel 10 in a direction from obliquely above to down from which sunlight is assumed to be applied passes through the panel 11, the adhesive layer 12 and the base material layer 16 and reaches the light deflection portion 19 of the light deflection layer 17. The outside light L31 that has reached the light deflection portion 19 is deflected by the light deflection portion 19. In the present embodiment, the outside light L31 is deflected by being diffused and reflected. Then, the defused and reflected light passes through the adhesive layer 20, the protective layer 21 and the hard coat layer 22, and enters the indoor side. Here, since the light entering the indoor side is deflected upwardly and is simultaneously diffused, it is possible to prevent the outside light from being directly applied, and furthermore, the outside light illuminates a wide range of the indoor side space.

Figure 4:
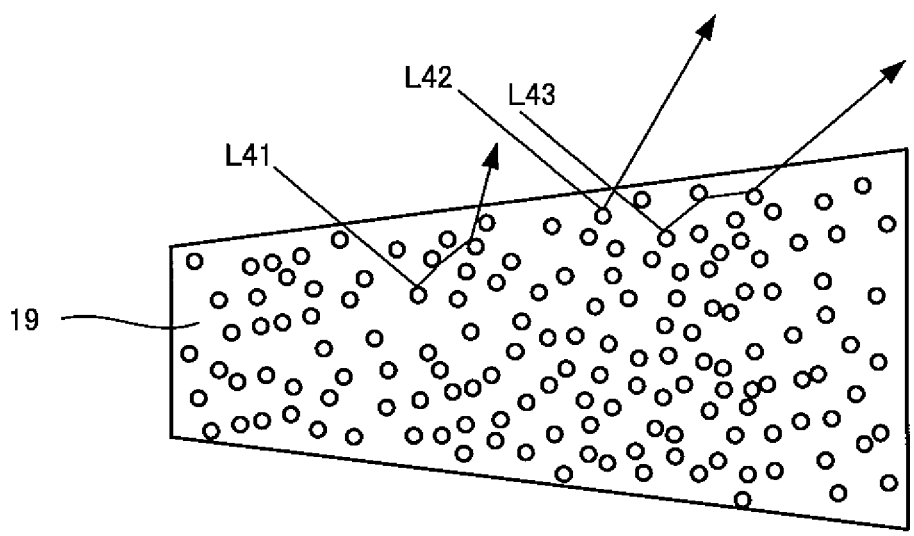
FIG. 4 A diagram illustrating the reflection of light in a light deflection portion 19.

Illustration is more specifically shown in FIG. 4. FIG. 4 is a diagram of one light deflection portion 19 illustrating the diffusion and reflection. Outside light L41, outside light L42 and outside light L43 reached the light deflection portion 19 are, for example, repeatedly reflected off light-reflecting substances contained in the light deflection portion 19, are emitted in different directions and are thereby diffused and deflected.

In the daylighting panel 10 including the daylighting sheet 15 as described above, since at the time of the deflection described above, it is possible to reflect the outside light toward the indoor side and take in it without the outside light being actively absorbed by the light deflection portion 19, it is possible to efficiently take in the light.

On the other hand, when the outdoor side is seen from the indoor side, an observer's line of sight corresponds to light L32 of FIG. 3. In other words, it is possible to observe the outdoor side through the surface on the side of the base material layer 16 of the light transmission portion 18 parallel to the panel 11 and the opposite side surface. Since in this part, a high degree of refraction is not performed in the interface, it is possible to clearly see scenery on the outdoor side.

As described above, with the daylighting panel 10, it is possible to efficiently take outside light into the room and relatively clearly see outside scenery from the indoor side. Moreover, since the light deflection layer 17 is sandwiched between the base material layer 16 and the protective layer 21, it is possible to enhance the durability.

Figure 5:
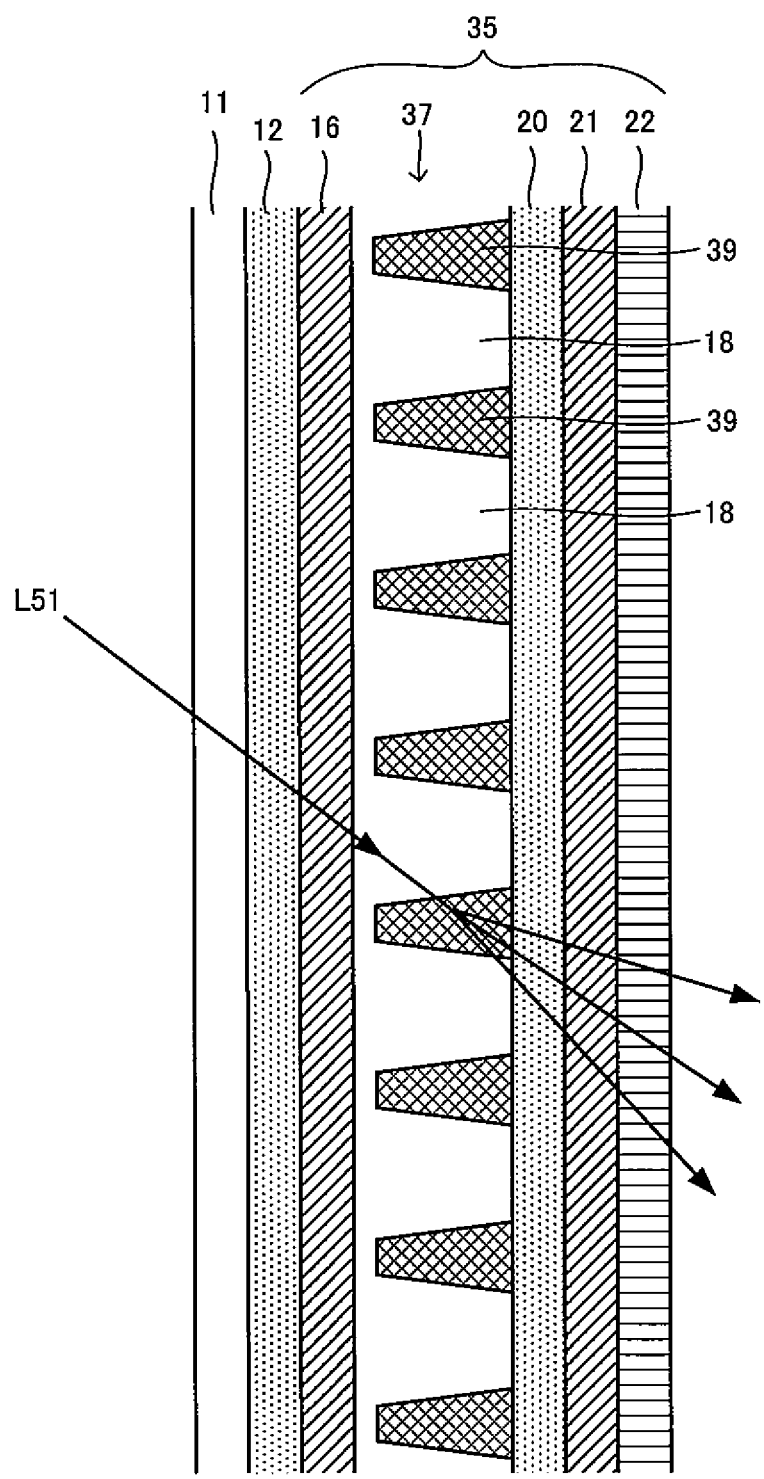
FIG. 5 A diagram showing a cross section of a daylighting panel 30 and schematically showing the configuration of its layers.

FIG. 5 is a diagram illustrating a second embodiment, is a cross-sectional view schematically showing the configuration of the layers of a daylighting panel 30 and corresponds to FIG. 3. In the daylighting panel 30, portions having the same configuration as in the daylighting panel 10 are identified with the same symbols, and their description will not be repeated.

The daylighting panel 30 includes the panel 11, the adhesive layer 12, a daylighting sheet 35. The daylighting sheet 35 also includes the base material layer 16, a light deflection layer 37, the adhesive layer 20, the protective layer 21 and the hard coat layer 22. The daylighting panel 30 differs from the daylighting panel 10 in that, instead of the light deflection layer 17 of the daylighting panel 10, the light deflection layer 37 is applied. In the other respects, the daylighting panel 30 is the same as the daylighting panel 10.

The daylighting panel 30 differs from the daylighting panel 10 in that light is diffused and reflected by the light deflection portion 19 of the light deflection layer 17 included in the daylighting panel 10 whereas in the daylighting panel 30, light is transmitted and diffused by the light deflection portion 39 of the light deflection layer 37 and is thereby deflected. The light deflection portion 39 is formed in the concave portion between the light transmission portions 18 as in the light deflection portion 19. Hence, the shape of the light deflection portion 39 is the same as that of the light deflection portion 19 but the material with which this portion is filled is different from that of the light deflection portion 19.

Specifically, the material that transmits and diffuses the light reached the light deflection portion 39 is arranged. As the material of the light deflection portion 39, a material obtained by mixing a transparent binder resin with a transparent diffusing agent whose refractive index differs from that of the binder resin is preferably used. As the diffusing agent, for example, there are cross-linked particles obtained by polymerizing monomers which mainly include (meth) acrylic acid ester and styrene. As the specific example of the cross-linked particles, there is Ganz Pearl made by AICA Kogyo Co., Ltd. In the cross-linked particles described above, the refractive index can be controlled by changing the mixing ratio of acrylic acid ester and styrene. For example, it is possible to set the refractive index at about 1.49 by increasing the acrylic ratio, and it is possible to set the refractive index at about 1.59 by increasing the styrene ratio. As the diffusing agent, urethane cross-linked particles can also be used. As the specific example of the urethane cross-linked particles, there is Art Peral made by Negami Chemical Industrial Co., Ltd. As the diffusing agent, hollow particles can be used.

Then, main optical paths in a case where the windows are formed with the daylighting panels 30 and they are arranged in the opening portions of the building will be described. Schematic examples of the optical path are shown in FIG. 5.

Outside light L51 applied to the daylighting panel 30 from in a direction from obliquely above to down from which sunlight is assumed to be applied passes through the panel 11, the adhesive layer 12 and the base material layer 16 and reaches the light deflection portion 39 of the light deflection layer 37. The outside light L51 that has reached the light deflection portion 39 enters the light deflection portion 39 and passes through the light deflection portion 39 and is simultaneously diffused by the above-described configuration of the light deflection portion 39. The light that has passed through the light deflection portion 39 as described above thereafter passes through the adhesive layer 20, the protective layer 21 and the hard coat layer 22, and enters the indoor side. Here, since the light entering the indoor side is defused and deflected, it is possible to prevent the outside light from being directly applied, and the outside light can illuminate a wide range of the indoor side space.

Here, since with the daylighting panel 30, it is possible to take the outside light into the indoor side without the outside light being actively absorbed by the light deflection portion 39, it is possible to efficiently take in the light.

On the other hand, when the outdoor side is seen from the indoor side, the observer's line of sight is the same as in the daylighting panel 10, and thus it is possible to relatively clearly see scenery on the outdoor side.

As described above, with the daylighting panel 30, it is possible to efficiently take outside light into the indoor side and relatively clearly see outside scenery from the indoor side. Moreover, since the light deflection layer 37 is sandwiched between the base material layer 16 and the protective layer 21, it is possible to enhance the durability.

Figure 6:
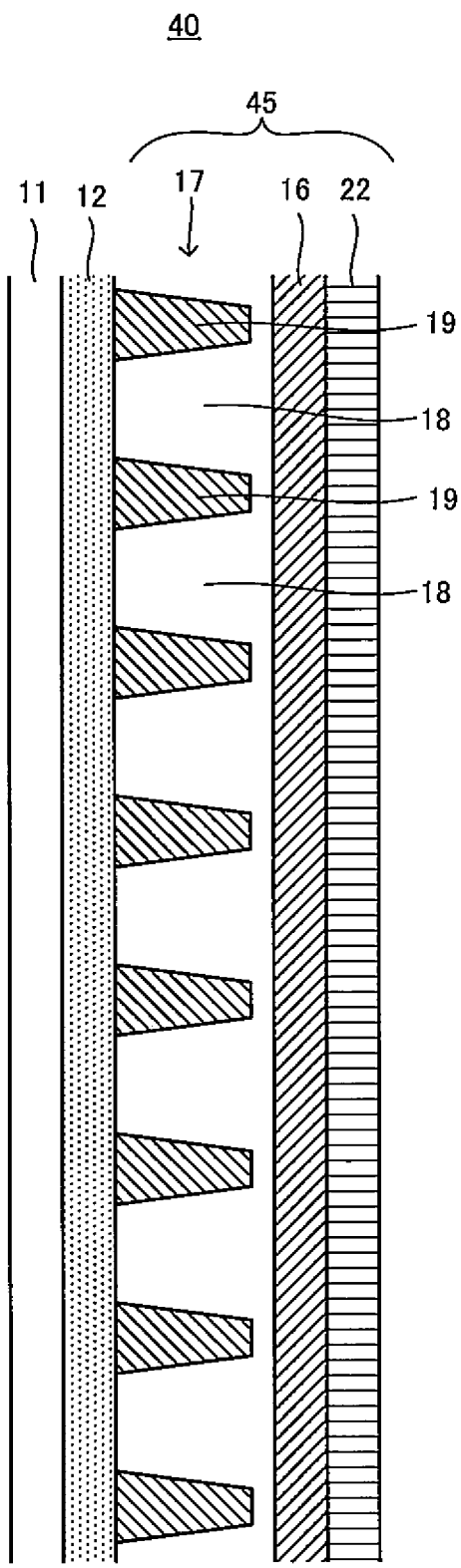
FIG. 6 A diagram showing a cross section of a daylighting panel 40 and schematically showing the configuration of its layers.

FIG. 6 is a diagram illustrating a third embodiment, is a cross-sectional view schematically showing the configuration of the layers of a daylighting panel 40 and corresponds to FIG. 3. In FIG. 6, portions having the same configuration as in FIG. 3 are identified with the same symbols, and their description will not be repeated.

The daylighting panel 40 includes the panel 11, the adhesive layer 12 and a daylighting sheet 45 that is adhered to the panel 11 with the adhesive layer 12. The daylighting sheet 45 also includes the light deflection layer 17, the base material layer 16 and the hard coat layer 22.

Although in the daylighting panels 10 and 30 described above, the light deflection layers 17 and 37 are sandwiched between the base material layer 16 and the protective layer 21, in the daylighting panel 40, the light deflection layer 17 is sandwiched between the panel 11 and the base material layer 16. Even in the present embodiment, as with the daylighting panels 10 and 30, it is possible to enhance the durability. With the daylighting panel 40, since it is possible to simplify the configuration of the layers as compared with the daylighting panels 10 and 30, it is possible to manufacture the daylighting panel 40 at low cost.

Since in the daylighting panel 40, such a configuration is adopted, the light deflection layer 17 is arranged on the side of the panel 11, and the base material layer 16 is on the side of the hard coat layer 22 as compared with the light deflection layer 17. Hence, as is obvious from comparison between FIGS. 3 and 6, in the daylighting panel 40, the light transmission portion 18 and the light deflection portion 19 are arranged such that they are reversed.

Even in the daylighting panel 40 described above, as with the daylighting panel 10, it is possible to efficiently take light into the indoor side, and to clearly see scenery on the outdoor side when the outdoor side is seen from the indoor side. Although in this example, the light deflection layer 17 is applied, the light deflection layer 37 may be used instead.

Figure 7:
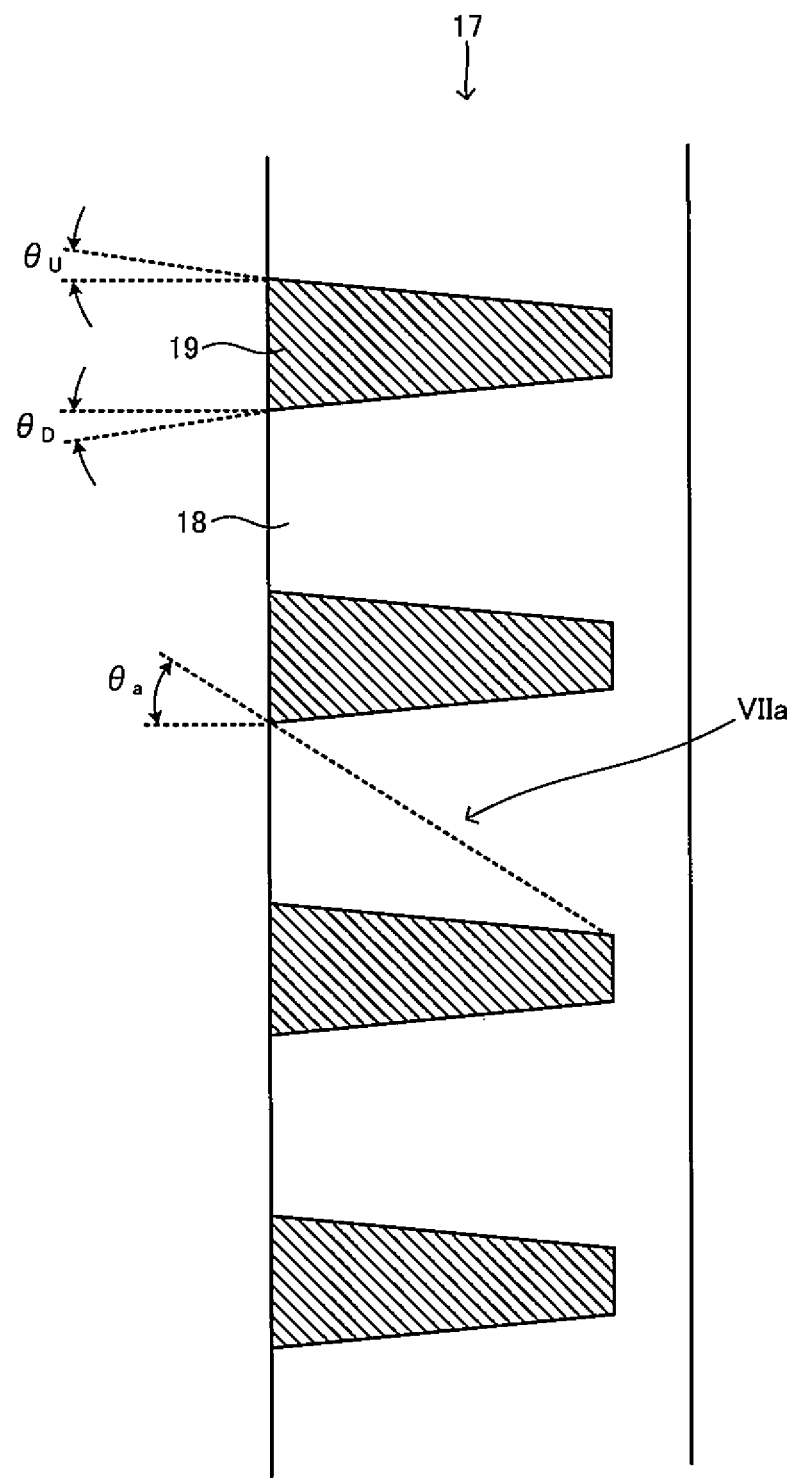
FIG. 7 A diagram of an enlarged part of a light deflection layer 17 of the daylighting panel 40.

Furthermore, in the present embodiment, the light deflection layer 17 can be configured as follows. FIG. 7 shows a diagram of an enlarged part of the light deflection layer 17. As described above, between two light deflection portions 19, the light transmission portion 18 is arranged. As shown in line VIIa of FIG. 7, a line corresponding to the diagonal line of the light transmission portion 18 can be defined. More specifically, in the sides of the adjacent light deflection portions 19 opposite each other, the line VIIa connecting an indoor side end portion of the side of the light deflection portion 19 arranged below and an outdoor side end portion of the side of the light deflection portion 19 arranged adjacently above is assumed to be a prospective line, and an angle of 90 degrees or less of the angles formed between the prospective line VIIa and the horizontal surface is assumed to be a prospective angle $\theta_a$. In the present embodiment, the angle $\theta_a$ is preferably a predetermined value.

In the leg portions of the trapezoidal cross section of the light deflection portion 19, as is obvious from FIG. 7, the leg portion on the upper side is inclined at $\theta_U$ with respect to the horizontal surface (the normal to the sheet surface of the daylighting panel 40), and the leg portion on the lower side is likewise inclined at $\theta_D$.

A preferable value of the prospective angle $\theta_a$ will be described based on main optical paths. Optical path examples necessary for the description will be shown, as necessary, in drawings below.

Figure 8:
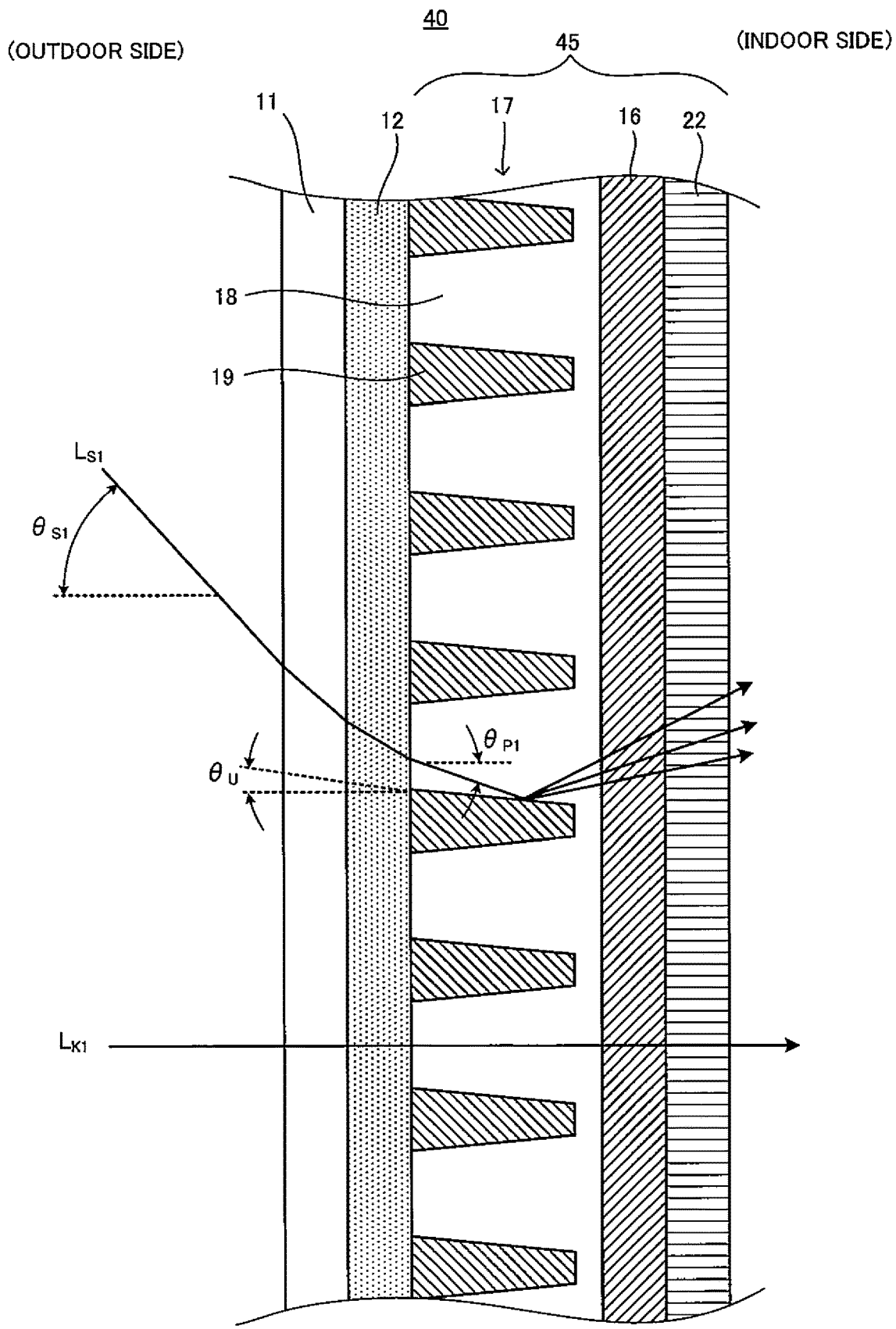
FIG. 8 A diagram illustrating an optical path example in the light deflection layer 17.

FIG. 8 shows light $L_{S1}$ from the sun as one optical path example. As is obvious from FIG. 8, the light $L_{S1}$ is applied to the daylighting panel 40 at an elevation angle (an angle formed from the horizontal surface) $\theta_{S1}$ based on the altitude of the sun at that time. While the light $L_{S1}$ entering the daylighting panel 40 passes through the daylighting panel 40, the light $L_{S1}$ travels through the light transmission portion 18 of the light deflection layer 17. Within the light transmission portion 18, when it is assumed that the refractive index of the light transmission portion is $N_P$, and refractive index of the outdoor side is $N_O$, the light $L_{S1}$ travels at a sunlight travel angle $\theta_{P1}$ expressed in formula (1).

[Formula 1]

$$\theta_{P1} = \sin^{-1}\left(\frac{N_O}{N_P}\sin\theta_{S1}\right) \quad (1)$$

When the sunlight traveling at the sunlight travel angle θp reaches the interface between the light transmission portion 18 and the light deflection portion 19, as described above, the sunlight can be diffused and reflected. In this way, the sunlight is deflected, and thus it is possible to reduce direct light that causes glare.

As described above, with the daylighting panel 40, regardless of the prospective angle $\theta_a$, sunlight is efficiently taken into the room, and simultaneously, it is possible to reduce at least part of the direct light. However, in order to more effectively apply sunlight to the light deflection portion 19, scatter the sunlight and emit the sunlight to the indoor side, it is possible to specify that the prospective angle $\theta_a$ falls within a predetermined angle range. This will be described in detail below.

Figure 9:
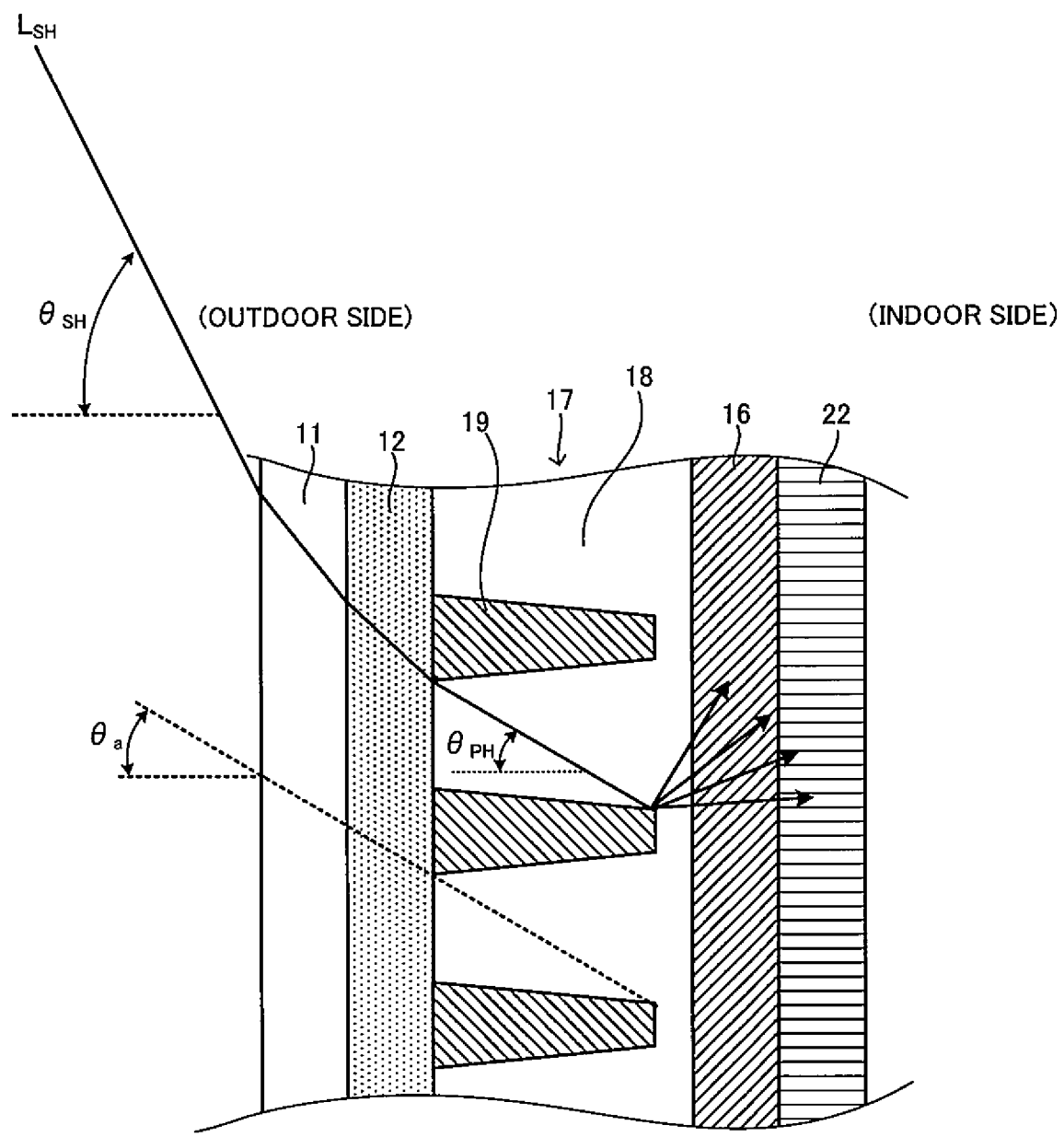
FIG. 9 A diagram illustrating a case where the culmination altitude is high.

In FIG. 9, an illustrative diagram is shown. Here, an elevation angle $\theta_{SH}$, the elevation angle which can be set when the culmination altitude is the highest in one year will be considered. Specifically, when sunlight enters the daylighting panel 40 at the elevation angle $\theta_{SH}$ when the culmination altitude is the highest at least in one year, the prospective angle $\theta_a$ can be specified so that all direct light form the sunlight is made to reach the light deflection portion 19. As is obvious from FIG. 9, in order for the light $L_{SH}$ entering the daylighting panel 40 at the elevation angle $\theta_{SH}$ to reach the light deflection portion 19 without fail, the condition under which the light $L_{SH}$ travels along the prospective line within the light transmission portion 18 is necessary. In other words, a sunlight travel angle $\theta_{PH}$ within the light transmission portion 18 is preferably equal to the prospective angle $\theta_a$. Hence, this is expressed, when it is assumed that the refractive index of the air is $N_O$, and the refractive index of the light transmission portion is $N_P$, by the following formula (2) that is a relational expression between the refractive index and the entrance angle.

[Formula 2]

$$\theta_{PH} = \sin^{-1}\left(\frac{N_O}{N_P}\sin\theta_{SH}\right) = \theta_a \quad (2)$$

The prospective angle $\theta_a$ is formulated from formula (2) so as to satisfy formula (3) below, and thus it is possible to make all direct light from sunlight reach the light deflection portion 19 when the sunlight enters the daylighting panel 40 at the elevation angle $\theta_{SH}$ when the culmination altitude is the highest at least in one year.

[Formula 3]

$$\theta_a \leq \sin^{-1}\left(\frac{N_O}{N_P}\sin\theta_{SH}\right) \quad (3)$$

Since the elevation angle $\theta_{SH}$ is an elevation angle in the position where the culmination altitude is the highest in a predetermined place, in the predetermined place, no elevation angle equal to or more than the elevation angle $\theta_{SH}$ is present. Hence, in order for all sunlight at a predetermined elevation angle less than the elevation angle $\theta_{SH}$ to be also made to likewise reach the light deflection portion 19, formula (1) is satisfied, and furthermore, with consideration given to the predetermined elevation angle instead of $\theta_{SH}$ in formulas (2) and (3), it is likewise possible to obtain the necessary value of the prospective angle $\theta_a$.

For example, when it is desired that direct sunlight at an elevation angle equal to or more than an elevation angle $\theta_{SM}$ between the elevation angle $\theta_{SH}$ when the culmination altitude is the highest in one year and an elevation angle $\theta_{SL}$ when the culmination altitude is the lowest in one year is made to reach the light deflection portion, the prospective angle $\theta_a$ is preferably formed so as to satisfy formulas (3) and (4).

[Formula 4]

$$\theta_a \leq \sin^{-1}\left(\frac{N_O}{N_P}\sin\theta_{SM}\right) \quad (4)$$

For example, in order to make the prospective angle $\theta_a$ equal to the predetermined angle as described above, the pitch in the light deflection portion, the angles ($\theta_U$ and $\theta_D$ in FIG. 7) of the leg portions of the light deflection portion and the size in the direction of thickness of the light deflection portion (the left/right direction of FIG. 7) are changed. By using them singly or combining them, it is possible to adjust the prospective angle $\theta_a$ to the predetermined angle.

As described above, when the prospective angle $\theta_a$ is decreased, even if the culmination altitude is different depending on the season, and the elevation angle is changed as the height of the sun is moved in one day, it is possible to make a larger amount of sunlight reach the light deflection portion, to totally reflect or scatter and reflect it and supply it to the indoor side.

Figure 10:
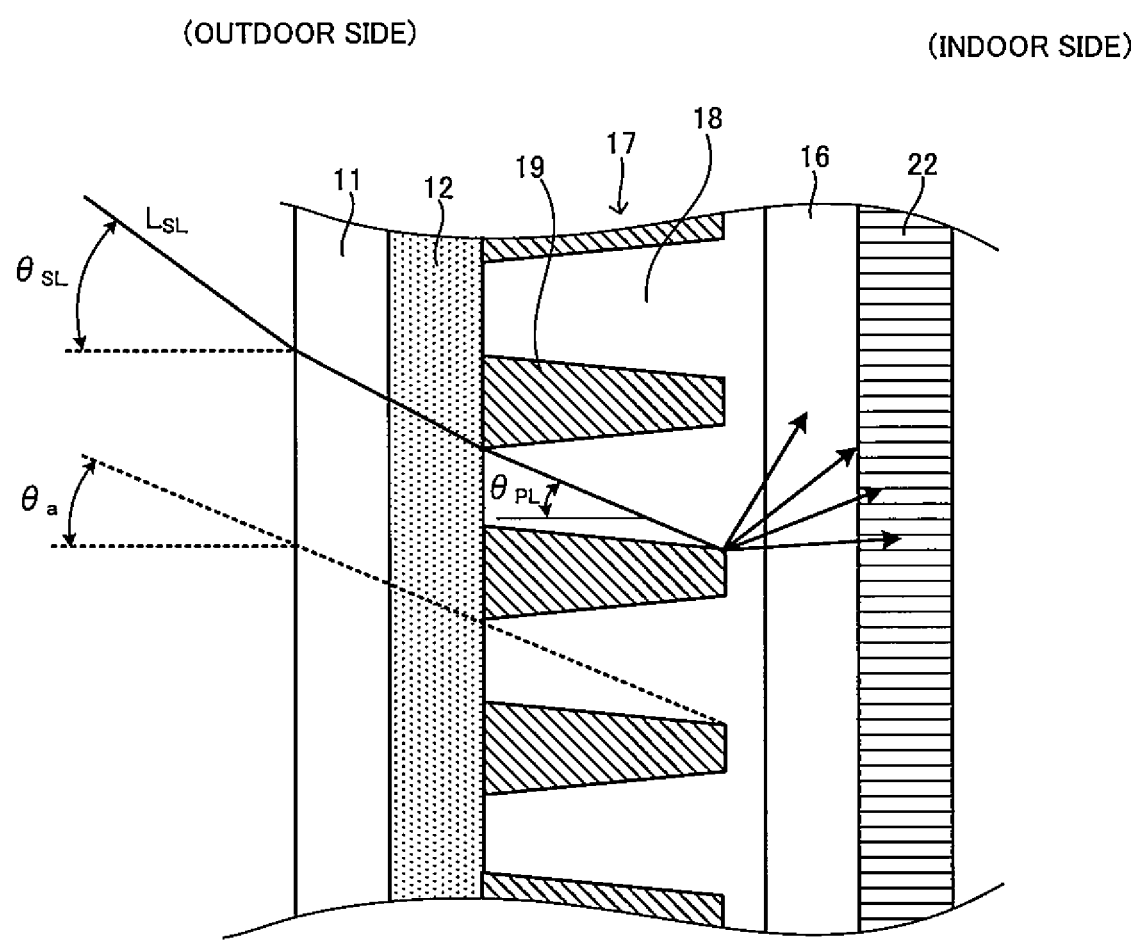
FIG. 10 A diagram illustrating a case where the culmination altitude is low.

On the other hand, the prospective angle $\theta_a$ is decreased, and thus the light deflection layer 17 may become thick or the light transmission portion may become small. Thus, visual recognition in the outdoor side is likely to be reduced. Although the lower limit of the prospective angle $\theta_a$ is not particularly limited in terms of what has been described, for example, as shown in FIG. 10, the lower limit of the prospective angle $\theta_a$ may be determined so that all direct sunlight at the elevation angle $\theta_{SL}$ when the culmination altitude is the lowest in one year is made to reach the light deflection portion 19. An illustrative diagram will be shown in FIG. 10.

Since the basic idea is the same as in the calculation of formulas (2) and (3), as is obvious from FIG. 10, sunlight $L_{SL}$ at the elevation angle $\theta_{SL}$ preferably travels along the prospective line, with the result that it is possible to obtain formula (5).

[Formula 5]

$$\theta_{PL} = \sin^{-1}\left(\frac{N_O}{N_P}\sin\theta_{SL}\right) = \theta_a \quad (5)$$

Here, $\theta_{PL}$ is the sunlight travel angle of the light transmission portion at the time of the elevation angle $\theta_{SL}$. Hence, it is possible to obtain formula (6) from the intension to determine formulas (3) and (5).

[Formula 6]

$$\sin^{-1}\left(\frac{N_O}{N_P}\sin\theta_{SL}\right) \leq \theta_a \leq \sin^{-1}\left(\frac{N_O}{N_P}\sin\theta_{SH}\right) \quad (6)$$

Here, a more specific example will be described. With consideration given to Japan, the elevation angle ($\theta_{SL}$) when the culmination altitude is the highest in one year and the elevation angle ($\theta_{SL}$) when the culmination altitude is the lowest in one year in Sapporo, Tokyo and Okinawa are shown in table 1.

[Table 1]

TABLE 1

|  | $\theta_{SH}$ | $\theta_{SL}$ |
| --- | --- | --- |
| Sapporo | 70.5° | 23.5° |
| Tokyo | 78.0° | 31.0° |
| Okinawa | 87.5° | 40.5° |

Based on table 1, the range of $\theta_a$ in Japan may be set as shown in formulas (7) and (8).

[Formula 7]

$$\theta_a \leq \sin^{-1}\left(\frac{N_O}{N_P}\sin 70.5°\right) \quad (7)$$

[Formula 8]

$$\sin^{-1}\left(\frac{N_O}{N_P}\sin 40.5°\right) \leq \theta_a \leq \sin^{-1}\left(\frac{N_O}{N_P}\sin 70.5°\right) \quad (8)$$

According to formula (7), all direct sunlight from the culmination altitude in the summer solstice over the substantially entire region of Japan can be made to each the light deflection portion. Moreover, according to formula (8), it is possible to make a large amount of sunlight reach the light deflection portion with higher visual recognition.

Figure 11:
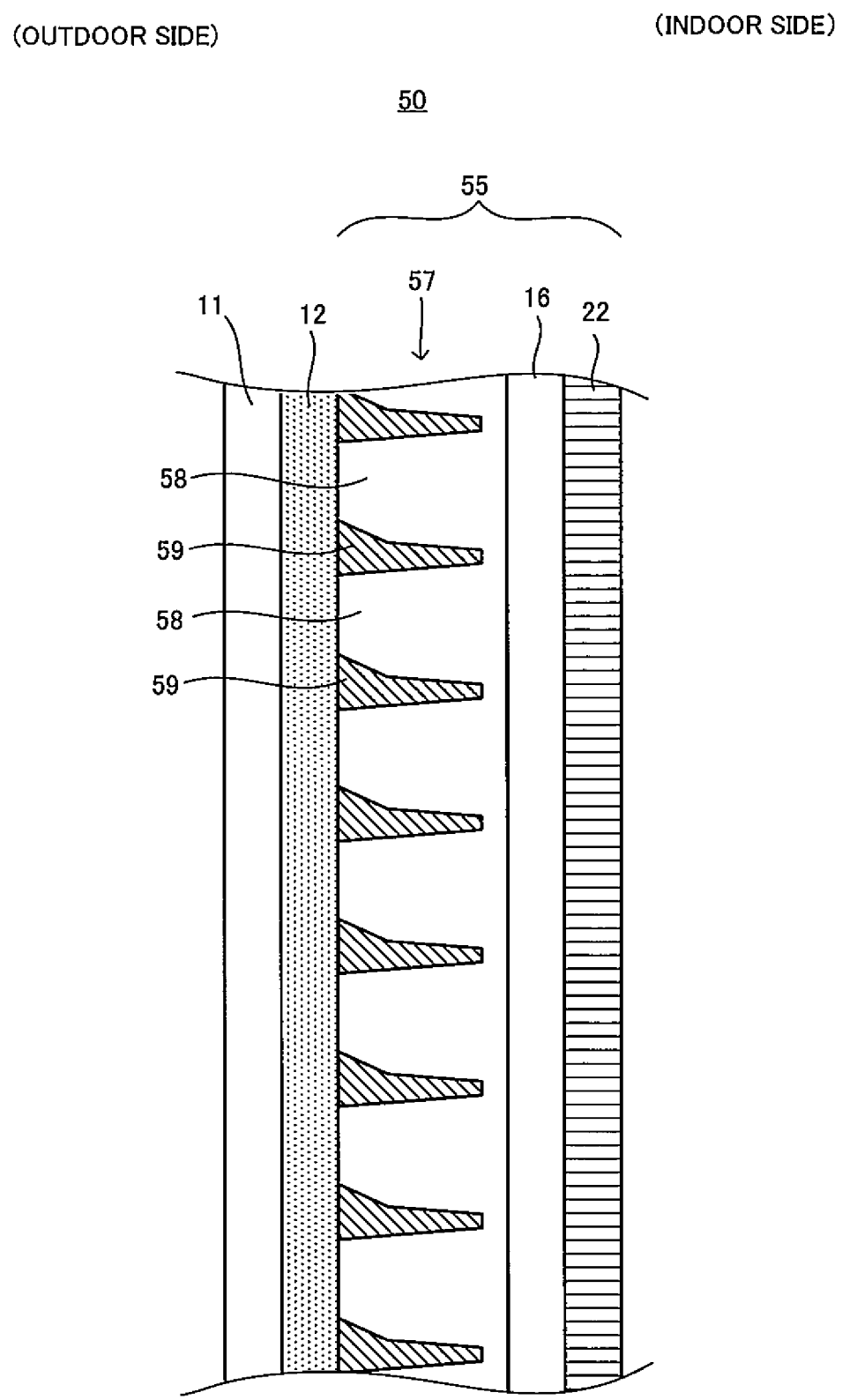
FIG. 11 A diagram showing a cross section of a daylighting panel 50 and schematically showing the configuration of its layers.

FIG. 11 is a diagram illustrating a fourth embodiment, is a cross-sectional view schematically showing the configuration of the layers of a daylighting panel 50 and corresponds to FIG. 3. In FIG. 11, portions having the same configuration as in FIG. 3 are identified with the same symbols, and their description will not be repeated.

The daylighting panel 50 includes the panel 11, the adhesive layer 12 and a daylighting sheet 55 that is adhered to the panel 11 with the adhesive layer 12. The daylighting sheet 55 also includes a light deflection layer 57, the base material layer 16 and the hard coat layer 22.

The light deflection layer 57 includes a light transmission portion 58 and a light deflection portion 59. The light transmission portion 58 has a cross section shown in FIG. 11, and is arranged so as to extend in one direction (the horizontal direction in the position arranged in the building 1) along the surface of the base material layer 16, and a plurality of light transmission portions 58 are aligned in a predetermined distance in a direction different from the one direction along the surface of the base material layer 16 (the vertical direction in the position arranged in the building 1). In the present embodiment, adjacent light transmission portions 58 are integrally coupled at the end portions on the side of the base material layer 16.

On the other hand, the light deflection portion 59 is arranged between the adjacent light transmission portions 58.

Figure 12:
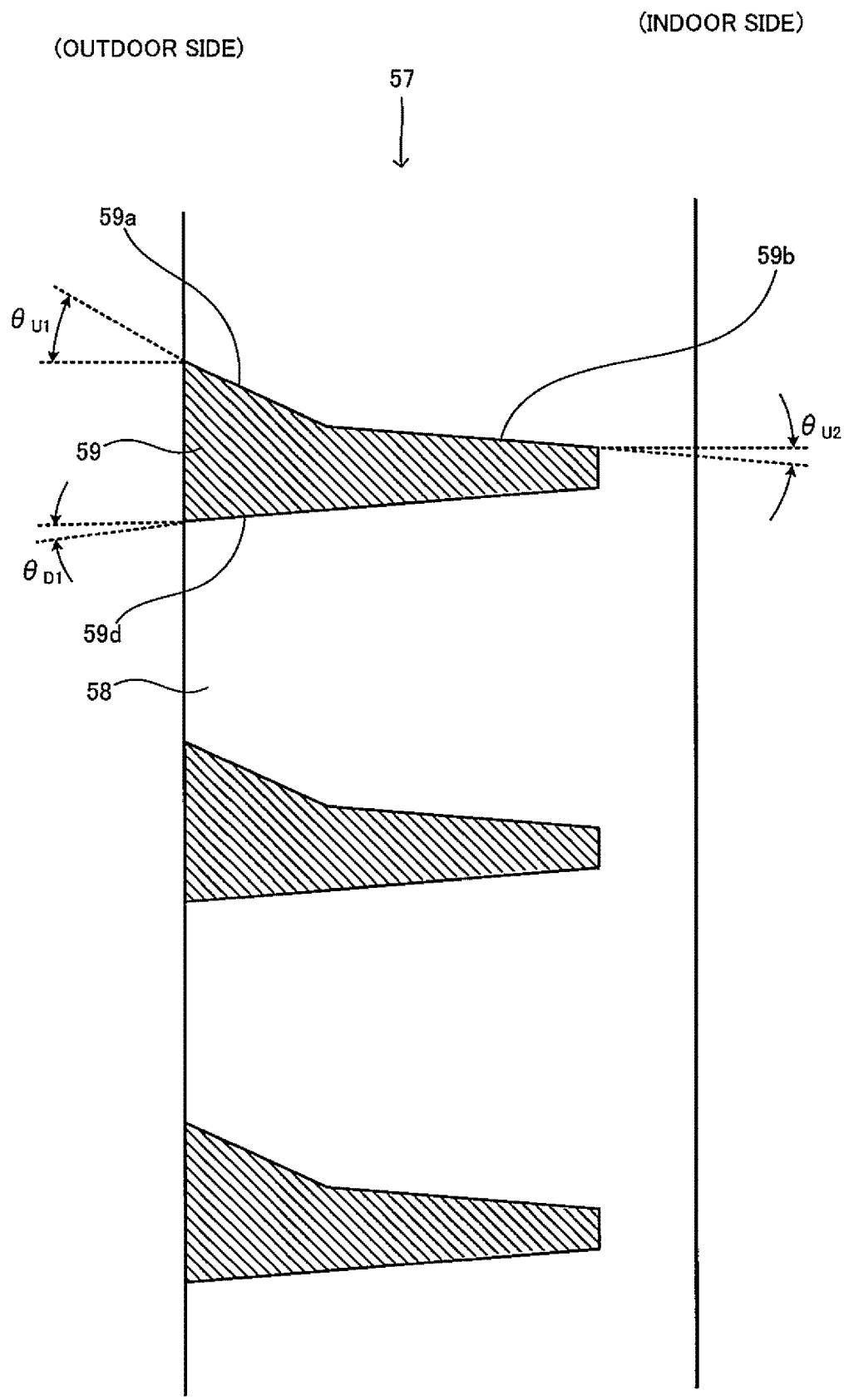
FIG. 12 A diagram of an enlarged part of a light deflection layer 57.

FIG. 12 shows a diagram of an enlarged part of the light deflection layer 57.

The light transmission portion 58 is a part that transmits light, and the surface of a part of the light deflection layer 57 where the light transmission portion 58 is arranged on the side of the base material layer 16 and the surface (the surface on the side of the adhesive layer 12) on the opposite side are formed parallel to each other. Preferably, the light transmission portion 58 transmits light without the light scattered. In this way, the ease with which scenery on the back surface side is seen is enhanced. Here, the "transmits light without the light scattered" means that the part is formed without the intentional addition of a material for scattering the light or the like, and it is allowed that the light is inevitably scattered when the light is in the process of passing through the material.

In the present embodiment, in the cross section shown in FIGS. 11 and 12, the light transmission portion 58 has a substantially trapezoidal cross section between two light deflection portions 59 with a short upper base on the outdoor side and a long lower base on the indoor side, and a side that forms an interface with the light deflection portion 59 is a leg portion. However, since the leg portion is shaped along the shape of the light deflection portion 59, which will be described later, the leg portion is not necessarily straight.

The material of the light transmission portion 58 is the same as that of the light transmission portion 18 described above.

The light deflection portion 59 is a part that is formed between two adjacent light transmission portions 58. Specifically, as described above, the light transmission portions 58 are aligned in a predetermined distance in the direction along the sheet surface of the light transmission portion 58, and a concave portion having a predetermined shape is formed between the light transmission portions 58. The concave portion in the present embodiment is a groove that has a cross-sectional shape corresponding to the cross-sectional shape of the light deflection portion 59, and is filled with the material of the light deflection portion 59 to form the light deflection portion 59. Hence, the light deflection portion 59 has the cross-sectional shape based on the concave portion.

In the present embodiment, the light deflection portion 59 is a part that can totally reflect and deflect light applied here. Hence, the light deflection portion 59 is filled with the material whose refractive index is lower than that of the light transmission portion 58. Thus, when the light that has entered the light deflection portion 59 satisfies total reflection conditions by the refractive index difference between the light deflection portion 59 and the light transmission portion 58 and a relationship of the angle of the light entering the interface, it is possible to totally reflect and deflect the light here. As will be described in detail later, the deflected light is changed in direction, and for example, the light is applied to the ceiling, and thus it is possible to prevent the light from being directly applied without glare being given. In terms of general versatility of a raw material, the refractive index of the material of the light deflection portion 59 is preferably equal to or more than 1.49 but equal to or less than 1.56, and is more preferably equal to or more than 1.49 but equal to or less than 1.50.

Here, the refractive index difference between the light transmission portion 58 and the light deflection portion 59 is equal to or more than 0.03 but equal to or less than 0.07, and is more preferably equal to or more than 0.05 but equal to or less than 0.06. When the refractive index difference is more than 0 but less than 0.03, if wavelength dispersion (dispersion caused by the difference of total reflection angles due to the wavelengths) at the time of total reflection occurs, the component of a long wavelength may not be totally reflected and only the component of a short wavelength may be totally reflected, with the result that the color is likely to be changed. On the other hand, when the refractive index difference is more than 0.06, the refractive index of the component of the short wavelength tends to be higher than the refractive index of the component of the long wavelength, with the result that unevenness in the shape of a rainbow is likely to occur remarkably.

Furthermore, in the present embodiment, the light deflection portion 59 has a shape as described below. A description will be given with reference to FIG. 12.

In a cross section shown in FIG. 12, the light deflection portion 59 has a polygonal shape. Among them, in the position where the daylighting panel 50 is arranged in the building 1, the upper portion side is arranged such that two sides 59a and 59b are continuous in an indoor/outdoor direction, and is formed to be convex downward. In other words, the side 59a is arranged on the outdoor side, and the side 59b is arranged on the indoor side.

In the position shown in FIG. 12, these two sides 59a and 59b respectively have, as their inclination angles, different angles $\theta_{U1}$ and $\theta_{U2}$ with respect to the horizontal surface (the normal to the sheet surface of the daylighting sheet 55). Here, the angles $\theta_{U1}$ and $\theta_{U2}$ are inclined with their upper portions toward the outdoor side (the side of the sun), and the angle $\theta_{U1}$ is assumed to be larger than the angle $\theta_{U2}$. In this way, with consideration given to the altitude of the sun different depending on the season and the time, it is possible to extend the case where it is possible to totally reflect and deflect the sunlight in the interface between the light transmission portion 58 and the light deflection portion 59. Hence, the angles $\theta_{U1}$ and $\theta_{U2}$ are preferably determined in terms of what has been described above. A detailed description will be given later using an optical path example.

On the other hand, the side 59d of the lower portion side opposite to the sides 59a and 59b is assumed to have, as its inclination angle, an angle $\theta_{D1}$ with respect to the horizontal surface (the normal to the sheet surface of the daylighting sheet 55). The angle $\theta_{D1}$ is not particularly limited but is preferably equal to or more than 0 degrees but equal to or less than 30 degrees in terms of manufacturing.

FIG. 13 shows cross-sectional shapes of light deflection portions according to variations.

Figure 13A:
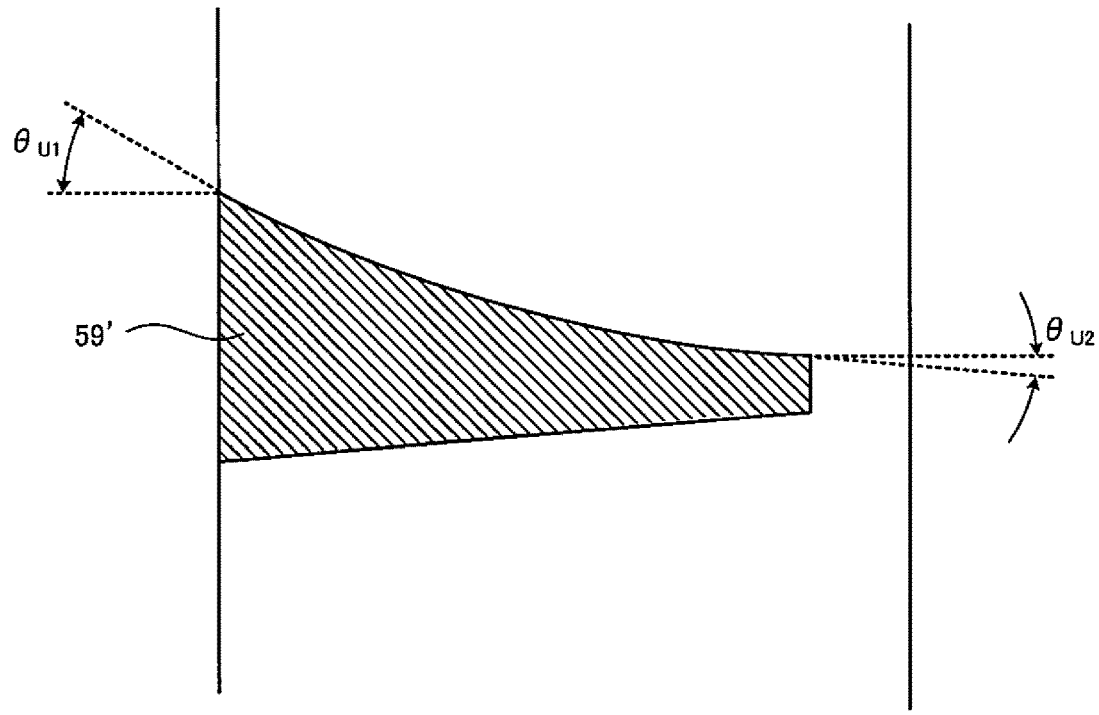
FIG. 13(a) is a diagram illustrating a light deflection portion 59'.

FIG. 13(a) shows an example of a light deflection portion 59' in which the side on the upper portion side is convex downward (that is, concave). In this example, preferably, the inclination angle of a tangent at a part closest to the outdoor side is an angle $\theta_{U1}$ with respect to the horizontal surface (the normal to the sheet surface of the daylighting sheet 50), and the inclination angle of a tangent at a part closest to the indoor side is an angle $\theta_{U2}$ with respect to the horizontal surface (the normal to the sheet surface of the daylighting sheet 50).

Figure 13B:
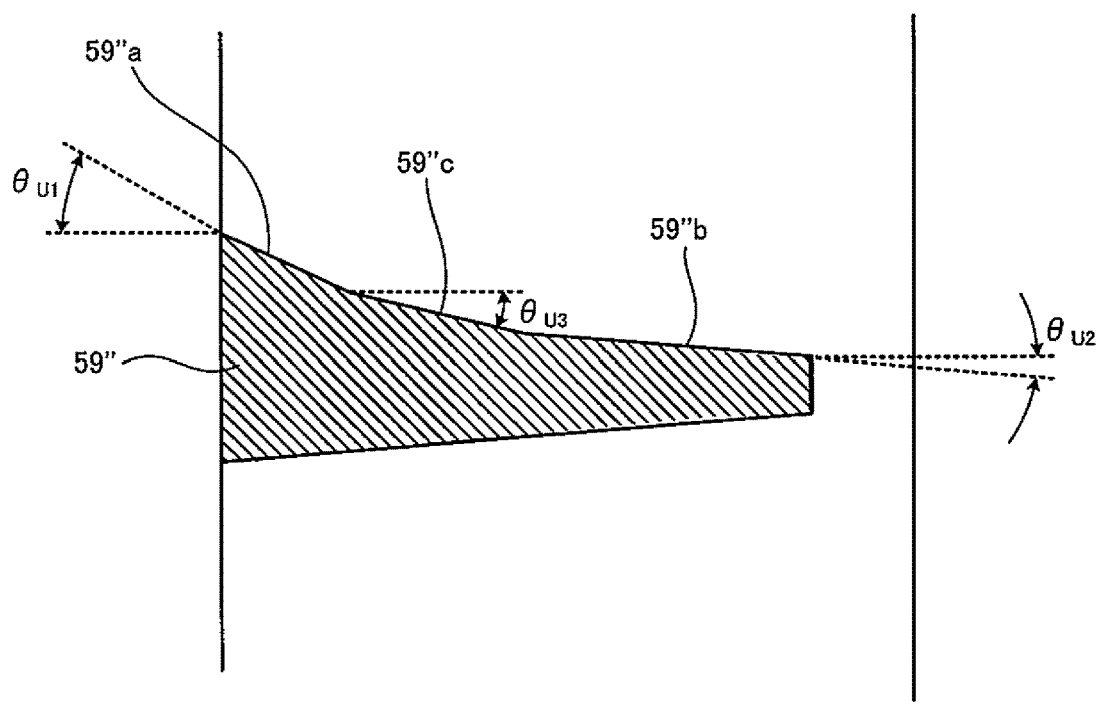
FIG. 13(b) is a diagram illustrating a light deflection portion 59"

FIG. 13(b) shows an example of a light deflection portion 59" in which the side on the upper portion side is formed with three sides 59"a, 59"c and 59"b as seen sequentially from the outdoor side, and is convex downward (that is, concave). In this example, preferably, the inclination angle of the side 59"a closest to the outdoor side is an angle $\theta_{U1}$ with respect to the horizontal surface (the normal to the sheet surface of the daylighting sheet 50), the inclination angle of the side 59"b closest to the indoor side is an angle $\theta_{U2}$ with respect to the horizontal surface (the normal to the sheet surface of the daylighting sheet 50) and the inclination angle of the side 59"c arranged therebetween is an angle $\theta_{U3}$ with respect to the horizontal surface (the normal to the sheet surface of the daylighting sheet 50), and satisfies an inequality $\theta_{U2} < \theta_{U3} < \theta_{U1}$.

Although here, the example where the light deflection portion is formed with the three sides 59"a, 59"c and 59"b has been described, the present invention is not limited to this configuration, and the light deflection portion may be formed with a larger number of sides.

Even with the light deflection portions shown in FIGS. 13(a) and 13(b), the same effects as the light deflection portion having the shape shown in FIG. 12 are also achieved. Furthermore, with the shapes shown in FIGS. 13(a) and 13(b), it is possible to reduce the occurrence of unevenness in the shape of a rainbow caused by wavelength dispersion resulting from total reflection.

An effect in the case where the daylighting sheet 50 is arranged in the building 1 as described above, and the preferable values of the angles $\theta_{U1}$ and $\theta_{U2}$ described above will now be described based on main optical paths. Optical path examples necessary for the description will be shown, as necessary, in drawings below.

Figure 14:
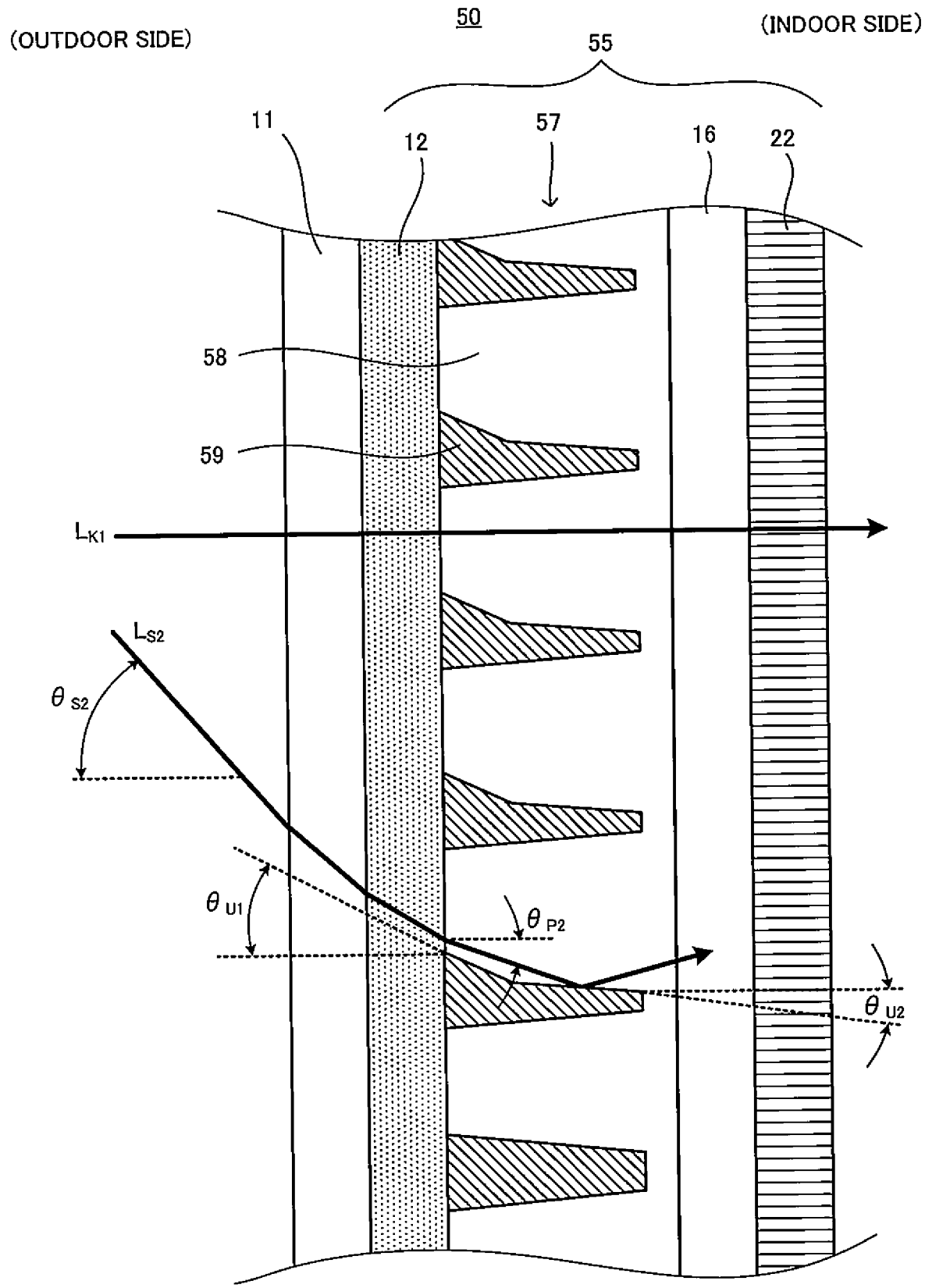
FIG. 14 A diagram illustrating an optical path example in a light deflection layer 57.

FIG. 14 shows light $L_{S2}$ from the sun as one optical path example. As is obvious from FIG. 14, the light $L_{S2}$ is applied to the daylighting panel 50 at an elevation angle (an angle formed from the horizontal surface) $\theta_{S2}$ based on the altitude of the sun at that time. While the light $L_{S2}$ entering the daylighting panel 50 passes through the daylighting panel 50, the light $L_{S2}$ travels through the light transmission portion 58 of the light deflection layer 57. Within the light transmission portion 58, when it is assumed that the refractive index of the light transmission portion is $N_P$, and the refractive index of the outdoor side is No, the light $L_{S2}$ travels at a sunlight travel angle $\theta_{P2}$ expressed in formula (9).

[Formula 9]

$$\theta_{P2} = \sin^{-1}\left(\frac{N_O}{N_P}\sin\theta_{S2}\right) \quad (9)$$

When the sunlight traveling at the sunlight travel angle $\theta_{P2}$ reaches a part whose inclination angle is $\theta_{U2}$ in the interface between the light transmission portion 58 and the light deflection portion 59, if the refractive index difference between the light transmission portion 58 and the light deflection portion 59 and a relationship of the sunlight travel angle $\theta_{P2}$ are equal to or more than the critical angle of total reflection, total reflection occurs in the interface as shown in FIG. 14. In this way, the sunlight is deflected, and thus it is possible to reduce direct light that causes glare.

Figure 15:
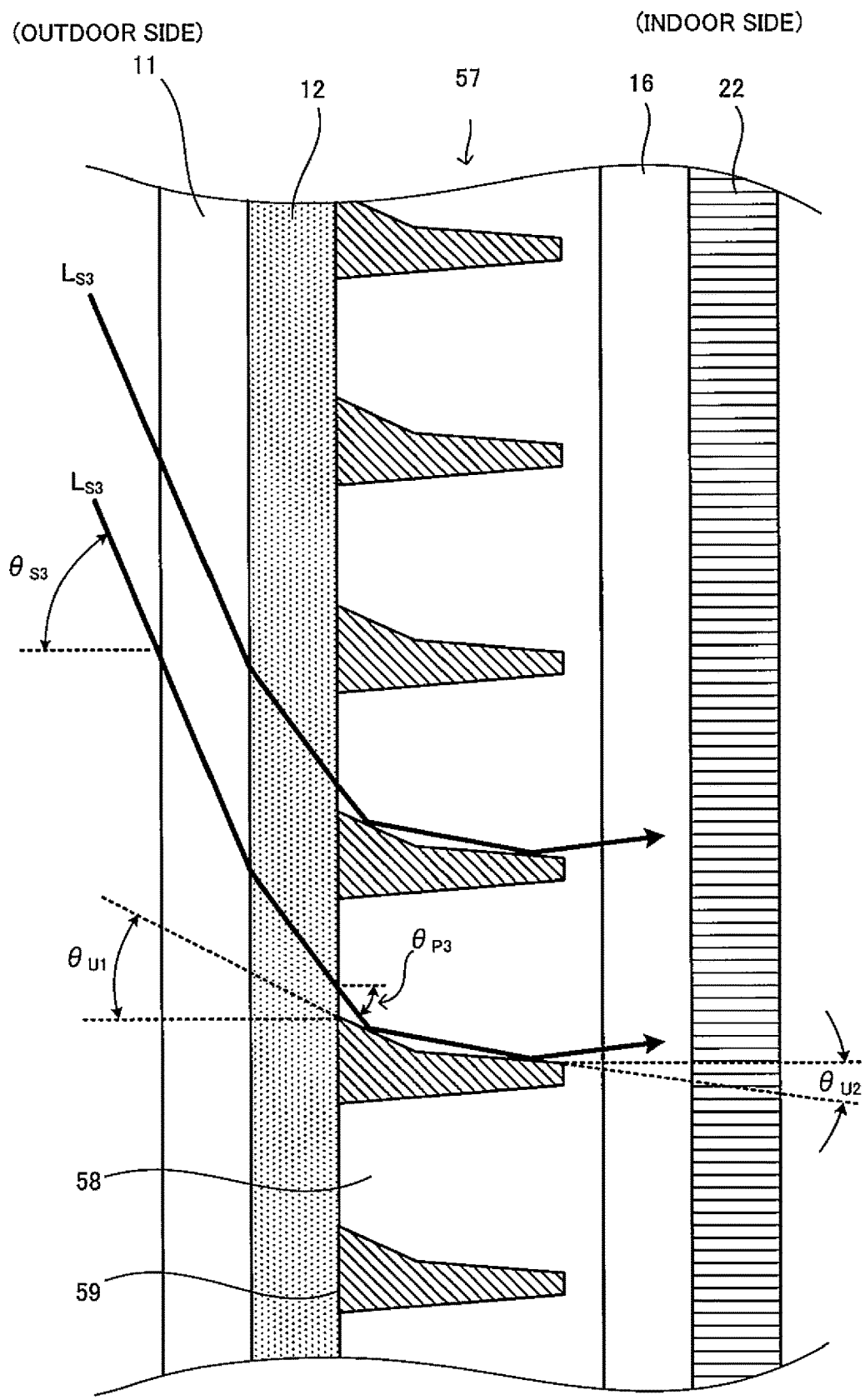
FIG. 15 A diagram illustrating another optical path example in the light deflection layer 57.

FIG. 15 shows light $L_{S3}$ from the sun as another optical path example. As is obvious from FIG. 15, the light $L_{S3}$ is applied to the daylighting panel 50 at an elevation angle (an angle formed from the horizontal surface) $\theta_{S3}$ based on the altitude of the sun at that time. Here, the angle $\theta_{S3}$ is larger than the angle $\theta_{S2}$. While the light $L_{S3}$ entering the daylighting panel 50 passes through the daylighting panel 50, the light $L_{S3}$ travels through the light transmission portion 58 of the light deflection layer 57. Within the light transmission portion 58, when it is assumed that the refractive index of the light transmission portion is $N_P$, and the refractive index of the outdoor side is $N_O$, the light $L_{S3}$ travels at a sunlight travel angle $\theta_{P3}$ expressed in formula (10).

[Formula 10]

$$\theta_{P3} = \sin^{-1}\left(\frac{N_O}{N_P}\sin\theta_{S3}\right) \quad (10)$$

In this example, when the sunlight traveling at the sunlight travel angle $\theta_{P3}$ reaches a part whose inclination angle is $\theta_{U1}$ in the interface between the light transmission portion 58 and the light deflection portion 59, if the refractive index difference between the light transmission portion 58 and the light deflection portion 59 and a relationship of the sunlight travel angle $\theta_{P3}$ are equal to or more than the critical angle of total reflection, total reflection occurs in the interface as shown in FIG. 15. Thus, the sunlight travels through the light transmission portion 58 at an elevation angle lower than the sunlight travel angle $\theta_{P3}$, and furthermore, reaches a part whose inclination angle arranged on the indoor side is $\theta_{U2}$, where the sunlight is totally reflected. In this way, the sunlight is deflected, and thus it is possible to reduce direct light that causes glare.

In other words, in this example, the sunlight is totally reflected twice at the part whose inclination angle is $\theta_{U1}$ and at the part whose inclination angle is $\theta_{U2}$ in the interface between the light transmission portion 58 and the light deflection portion 59, and is deflected, with the result that direct light that causes glare is inhibited.

If the entire inclination angle of the light deflection portion is $\theta_{U2}$, since the light $L_{S3}$ enters the light transmission portion at the elevation angle (sunlight travel angle) $\theta_{P3}$, the $L_{S3}$ cannot be totally reflected in the interface between the light deflection portion and the light transmission portion, passes through it and enters the room as direct light.

On the other hand, with the light deflection portion 59, it is possible to totally reflect and deflect even the light $L_{S3}$ described above such that the light $L_{S3}$ does not become direct light.

As is obvious from what has been described, with the daylighting sheet 50, when the inclination angles $\theta_{U1}$ and $\theta_{U2}$ have a relationship of $\theta_{U1} > \theta_{U2}$, it is possible to totally reflect and deflect at least part of the sunlight, such as the light $L_{S2}$ and light $L_{S3}$, whose travel angles are different and thereby supply it to the indoor side, and it is also possible to eliminate at least part of direct light (so-called direct sunlight) without significantly reducing the amount of sunlight entering the room. In this way, it is possible to form a brighter and more comfortable indoor space.

Furthermore, in the daylighting sheet 50, as described above, the light transmission portion 58 is provided, and the front and back surface of the light deflection layer 57 on the parts where the light transmission portion 58 are to be arranged are formed parallel and smoothly. Thus, as in the example of the other embodiment, it is possible to visually recognize scenery on the outdoor side from the indoor side.

Here, the deflected direction depends on the sunlight travel angle $\theta_P$ that is an angle at the time of entrance of the interface and the inclination angles $\theta_{U1}$ and $\theta_{U2}$ of the light deflection portion. Hence, here, the inclination angles $\theta_{U1}$ and $\theta_{U2}$ are preferably determined such that the totally reflected light is finally upward as compared with the horizontal surface.

As described above, when $\theta_{U1} > \theta_{U2}$, with the daylighting sheet 50, it is possible to efficiently take sunlight into the room and to simultaneously eliminate at least part of direct light. However, in order to more effectively totally reflect sunlight at the light deflection portion 59 and deflect and emit the sunlight to the indoor side, it is possible to specify preferable inclination angles $\theta_{U1}$ and $\theta_{U2}$. A detailed description will be given below.

As is obvious from the optical path example described above, when the elevation angle of the sun is high, the inclination angle $\theta_{U1}$ can set an angle at which it is possible to appropriately totally reflect the sunlight entered the daylighting sheet. Thus, for example, it is possible to set the elevation angle $\theta_{SH}$ when the culmination altitude is the highest in one year. Specifically, since the sunlight travel angle $\theta_{PH}$ within the light transmission portion when the elevation angle is set at the elevation angle $\theta_{SH}$ is expressed in formula (2) described above, the inclination angle $\theta_{U1}$ is set such that the light travelling at the angle $\theta_{PH}$ can be totally reflected. However, since the elevation angle $\theta_{SH}$ is different depending on the latitude, it is possible to specify the range of the inclination angle $\theta_{U1}$ by specifying a range from $\theta_{SH1}$ to $\theta_{SH2}$ ($\theta_{SH1} < \theta_{SH2}$) in a predetermined range (for example, countries and areas) extending over different latitudes. In other words, it is possible to set formula (11) at the preferable range of the inclination angle $\theta_{U1}$.

[Formula 11]

$$\sin^{-1}\left(\frac{N_O}{N_P}\sin\theta_{SH1}\right) \leq \theta_{U1} \leq \sin^{-1}\left(\frac{N_O}{N_P}\sin\theta_{SH2}\right) \quad (11)$$

Here, since table 1 holds true for Japan, the inclination angle $\theta_{U1}$ preferably falls within the range of formula (12).

[Formula 12]

$$\sin^{-1}\left(\frac{N_O}{N_P}\sin 70.5°\right) \leq \theta_{U1} \leq \sin^{-1}\left(\frac{N_O}{N_P}\sin 87.5°\right) \quad (12)$$

On the other hand, as is obvious from the optical path example described above, when the elevation angle of the sun is low, it is possible to set an angle at which it is possible to appropriately totally reflect the sunlight entering the daylighting sheet. Thus, for example, it is possible to set the elevation angle $\theta_{SL}$, the elevation angle which can be set when the culmination altitude is the lowest in one year. Specifically, since the sunlight travel angle $\theta_{PL}$ within the light transmission portion when the elevation angle is set at the elevation angle $\theta_{SL}$ is expressed in formula (5) described above, the inclination angle $\theta_{U2}$ is set such that the light travelling at the angle $\theta_{PL}$ can be totally reflected.

However, since the elevation angle $\theta_{PL}$ is different depending on the latitude, it is possible to specify the range of the inclination angle $\theta_{U2}$ by specifying a range from $\theta_{SL1}$ to $\theta_{SL2}$ ($\theta_{SL1} < \theta_{SL2}$) in a predetermined range (for example, countries and areas) extending over different latitudes. Here, since it is difficult to perform the manufacturing when the inclination angle $\theta_{U2}$ is less than 0 degrees (inclined oppositely with respect to FIG. 12), the inclination angle $\theta_{U2}$ is preferably equal to or more than 0 degrees. In this way, it is possible to set formula (13) at the preferable range of the inclination angle $\theta_{U2}$.

[Formula 13]

$$0° \leq \theta_{U2} \leq \sin^{-1}\left(\frac{N_O}{N_P}\sin\theta_{SL2}\right) \quad (13)$$

Here, since in Japan, the elevation angle $\theta_{SL}$, in Okinawa is 40.5 degrees, the inclination angle $\theta_{U2}$ preferably falls within a range of formula (14).

[Formula 14]

$$0° \leq \theta_{U2} \leq \sin^{-1}\left(\frac{N_O}{N_P}\sin 40.5°\right) \quad (14)$$

Figure 16:
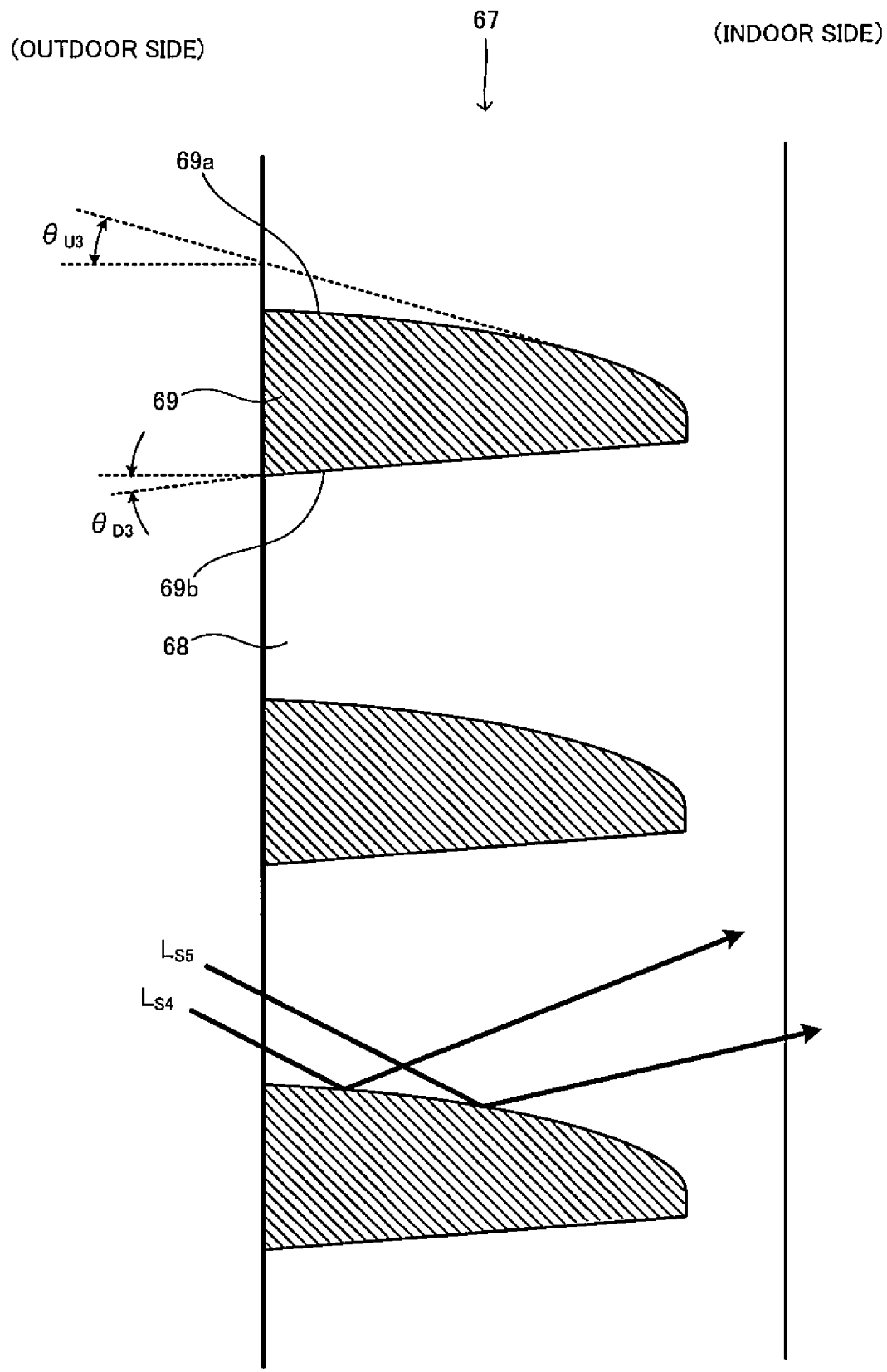
FIG. 16 A diagram of an enlarged part of a light deflection layer 67.

FIG. 16 is a diagram illustrating a fifth embodiment, is a diagram of an enlarged part of a cross section of a light deflection layer 67 included in the fifth embodiment and corresponds to FIG. 12. Since the present embodiment is characterized in the cross-sectional shape of the light deflection layer 67, only the light deflection layer 67 will be described. The other parts are the same as described above.

The light deflection layer 67 includes a light transmission portion 68 and a light deflection portion 69. The light transmission portion 68 has a cross section shown in FIG. 16, and is arranged so as to extend in one direction (the horizontal direction in the position arranged in the building 1) along the surface of the base material layer, and a plurality of light transmission portions 68 are aligned in a predetermined distance in a direction different from the one direction along the surface of the base material layer (the vertical direction in the position arranged in the building 1). In the present embodiment, adjacent light transmission portions 68 are integrally coupled at the end portions on the side of the base material layer.

On the other hand, the light deflection portion 69 is arranged between the adjacent light transmission portions 68.

The light transmission portion 68 is a part that transmits light, and the surface of a part of the light deflection layer 67 where the light transmission portion 68 is arranged on the side of the base material layer 16 (see FIG. 11) and the surface (the surface on the side of the adhesive layer 12, see FIG. 11) on the opposite side are preferably formed parallel to each other and smoothly. In this way, it is possible to more easily see scenery on the outdoor side as described above.

In the present embodiment, in the cross section shown in FIG. 16, the light transmission portion 68 has a substantially trapezoidal cross section between two light deflection portions 69 with a short upper base on the outdoor side and a long lower base on the indoor side, and a side that forms an interface with the light deflection portion 69 is a leg portion. However, since the leg portion is shaped along the shape of the light deflection portion 69, which will be described later, the leg portion is not necessarily straight.

The light deflection portion 69 is a part that is formed between two adjacent light transmission portions 68. Specifically, as described above, the light transmission portions 68 are aligned in a predetermined distance in the direction along the sheet surface of the light transmission portion 68, and a groove-shaped concave portion having a predetermined shape is formed between the light transmission portions 68. The concave portion in the present embodiment is a groove that has a cross-sectional shape corresponding to the cross-sectional shape of the light deflection portion 69, and is filled with the material of the light deflection portion 69 to form the light deflection portion 69. Hence, the light deflection portion 69 has the cross-sectional shape based on the concave portion.

The light deflection portion 69 is a part that can totally reflect and deflect light applied to the light deflection portion 69. Hence, the light deflection portion 69 is filled with the material whose refractive index is lower than that of the light transmission portion 68. Thus, when the light that has entered the light deflection portion 69 satisfies total reflection conditions by the refractive index difference between the light deflection portion 69 and the light transmission portion 68 and a relationship of the angle of the light entering the interface, it is possible to totally reflect and deflect the light in the light deflection portion 69. As will be described in detail later, the deflected light is changed in direction, and for example, the light is applied to the ceiling, and thus it is possible to prevent the light from being directly applied without glare being given. In terms of general versatility of a raw material, the refractive index of the material of the light deflection portion 69 is preferably equal to or more than 1.49 but equal to or less than 1.56, and is more preferably equal to or more than 1.49 but equal to or less than 1.50.

Here, the refractive index difference between the light transmission portion 68 and the light deflection portion 69 is equal to or more than 0.03 but equal to or less than 0.07, and is more preferably equal to or more than 0.05 but equal to or less than 0.06. When the refractive index difference is more than 0 but less than 0.03, if wavelength dispersion (dispersion caused by the difference of total reflection angles due to the wavelengths) at the time of total reflection occurs, the component of a long wavelength may not be totally reflected and only the component of a short wavelength may be totally reflected, with the result that the color is likely to be changed. On the other hand, when the refractive index difference is more than 0.07, the refractive index of the component of the short wavelength tends to be higher than the refractive index of the component of the long wavelength, with the result that unevenness in the shape of a rainbow is likely to occur remarkably.

Furthermore, in the present embodiment, the light deflection portion 69 has a shape as described below. A description will be given with reference to FIG. 16.

As described above, the light deflection portion 69 is shaped along the concave portion between adjacent light transmission portions 68, and has, in the cross section shown in FIG. 16, an upper portion side 69a and a lower portion side 69b. Among them, the upper portion side 69a is formed to be curved such that the side 69a is convex upward. In this way, as described later, the light totally reflected off the side 69a of the light deflection portion 69 is widely diffused, and thus it is possible to prevent the light from being concentrated in a narrow range. A detailed description will be given below using an optical path example.

As long as the side 69a is convex upward in the position shown in FIG. 16 as described above, the side 69a is not particularly limited. As the examples of this, there are an example where the side 69a is formed with a polygonal line in which a plurality of straight lines are continuous and an example where the side 69a is formed with a curve.

Preferably, when the side 69a is curved, as shown in FIG. 16, a tangent in an arbitrary position has an angle $\theta_{U3}$ with respect to the horizontal surface (the normal to the sheet surface of the daylighting sheet), and is inclined such that its upper portion is toward the outdoor side (the side of the sun), and the angle $\theta_{U1}$ in each part of the side 69a is continuously changed from the outdoor side to the indoor side. Thus, it is possible to make the above effects more remarkable. Although the range of the angle $\theta_{U3}$ is not particularly limited, in a center portion of the light deflection portion 69 in the indoor/outdoor direction, the angle $\theta_{U1}$ is preferably more than 0 degrees but less than 30 degrees.

On the other hand, the side 69b of the lower portion side opposite to the side 69a is assumed to have, as its inclination angle, an angle $\theta_{D3}$ with respect to the horizontal surface (the normal to the sheet surface of the daylighting sheet). The angle $\theta_{D3}$ is not particularly limited but is preferably equal to or more than 0 degrees but equal to or less than 30 degrees in terms of manufacturing.

A daylighting unit is formed with the daylighting panel having the daylighting sheet including the light deflection layer 67 described above, and is arranged in the opening portion of the building 1 as shown in FIG. 1. Effects in a case where the daylighting sheet is arranged as described above will now be described based on main optical paths. Optical path examples necessary for the description are shown in FIG. 16.

FIG. 16 shows light $L_{S4}$ and light $L_{S5}$ from the sun as optical path examples. As is obvious from FIG. 16, the light $L_{S4}$ and the light $L_{S5}$ are two types of light that are applied to different positions of the daylighting panel at an elevation angle (an angle formed from the horizontal surface) based on the altitude of the sun at that time. While the light $L_{S4}$ and the light $L_{S5}$ entering the daylighting panel pass through the daylighting panel 12, the light $L_{S4}$ and the light $L_{S5}$ travel through the light transmission portion 68 of the light deflection layer 67. When the sunlight travelling through the light transmission portion 68 reaches the interface between the light transmission portion 68 and the light deflection portion 69, if the refractive index difference between the light transmission portion 68 and the light deflection portion 69 and a relationship of the sunlight travel angle are equal to or more than the critical angle of total reflection, total reflection occurs in the interface as shown in FIG. 16. In this way, the sunlight is deflected, and thus it is possible to reduce direct light that causes glare. Here, the light $L_{S4}$ and the light $L_{S5}$ that were parallel to each other at the time of the entrance reach different positions of the side 69a of the light deflection portion 69. Since the side 69a is formed to be convex as described above, the light $L_{S4}$ and the light $L_{S5}$ are totally reflected in different directions. In this way, the reflected light travels in the different directions, and is diffused, and thus it is possible to prevent the reflected light from being concentrated in a narrow range. Hence, it is possible to take light into a wide range on the indoor side.

As is obvious from what has been described, in the daylighting sheet, it is possible to eliminate at least part of direct light (so-called direct sunlight) without significantly reducing the amount of sunlight entering the room. In this way, it is possible to form a brighter and more comfortable indoor space. In this case, in the present embodiment, since the light taken into the indoor side is diffused in a wide range of the indoor side, it is possible to efficiently brighten the indoor side.

Furthermore, in the daylighting sheet of the present embodiment, as described above, the light transmission portion 68 is provided, and the front and back surface of the light deflection layer 67 on the parts arranged in the light transmission portions 68 are formed parallel and smoothly. Thus, as in the other embodiments described above, it is possible to visually recognize scenery on the outdoor side from the indoor side.

Figure 17:
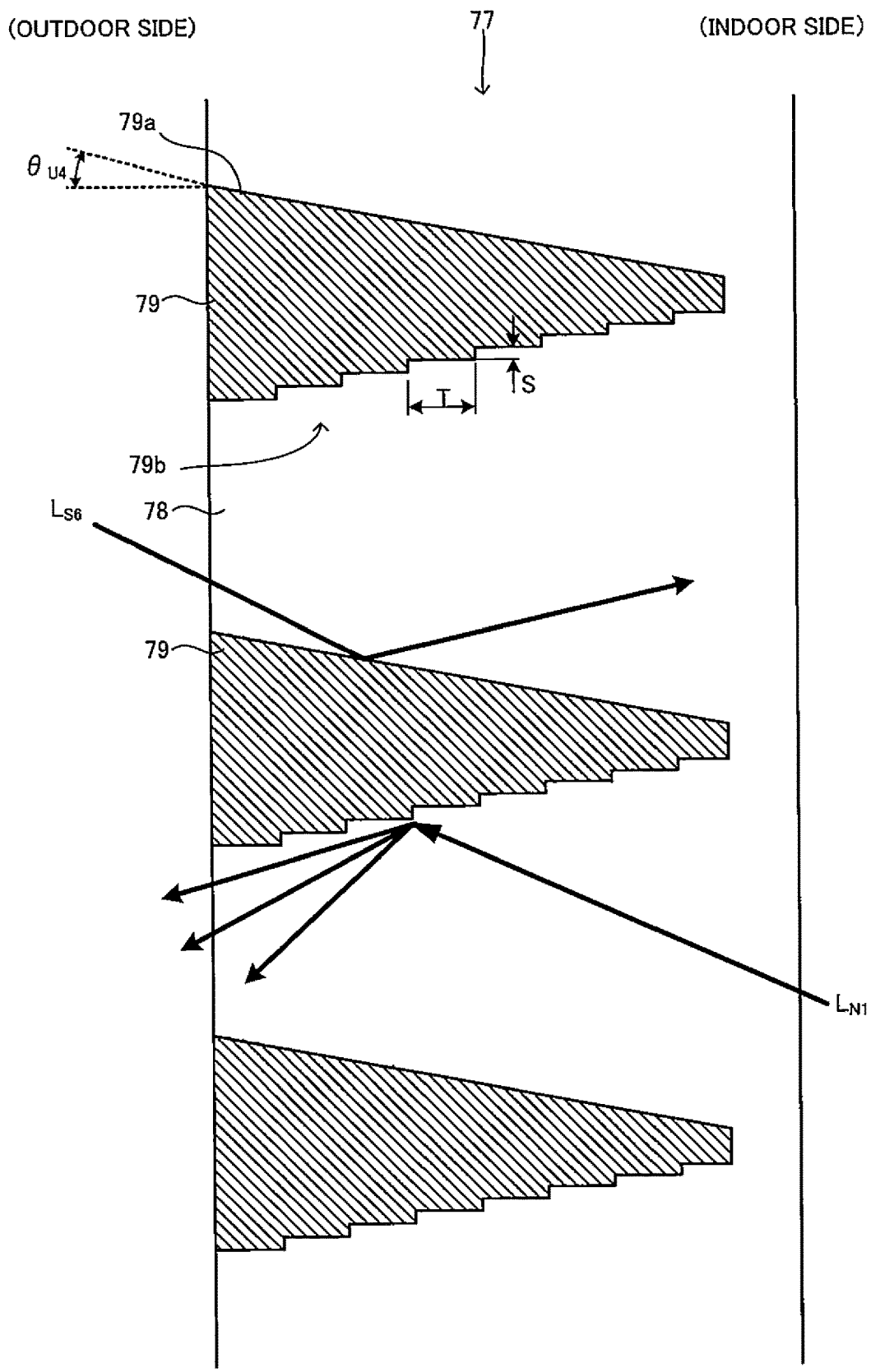
FIG. 17 A diagram of an enlarged part of a light deflection layer 77.

FIG. 17 is a diagram illustrating a sixth embodiment, is a diagram of an enlarged part of a cross section of a light deflection layer 77 included in the sixth embodiment and corresponds to FIG. 12. Since the present embodiment is characterized in the cross-sectional shape of the light deflection layer 77, only the light deflection layer 77 will be described. The other parts are the same as described above.

The light deflection layer 77 includes a light transmission portion 78 and a light deflection portion 79. The light transmission portion 78 has a cross section shown in FIG. 17, and is arranged so as to extend in one direction (the horizontal direction in the position arranged in the building 1) along the surface of the base material layer, and a plurality of light transmission portions 78 are aligned in a predetermined distance in a direction different from the one direction along the surface of the base material layer (the vertical direction in the position arranged in the building 1). In the present embodiment, adjacent light transmission portions 78 are integrally coupled at the end portions on the side of the base material layer.

On the other hand, the light deflection portion 79 is arranged between the adjacent light transmission portions 78.

The light transmission portion 78 is a part that transmits light, and the surface of a part of the light deflection layer 77 where the light transmission portion 78 is arranged on the side of the base material layer 16 (see FIG. 11) and the surface (the surface on the side of the adhesive layer 12, see FIG. 11) on the opposite side are preferably formed parallel to each other and smoothly. In this way, it is possible to more easily see scenery on the outdoor side as in the embodiments described above.

In the present embodiment, in the cross section shown in FIG. 17, the light transmission portion 78 has a substantially trapezoidal cross section between adjacent light deflection portions 79 with a short upper base on the outdoor side and a long lower base on the indoor side, and a side that forms an interface with the light deflection portion 77 is a leg portion. However, since the leg portion is shaped along the shape of the light deflection portion 79, which will be described later, the leg portion is not necessarily straight.

The light deflection portion 79 is a part that is formed between two adjacent light transmission portions 78. Specifically, as described above, the light transmission portions 78 are aligned in a predetermined distance in the direction along the sheet surface of the light transmission portion 78, and a groove-shaped concave portion having a predetermined shape is formed between the light transmission portions 78. The concave portion in the present embodiment is a groove that has a cross-sectional shape corresponding to the cross-sectional shape of the light deflection portion 79, and is filled with the material of the light deflection portion 79 to form the light deflection portion 79. Hence, the light deflection portion 79 has the cross-sectional shape based on the concave portion.

The light deflection portion 79 is a part that can totally reflect and deflect light applied here. Hence, the light deflection portion 79 is filled with the material whose refractive index is lower than that of the light transmission portion 78. Thus, when the light that has entered the light deflection portion 79 satisfies total reflection conditions by the refractive index difference between the light deflection portion 79 and the light transmission portion 78 and a relationship of the angle of the light entering the interface, it is possible to totally reflect and deflect the light here. As will be described in detail later, the deflected light is changed in direction, and for example, the light is applied to the ceiling, and thus it is possible to prevent the light from being directly applied without glare being given. In terms of general versatility of a raw material, the refractive index of the material of the light deflection portion 79 is preferably equal to or more than 1.49 but equal to or less than 1.56, and is more preferably equal to or more than 1.49 but equal to or less than 1.50.

Here, the refractive index difference between the light transmission portion 78 and the light deflection portion 79 is equal to or more than 0.03 but equal to or less than 0.07, and is more preferably equal to or more than 0.05 but equal to or less than 0.06. When the refractive index difference is more than 0 but less than 0.03, if wavelength dispersion (dispersion caused by the difference of total reflection angles due to the wavelengths) at the time of total reflection occurs, the component of a long wavelength may not be totally reflected and only the component of a short wavelength may be totally reflected, with the result that the color is likely to be changed. On the other hand, when the refractive index difference is more than 0.07, the refractive index of the component of the short wavelength tends to be higher than the refractive index of the component of the long wavelength, with the result that unevenness in the shape of a rainbow is likely to occur remarkably.

Furthermore, in the present embodiment, the light deflection portion 79 has a shape as described below. A description will be given with reference to FIG. 17.

The light deflection portion 79 has a trapezoid in a cross section shown in FIG. 17. In the trapezoid, a long lower base is on the outdoor side (the side of the upper base of the light transmission portion 78), a short upper base is on the indoor side (the side of the lower base of the light transmission portion 78) and leg portions are on the upper side and the lower side.

In the side 79a on the upper side of the leg portions, in the position shown in FIG. 17, its inclination angle is inclined at an angle $\theta_{U4}$ with respect to the horizontal surface (the normal to the sheet surface of the daylighting sheet) toward the upper side of the outdoor side (the side of the sun).

On the other hand, in the side 79b on the side of the leg portion on the lower portion side, that is, on the opposite side to the side 79a, its inclination angle is inclined at a predetermined angle with respect to the horizontal surface (the normal to the sheet surface of the daylighting sheet) toward the lower side of the outdoor side. The inclination angle of the side 79b is not particularly limited but is preferably equal to or more than 0 degrees but equal to or less than 30 degrees in terms of the manufacturing.

Furthermore, the side 79b is configured to scatter and reflect the light totally reflected in the side 79b. Thus, as will be described later, it is possible to prevent a problem in which, when the daylighting sheet is looked up at from the outdoor side, it is possible to know the state on the indoor side.

Although the specific form for scattering and reflecting the light is not particularly limited, for example, the side 79b may be configured to have minute projections and recesses.

As shown in FIG. 17, the surface of the projections and recesses as described above is preferably stepwise along the inclination of the side 79b. Specifically, its shape is as follows. The size in the direction of thickness of the projections and recesses (the size indicated by T in FIG. 17) is preferably equal to or more than 1 μm but equal to or less than 50 μm. When the size is less than 1 μm, it is about the size of the wavelength of light, and thus it is likely that it is impossible to obtain the effect of total reflection in geometric optics. On the other hand, since the size in the direction of thickness of the light deflection layer 77 is preferably equal to or more than 50 μm but equal to or less than 300 μm, when T is more than 50 μm, the surface may not be stepwise.

The size in the direction of width of the projections and recesses (the size indicated by S in FIG. 17) is equal to or more than 0.5 μm, and more preferably is equal to or more than 1.0 μm. On the other hand, the size in the direction of width is preferably equal to or less than 10 μm. When the size is more than 10 μm, the size is excessively close to the width of the light deflection portion 79, and thus the surface may not be appropriately stepwise.

A daylighting unit is formed with the daylighting panel having the daylighting sheet including the light deflection layer 77 described above, and is arranged in the opening portion of the building 1 as shown in FIG. 1. Effects and the like in a case where the daylighting sheet is arranged as described above will now be described based on main optical paths.

As is obvious from FIG. 17, light $L_{S6}$ is light that is applied to the daylighting panel at an elevation angle (an angle formed from the horizontal surface) based on the altitude of the sun at that time. While the light $L_{S6}$ entering the daylighting panel passes through the daylighting panel, the light $L_{S6}$ travels through the light transmission portion 78 of the light deflection layer 77. When the sunlight travelling through the light transmission portion 78 reaches the interface between the light transmission portion 78 and the light deflection portion 79, if the refractive index difference between the light transmission portion 78 and the light deflection portion 79 and a relationship of the sunlight travel angle are equal to or more than the critical angle of total reflection, total reflection occurs in the interface as shown in FIG. 17. In this way, the sunlight is deflected, and thus it is possible to inhibit direct light that causes glare.

On the other hand, for example, when the indoor side is brighter than the outdoor side at night, light as indicated by $L_{N1}$ in FIG. 17 is emitted out from the indoor side to the outdoor side. The light includes information indicating the state in the indoor side, and may be totally reflected off the interface between the light transmission portion and the light deflection portion and be emitted with the information clearly seen. However, in the present embodiment, since the side 79b of the lower portion of the light deflection portion 79 has a means for scattering light, as indicated by the light $L_{N1}$ in FIG. 17, the light including the information indicting the state in the indoor side is scattered and is emitted to the outdoor side. Hence, in the daylighting sheet including the light deflection layer 77, since in the light reflected off the interface between the light transmission portion and the light deflection portion, the clearness of the light is eliminated and emitted from the indoor side to the outdoor side, the condition where the state in the indoor side can be seen from the outdoor side is removed.

Figure 18:
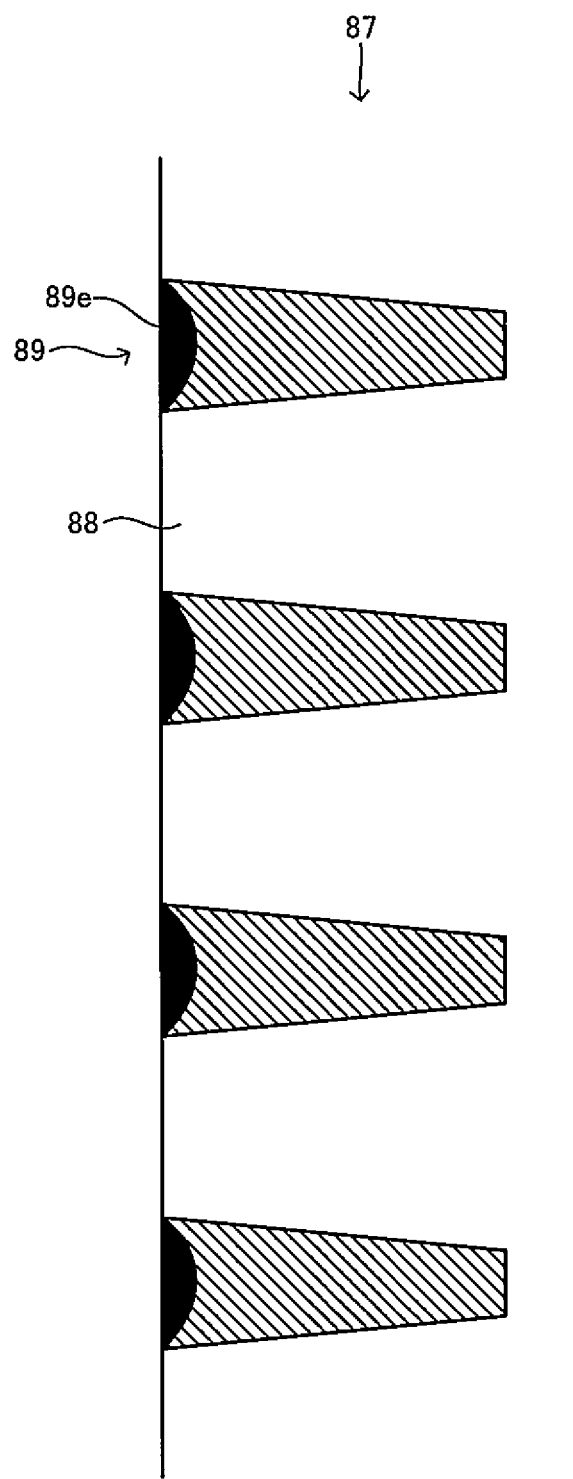
FIG. 18 A diagram of an enlarged part of a light deflection layer 87.

FIG. 18 is a diagram illustrating a seventh embodiment, is a diagram of an enlarged part of a cross section of a light deflection layer 87 included in the seventh embodiment and corresponds to FIG. 12. Since the present embodiment is characterized in the cross-sectional shape of the light deflection layer 87, only the light deflection layer 87 will be described. The other parts are the same as described above.

The present embodiment is the same as in the other embodiments in that the light deflection layer 87 includes a light transmission portion 88 and a light deflection portion 89. However, the present invention differs in that a light absorption portion 89e which is a part for absorbing light is provided in the outdoor side of the light deflection portion 89.

The light absorption portion 89e is the part that is configured to be able to absorb light applied here. The light absorption portion 89e is the part that can absorb 10% or more of visible rays (light of a wavelength equal to or more than 360 nm but equal to or less than 830 nm). When the absorption rate of visible rays in the light absorption portion 89e is not equal to or more than 10%, it is difficult for the light absorption portion 89e to achieve a function described later. The absorption rate of visible rays in the light absorption portion 89e is preferably 90% or less. When the absorption rate of visible rays in the light absorption portion 89e is 90% or less, the composition of the light absorption portion 89e is easily adjusted.

The thickness of the light absorption portion 89e (the size in the left/right direction of FIG. 18) is preferably equal to or more than 1 μm but equal to or less than 10 μm. The thickness of the light absorption portion 89e is set at about the thickness described above, and thus the absorption rate of visible rays in the light absorption portion 89e is easily made uniform.

The light absorption portion 89e can be formed with, for example, a composition in which particles (light absorption particles) having a light absorption property in a translucent resin are scattered.

Here, as the translucent resin, the same resin as that of the light transmission portion 88 can be used.

On the other hand, as the light absorption particles, light absorption colored particles such as carbon black are preferably used. However, the light absorption particles are not limited to them, for example, colored particles that selectively absorb a predetermined wavelength according to the characteristics of light that needs to be absorbed may be used as the light absorption particles. Specific examples of the colored particles include: metal salts such as carbon black, graphite and black iron oxide; organic fine particles that are colored by dyes, pigments, or the like; and colored glass beads. Among them, in terms of cost, quality, availability and the like, the colored organic fine particles are preferably used. More specifically, acrylic cross-linked fine particles containing carbon black, urethane cross-linked fine particles containing carbon black and the like are preferably used.

Although in the present embodiment, the light absorption portion 89e is configured as described above, as long as the light absorption portion can absorb light, its form is not limited. For example, the light absorption portion may be formed with a resin colored by a pigment or a dye.

With the light deflection layer 87 described above, as described above, it is possible to deflect outside light and take it into the room and to clearly see the outdoor side from the indoor side. Moreover, since the light absorption portion 89e is formed in the light deflection layer 87, part of the outside light entering the daylighting sheet substantially perpendicularly with respect to the sheet surface of the daylighting sheet enters the light absorption portion 89e and is absorbed by it. As described above, the light absorption portion 89e absorbs the part of the outside light, and thus it is possible to prevent the indoor side from unnaturally appearing to be white when the indoor side is seen from the outdoor side, and to thereby see the indoor side in natural darkness. If the light absorption portion 89e is not provided, the light that has reached the light deflection layer enters the light deflection portion and is scattered. If the light is scattered as described above, it is likely that the indoor side unnaturally appears to be white when the indoor side is seen from the outdoor side. As described above, the light absorption portion 89e absorbs the part of the outside light, and thus it is possible to prevent the part of the light reaching the light deflection portion 89 from being scattered by being absorbed by the light absorption portion 89e and to prevent the indoor side from unnaturally appearing to be white when the indoor side is seen from the outdoor side.

Figure 19:
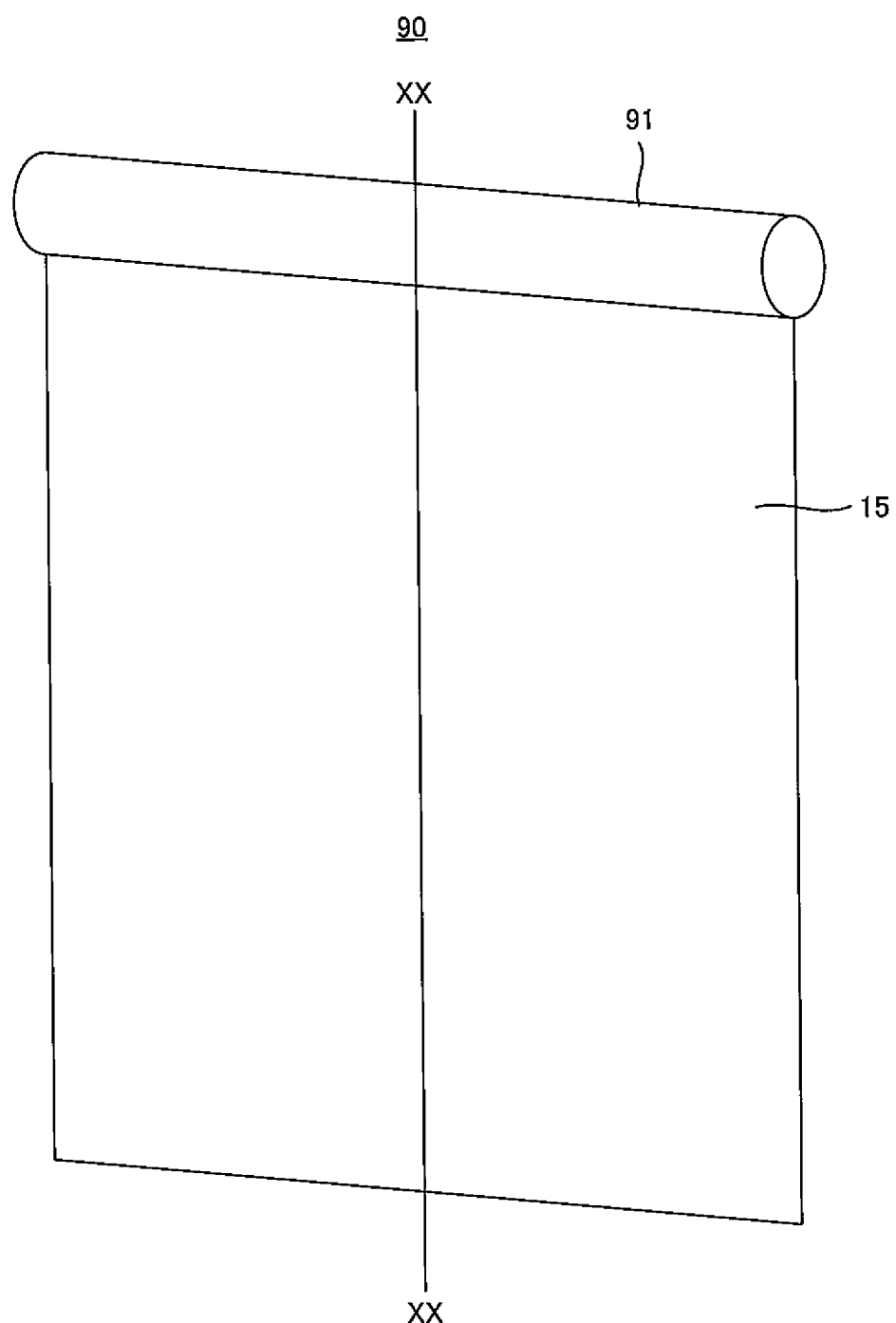
FIG. 19 A perspective view of a roll-up daylighting screen 90.

FIG. 19 is a diagram illustrating an eighth embodiment, and is a perspective view of a roll-up daylighting screen 90 to which the daylighting sheet 15 is applied. As described above, the upper end of the daylighting sheet 15 is attached to a shaft member 91, and the daylighting sheet 15 is configured such that the daylighting sheet 15 can be wound and unwound around the shaft, with the result that the roll-up daylighting screen 90 is formed.

Figure 20:
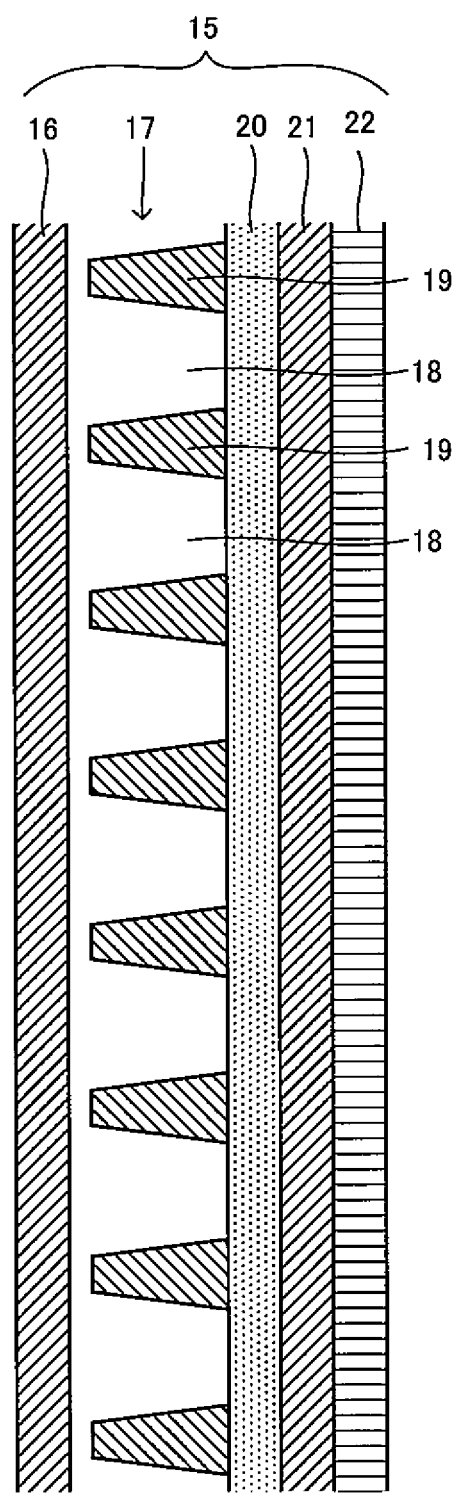
FIG. 20 A diagram showing a cross section of a daylighting sheet 15 of the roll-up daylighting screen 90 and schematically showing the configuration of its layers.

The roll-up daylighting screen 90 described above is installed in, for example, the front surface of the window of a building on the indoor side, and controls light entering the room through the window. FIG. 20 shows a diagram illustrating the configuration of layers of the daylighting sheet 15 in a cross section taken along line XX-XX of FIG. 19. As is obvious from FIG. 20, the daylighting sheet 15 is applied to the roll-up daylighting screen 90, and is wound an unwound to form the roll-up daylighting screen 90.

Here, the thickness of the base material layer 16 is not particularly limited but is preferably equal to or more than 25 μm but equal to or less than 300 μm. When the base material layer 16 is thinner than this configuration, a crease is more likely to occur. On the other hand, when the base material layer 16 is thicker than this configuration, it is likely that it is difficult to wind the daylighting sheet 15.

The elastic modulus of the light transmission portion 18 is preferably equal to or less than 2000 MPa. This is because, in a case where the daylighting sheet 15 is applied to the roll-up daylighting screen 90, a crack is prevented from being produced when the daylighting sheet 15 is wound or unwound.

Preferably, on the surface of the outermost layer of the roll-up daylighting screen, a layer that prevents adhering (an adhering prevention layer, a blocking layer) is formed or processing for preventing adhering is performed. Thus, it is possible to smoothly unwind the screen by preventing adhering when the screen is unwound (wound back).

In the roll-up daylighting screen 90 described above, the same effect as the daylighting panel 10 described above is achieved, and, since winding and unwinding can be performed, it is easy to move and use it.

Although here, the example where the daylighting sheet 15 is used as the roll-up daylighting screen has been described, the present invention is not limited to this configuration, and the roll-up daylighting screen may be formed by using the daylighting sheet in each form described above.

Figure 21:
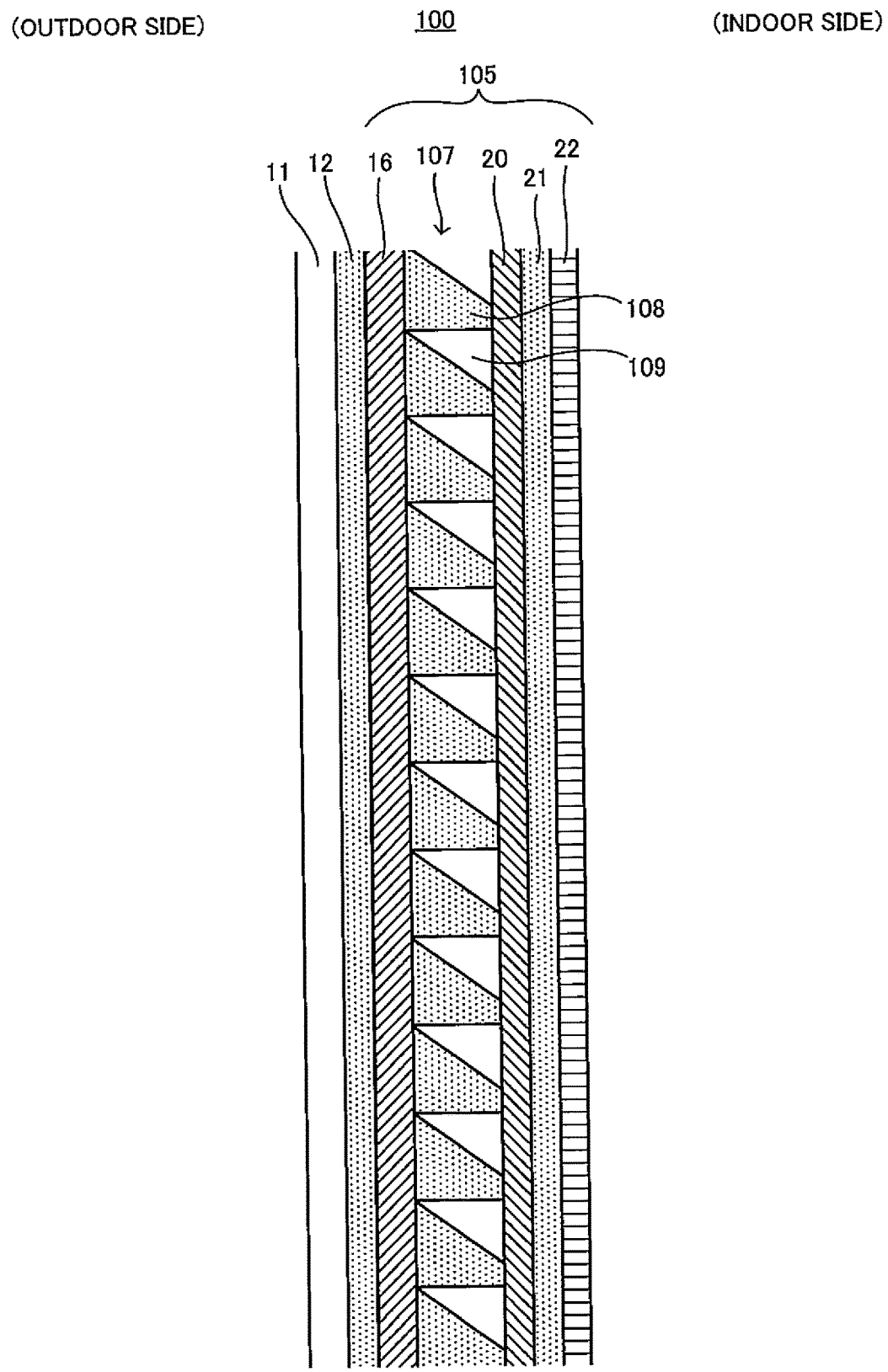
FIG. 21 A diagram showing a cross section of a daylighting panel 100 and schematically showing the configuration of its layers.
Figure 22:
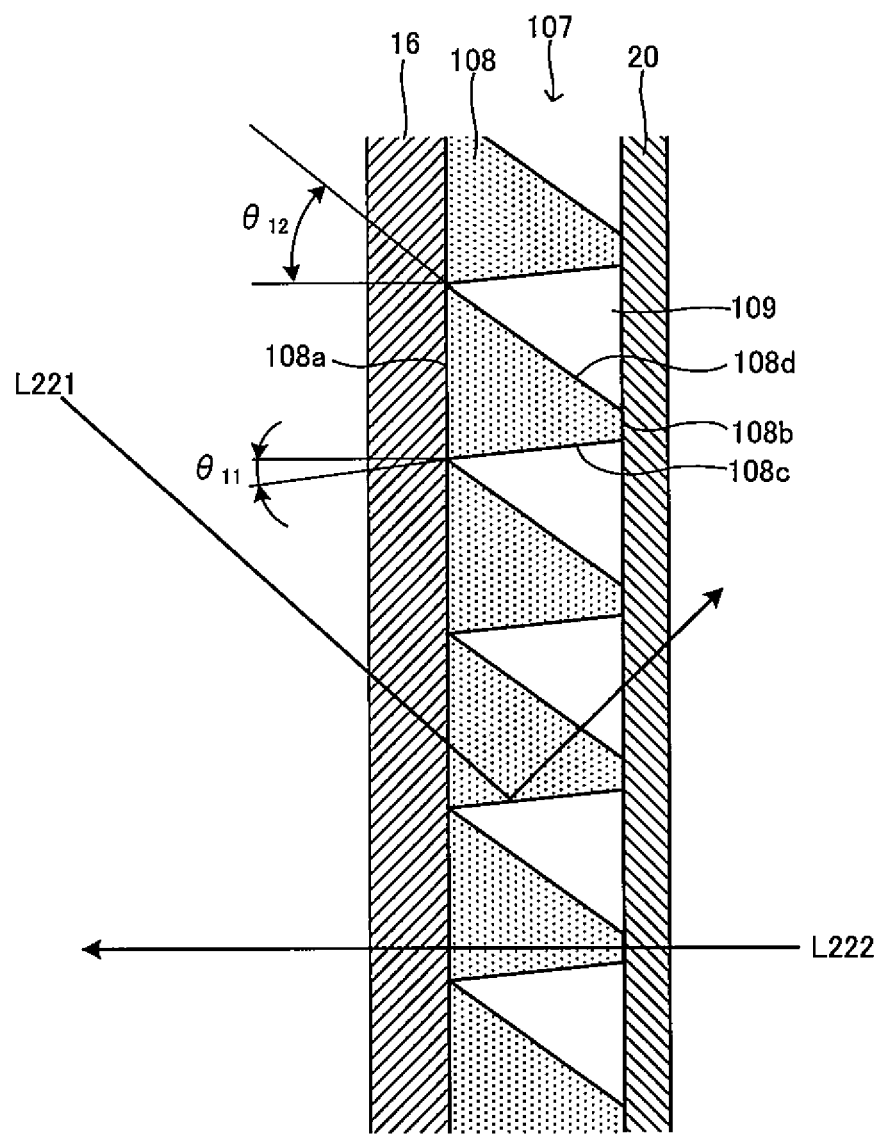
FIG. 22 A diagram obtained by enlarging part of the daylighting panel 100 and illustrating it.

FIG. 21 is a diagram that illustrates a ninth embodiment and that corresponds to FIG. 3, and is a diagram showing the configuration of layers of a daylighting panel 100 in a window to which the daylighting panel 100 is applied. In the present embodiment, as with the window 1, a frame member is attached to the daylighting panel 100 and its perimeter portion, and thus the window is formed. FIG. 22 shows a part of FIG. 21, that is, an enlarged diagram a light transmission portion 108 of a light deflection layer 107 of interest.

Here, the same parts as in the configuration described above are identified with the same symbols, and their description will not be repeated.

The daylighting panel 100 includes the panel 11, the adhesive layer 12 and a daylighting sheet 105 that is adhered to the panel 11 with an adhesive layer 12. The daylighting sheet 105 includes the base material layer 16, a light deflection layer 107, the adhesive layer 20, the protective layer 21 and the hard coat layer 22. FIGS. 21 and 22 are shown in a position where the daylighting panel 100 is attached perpendicularly to the building or the like, and the left of the plane of FIGS. 21 and 22 is the outdoor side, the right of the plane is the indoor side, the upper portion of the plane is the top and the lower portion of the plane is the bottom.

The light deflection layer 107 is a layer that has the function of deflecting outside light that is light such as sunlight from the outdoor side and transmitting it to the indoor side. As shown in FIGS. 21 and 22, in the light deflection layer 107, a plurality of light transmission portions 108 are aligned. An air gap is formed between adjacent light transmission portions 108 to form a light deflection portion 109.

Each light transmission portion 108 is provided on the side of the surfaces of the base material layer 16 opposite to the adhesive layer 12, and is formed to protrude from the base material layer 16 so as to be convex. In the present embodiment, the light transmission portion 108 has a trapezoid in the cross section shown in FIGS. 21 and 22, and is formed to extend in the back/front direction of the plane of the figure (in the present embodiment, the horizontal direction) with the cross section maintained, and the light transmission portions 108 are aligned in a direction different from the direction of the extension.

In the trapezoidal cross section, the light transmission portion 108 includes a first surface 108a that forms a lower base, a second surface 108b that forms an upper base and a deflection surface 108c that forms a leg in the lower portion and a rising surface 108d that forms a leg in the upper portion among the surfaces that connect the first surface 108a and the second surface 108b. Here, the deflection surface 108c and the rising surface 108d form the interface with the light deflection portion 109.

In the present embodiment, the first surface 108a faces the outdoor side, and the second surface 108b faces the indoor side. The first surface 108a and the second surface 108b are formed substantially parallel to each other. The first surface 108a and the second surface 108b are preferably parallel to the surface of the panel 11.

The deflection surface 108c is a surface that totally reflects outside light in the interface with the light deflection portion 109 based on its refractive index difference and transmits it to the indoor side, and an angle formed with the normal to the surface of the panel 11 is $\theta_{11}$. Although the size of the angle $\theta_{11}$ is not particularly limited as long as outside light is totally reflected and deflected as desired, with consideration given to the fact that outside light is sunlight and enters in a direction from obliquely above to down, the angle $\theta_{11}$ is preferably equal to or more than 0 degrees but equal to or less than 12.1 degrees, and more preferably is 4.5 degrees. When the angle $\theta_{11}$ is 0 degrees, the deflection surface 108c is parallel to the indoor/outdoor direction. Here, with respect to the positive and negative signs of the angle $\theta_{11}$, in the position in which the daylighting panel is vertically installed as in FIG. 22, it is assumed that the downward inclination from the outdoor side to the indoor side is negative and that the upward inclination from the outdoor side to the indoor side is positive.

The range of the angle $\theta_{11}$ can be determined with reference to, for example, three places where latitudes from the south to the north are significantly different, that is, Tokyo (35.5 degrees north latitude), Sapporo (43 degrees north latitude) and Naha (26 degrees north latitude), with consideration given to the refractive index of a general material which can be used for the culmination altitude of the sun and the light deflection layer in the summer solstice and the winter solstice. More specifically, the range of the angle $\theta_{11}$ is as follows.

Tokyo is located at 35.5 degrees north latitude, Sapporo is located at 43 degrees north latitude and Naha is located at 26 degrees north latitude, and the culmination altitudes of the individual areas in the summer solstice are 78 degrees (Tokyo), 70.5 degrees (Sapporo) and 87.5 degrees (Naha). On the other hand, the culmination altitudes in the winter solstice are 31 degrees (Tokyo), 23.5 degrees (Sapporo) and 40.5 degrees (Naha). Hence, the center between the minimum of 23.5 degrees and the maximum of 87.5 degrees in the range is 55 degrees. Here, when the refractive index of a general resin is assumed to be 1.49 (acrylic resin) to 1.59 (styrene, polycarbonate resin), total reflection conditions are calculated based on Snell's law and consideration is given to productivity, the angle $\theta_{11}$ is preferably equal to or more than 0 degrees but equal to or less than 12.1 degrees, and more preferably is 4.5 degrees. When the angle $\theta_{11}$ is less than 0 degrees, machinability when a mold is manufactured, moldability when the light transmission portion is molded with the mold and mold release are poor. When the angle $\theta_{11}$ is more than 12.1 degrees, total reflection does not occur when the culmination altitude in the summer solstice in Naha is 87.5 degrees.

What has been described above is the results obtained by performing the calculation based on the examples of the area where the daylighting panel is used. As described above, with consideration given to the angle where the culmination altitude is the highest and the angle where the culmination altitude is the lowest in the area where the daylighting panel is used, it is possible to set an appropriate angle in the area.

The rising surface 108d is produced by forming the deflection surface 108c. However, the rising surface 108d is preferably formed to be inclined such that outside light totally reflected off the deflection surface 108c is prevented from being reflected off the rising surface 108d. Specifically, the angle formed by the rising surface 108d together with the normal to the surface of the panel 11 is assumed to be an angle $\theta_{12}$. The size of the angle $\theta_{12}$ is preferably equal to or more than −75.5 degrees but equal to or less than −26.9 degrees, and more preferably is −53.3 degrees. The range described above is assumed to be a preferable range of angles at which total reflection does not occur based on the conditions described above.

The pitch of the light transmission portion 108 is preferably equal to or more than 10 μm but equal to or less than 200 μm. When the pitch is less than 10 μm, it is difficult to perform the manufacturing. On the other hand, when the pitch is more than 200 μm, machinability when the mold is manufactured, moldability when the light transmission portion 108 is molded with the mold and mold release are poor, with the result that a problem in the manufacturing may occur. The width of the light transmission portion 108 (the width of the lower base of the first surface 108a) is preferably equal to or more than 5 μm but equal to or less than 150 μm. When the width is less than 5 μm, it is difficult to perform the manufacturing. On the other hand, when the width is more than 150 μm, machinability when the mold is manufactured, moldability when the light transmission portion is molded with the mold and mold release are poor, with the result that a problem in the manufacturing may occur.

The thickness of the light deflection layer 107 is preferably equal to or more than 50 μm but equal to or less than 300 μm. When the thickness is less than 50 μm, the optical performance is insufficient or the processing of the light deflection layer is fine such that the accuracy is decreased.

On the other hand, when the thickness is more than 300 µm, a problem may occur in mold release when the light deflection layer is molded.

Here, the light transmission portion 108 may be the same material as the base material layer 16 or may be a different material. However, since a refractive index difference between them increases the possibility that light is deflected in the interface, preferably, they are the same material or the refractive index difference is low or zero if they are different materials.

When the light transmission portion 108 and the base material layer 16 are the same material, the base material layer 16 and the light transmission portion 108 can also be formed integrally. When the light transmission portion 108 and the base material layer 16 are different materials or even when they are the same material, the base material layer 16 and the light deflection layer 107 may be formed separately and be stacked with any means.

An example of a method of forming the light deflection layer 107 will be described later.

The material that forms the light transmission portion 108 of the light deflection layer 107 is not particularly limited but specific examples of thereof include a transparent resin that has, as main ingredients, one or more of acrylic, styrene, polycarbonate, polyethylene terephthalate, acrylonitrile and the like and epoxy acrylate and urethane acrylate reactive resins (ionizing radiation curable resin and the like).

In the present embodiment, the area between adjacent light transmission portions 108 is filled with air. The refractive index of air is 1.0, and it is possible to obtain a sufficiently high refractive index difference due to a relationship with the refractive index of the light transmission portion 108. Preferably, as the refractive index difference is increased, the amount of outside light that can be totally reflected off the deflection surface 108c is increased.

However, the present invention is not limited to this configuration, and the area between adjacent light transmission portions 108 may be filled with a material having a refractive index lower than that of the material of the light transmission portion 108. Specifically, the material filling the area is not particularly limited but the examples thereof include a transparent resin that has, as main ingredients, one or more of acrylic, styrene, polycarbonate, polyethylene terephthalate, acrylonitrile and the like and epoxy acrylate and urethane acrylate reactive resins (ionizing radiation curable resin and the like).

The deflection surface 108c and the rising surface 108d may be a so-called mat surface where minute projections and recesses are formed. In this way, it is possible to take light into the indoor side as the light is diffused.

The daylighting panel 100 described above can be manufactured as follows, for example. The light deflection layer 107 can be formed by a method using a mold roll. Specifically, the mold roll is prepared in which on the outer circumferential surface of a cylindrical roll, projections and recesses that can transfer the light transmission portion 108 of the light deflection layer 107 are prepared. Then, between the mold roll and a nip roll arranged opposite the mold roll, the base material that is the base material layer 16 is inserted. Here, preferably, on one surface of the base material, the adhesive layer 12 is previously formed. Then, while the composition of the light transmission portion 108 is being supplied between the surface of the base material on the side where the adhesive layer 12 is not arranged and the mold roll, the mold roll and the nip roll are rotated. Thus, the recess portions of the projections and recesses formed on the surface of the mold roll are filled with the composition of the light transmission portion 108, and thus the composition is formed along the shape of the surface of the projections and recesses of the mold roll.

Here, as the composition of the light transmission portion 108, the same one as the light transmission portion 108 described above can be preferably applied.

Light is applied from the base material side by a light application device to the composition of the light transmission portion 108 that is sandwiched between the mold roll and the base material and that fills that portion. Thus, it is possible to cure the composition of the light transmission portion 108 and fix its shape. With a mold release roll, the base material layer 16 and the molded light deflection layer 107 are released from the mold roll.

On the other hand, a stack member in which the hard coat layer 22 is stacked on one surface of the protective layer 21 and the adhesive layer 20 is stacked on the other surface is prepared, and they are stacked such that the adhesive layer 20 is on the side of the second surface 108b of the light transmission portion 108.

When the adhesive layer 20 is formed of an ultraviolet curable resin, a photo-curable resin or the like, ultraviolet rays or light is preferably applied after the stacking.

The stack member formed as described above is adhered to the panel 11 with the adhesive layer 12, and thus it is possible to form the daylighting panel 100.

In the daylighting sheet 100, each of the layers described above may have a configuration for adding another function. Examples of this function include a near-infrared absorption function, an ultraviolet absorption function and a heat-ray absorption function. These are as described above.

Then, main optical paths in a case where the windows are formed with the daylighting panels 100 and they are arranged in the opening portions of the building will be described. Schematic examples of the optical path are shown in FIG. 22.

Outside light L211 applied to the daylighting panel 100 in a direction from obliquely above to down from which sunlight is assumed to be applied passes through the panel 11, the adhesive layer 12 and the base material layer 16 and enters the light deflection portion 108 of the light deflection layer 107. The outside light L211 that has entered the light deflection portion 108 reaches the deflection surface 108c, and is totally reflected of the interface and deflected into light that travels obliquely upwardly. Then, although the outside light L211 reaches the rising surface 108d, since as described above, the rising surface 108d has the angle $\theta_{12}$, the outside light L211 passes through the rising surface 108d without being totally reflected in the rising surface 108d, passes through the adhesive layer 20, the protective layer 21 and the hard coat layer 22 and enters the indoor side. Here, since the outside light L211 is deflected obliquely upwardly, the light is applied to the ceiling and the back of the space in the indoor side and functions as light that does not give glare.

Depending on the angle of $\theta_{11}$, it is possible to deflect the light toward the horizontal direction or downwardly with respect to the horizontal direction. Even in this case, it is possible to deflect the light upwardly with respect to at least the angle of the entrance light and take the light into the indoor side.

As described above, with the daylighting panel 100, it is possible to deflect the light entering in a direction from obliquely above to down, upwardly with respect to the angle at which the light has entered, and to take the light into the room. Thus, for example, when it is undesirable to apply direct sunlight to a floor surface or a lower portion of the space, it is possible to take the light into an upper portion of the space without reducing the amount of light.

On the other hand, when the outdoor side is seen from the indoor side, an observer's line of sight corresponds to light L212. In other words, it is possible to observe the outdoor side through the second surface 108b and the first surface 108a of the light transmission portion 108 that are surfaces parallel to the panel 11. Since in this part, a high degree of refraction is not performed in the interface, it is possible to clearly see scenery on the outdoor side.

As described above, with the daylighting panel 100, it is possible to appropriately deflect outside light and relatively clearly see outside scenery from the indoor side. Moreover, although the light deflection layer 107 has the projections and recesses, since it is sandwiched between the base material layer 16 and the protective layer 21, it is possible to enhance the durability.

On the other hand, since each light transmission portion 108 of the light deflection layer 107 is strongly held by the first surface 108a and the second surface 108b of the light transmission portion 108 with the base material layer 16 and the protective layer 21, the stability of production is excellent, the handing of the product is easy and the stability of the shape is excellent.

Figure 23:
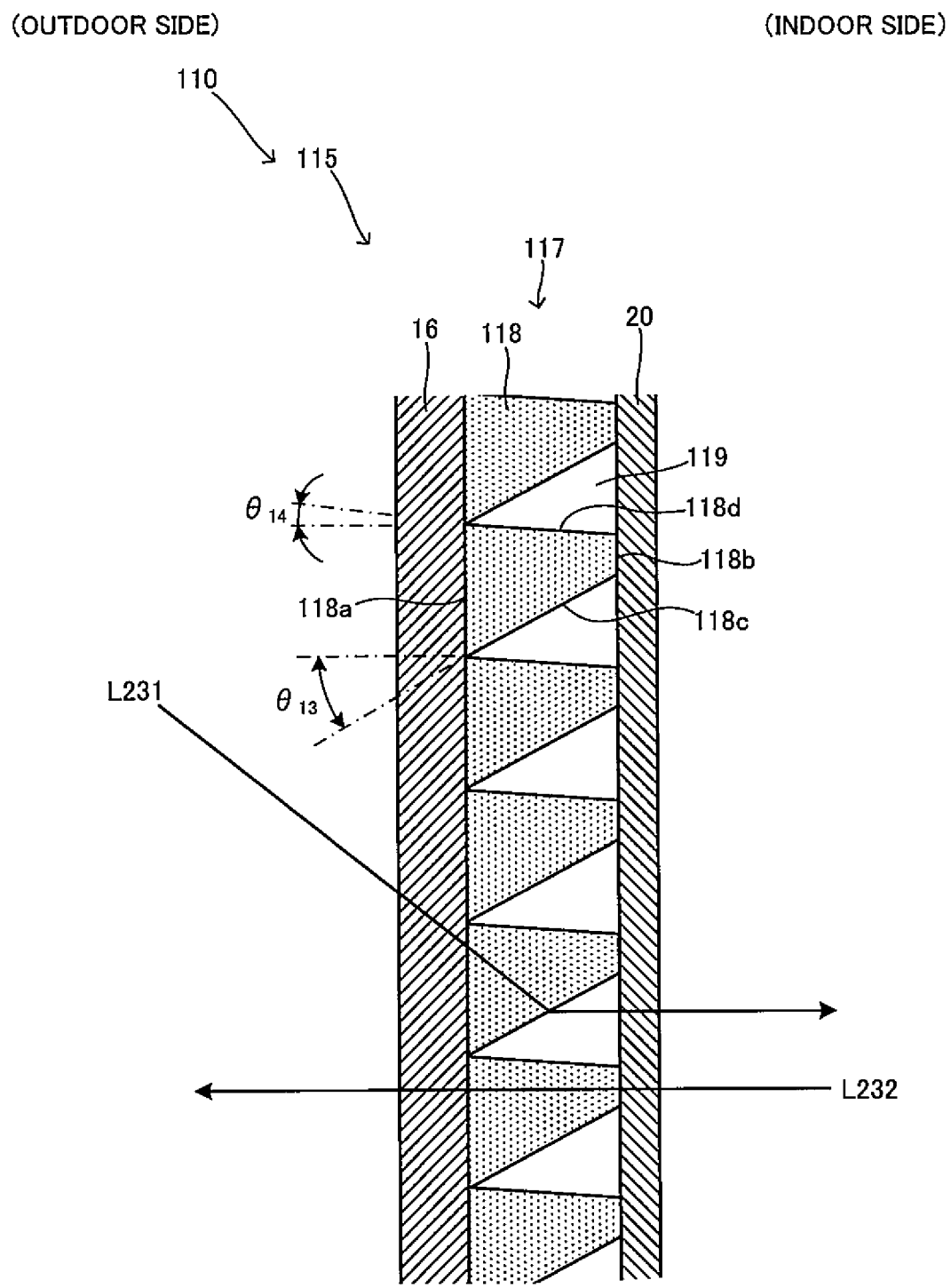
FIG. 23 A diagram obtained by enlarging part of a daylighting panel 110 and illustrating it.

FIG. 23 is a diagram illustrating a tenth embodiment, and corresponds to FIG. 22 of a daylighting panel 110. The daylighting panel 110 differs from the daylighting panel 100 in that, instead of the daylighting sheet 105 of the daylighting panel 100 described above, a daylighting sheet 115 is applied. More specifically, the daylighting sheet 115 differs from the daylighting sheet 105 in that, instead of the light deflection layer 107, a light deflection layer 117 is applied. The description of the daylighting sheet 100 applies to the other constituent members, and thus their description will not be repeated.

As shown in FIG. 23, in the light deflection layer 117, a plurality of light transmission portions 118 are aligned. An air gap is formed between adjacent light transmission portions 118 to form a light deflection portion 119. The light transmission portion 118 is provided on the side of the surfaces of the base material layer 16 opposite to the adhesive layer 12, and is formed to protrude from the base material layer 16 so as to be convex. In the present embodiment, the light transmission portion 118 has a trapezoid in the cross section in the direction of the thickness in the vertical direction, and is formed to extend in the back/front direction of the plane of the figure (that is, the horizontal direction) with the cross section maintained, and the light transmission portions 118 are aligned in a direction different from the direction of the extension.

In the trapezoidal cross section, the light transmission portion 118 includes a first surface 118a that forms a lower base, a second surface 118b that forms an upper base and a deflection surface 118c that forms a leg in the lower portion and a rising surface 118d that forms a leg in the upper portion among the surfaces that connect the first surface 118a and the second surface 118b. Here, the deflection surface 118c and the rising surface 118d form the interface with the light deflection portion 119.

In the present embodiment, the first surface 118a faces the outdoor side, and the second surface 118b faces the indoor side. The first surface 118a and the second surface 118b are formed substantially parallel to each other. The first surface 118a and the second surface 118b are preferably parallel to the surface of the panel 11.

In the present embodiment, the deflection surface 118c is a surface that refracts outside light and transmits it to the indoor side, and an angle formed with the normal to the surface of the panel 11 is $\theta_{13}$. Although the size of the angle $\theta_{13}$ is not particularly limited as long as outside light is refracted and deflected as desired, with consideration given to the fact that outside light is sunlight and enters in a direction from obliquely above to down, the angle $\theta_{13}$ is preferably equal to or more than 5.7 degrees but equal to or less than 51.1 degrees, and more preferably is 29.3 degrees. This is also based on the idea of the description of the angle $\theta_{11}$, and the range in which appropriate refraction is possible is determined. When the angle $\theta_{13}$ is less than 5.7 degrees, it is impossible to refract the outside light whereas when the angle is more than 51.1 degrees, the outside light may be refracted downwardly.

However, as with the angle $\theta_{11}$, the angle $\theta_{13}$ is preferably adjusted based on the culmination altitude of the area where the daylighting panel 110 is used.

The rising surface 118d is produced by forming the deflection surface 118c. In the present embodiment, since the outside light refracted by the deflection surface 118c little reaches the rising surface 118d, the angle $\theta_{14}$ formed by the rising surface 118d together with the normal to the surface of the panel 11 is not particularly limited. However, since machinability when the mold is manufactured, moldability when the light transmission portion is molded with the mold and mold release are poor, and thus a problem in the manufacturing may occur, the angle $\theta_{14}$ is equal to or less than 0 degrees, and preferably is 0 degrees.

The pitch and the like of the light transmission portion 118 are the same as those of light transmission portion 108. The material of the light transmission portion 118 and the form between the adjacent light transmission portions 118 (that is, the light deflection portion 119) are the same as those of the light deflection layer 107 described above.

The deflection surface 118c and the rising surface 118d may be a so-called mat surface where minute projections and recesses are formed. In this way, it is possible to take light into the indoor side as the light is diffused.

Then, main optical paths in a case where the windows are formed with the daylighting panels 110 and they are arranged in the opening portions of the building will be described. Schematic examples of the optical path are shown in FIG. 23.

Outside light L231 applied to the daylighting panel 110 in a direction from obliquely above to down from which sunlight is assumed to be applied passes through the panel 11, the adhesive layer 12 and the base material layer 16 and reaches the light transmission portion 118 of the light deflection layer 117. The outside light L231 that has entered the light transmission portion 118 reaches the deflection surface 118c, is refracted in the interface and is deflected into light which travels more upwardly than before the refraction. Then, the light passes through the adhesive layer 20, the protective layer 21 and the hard coat layer 22, and enters the indoor side. Here, since the outside light L231 is deflected upwardly as compared with the entrance light, the light is applied to the back of the space in the indoor side.

As described above, with the daylighting panel 110, it is possible to deflect the light entering in a direction from obliquely above to down, upwardly with respect to the angle at which the light has entered, and to take the light into the room. Thus, for example, when it is undesirable to apply direct sunlight to a floor surface or a lower portion of the space, it is possible to take the light into the back of the space without reducing the amount of light.

On the other hand, when the outdoor side is seen from the indoor side, an observer's line of sight corresponds to light L232. In other words, it is possible to observe the outdoor side through the second surface 118b and the first surface 118a of the light transmission portion 118 that are surfaces parallel to the panel 11. Since in this part, a high degree of refraction is not performed in the interface, it is possible to clearly see scenery on the outdoor side.

As described above, with the daylighting panel 110, it is possible to appropriately deflect outside light and relatively clearly see outside scenery from the indoor side. Moreover, since the light deflection layer 117 having the projections and recesses is sandwiched between the base material layer 16 and the protective layer 21, it is possible to enhance the durability.

On the other hand, since each light transmission portion 118 of the light deflection layer 117 is strongly held by the first surface 118a and the second surface 118b of the light transmission portion 118 with the base material layer 16 and the protective layer 21, the stability of production is excellent, the handing of the product is easy and the stability of the shape is excel lent.

Figure 24:
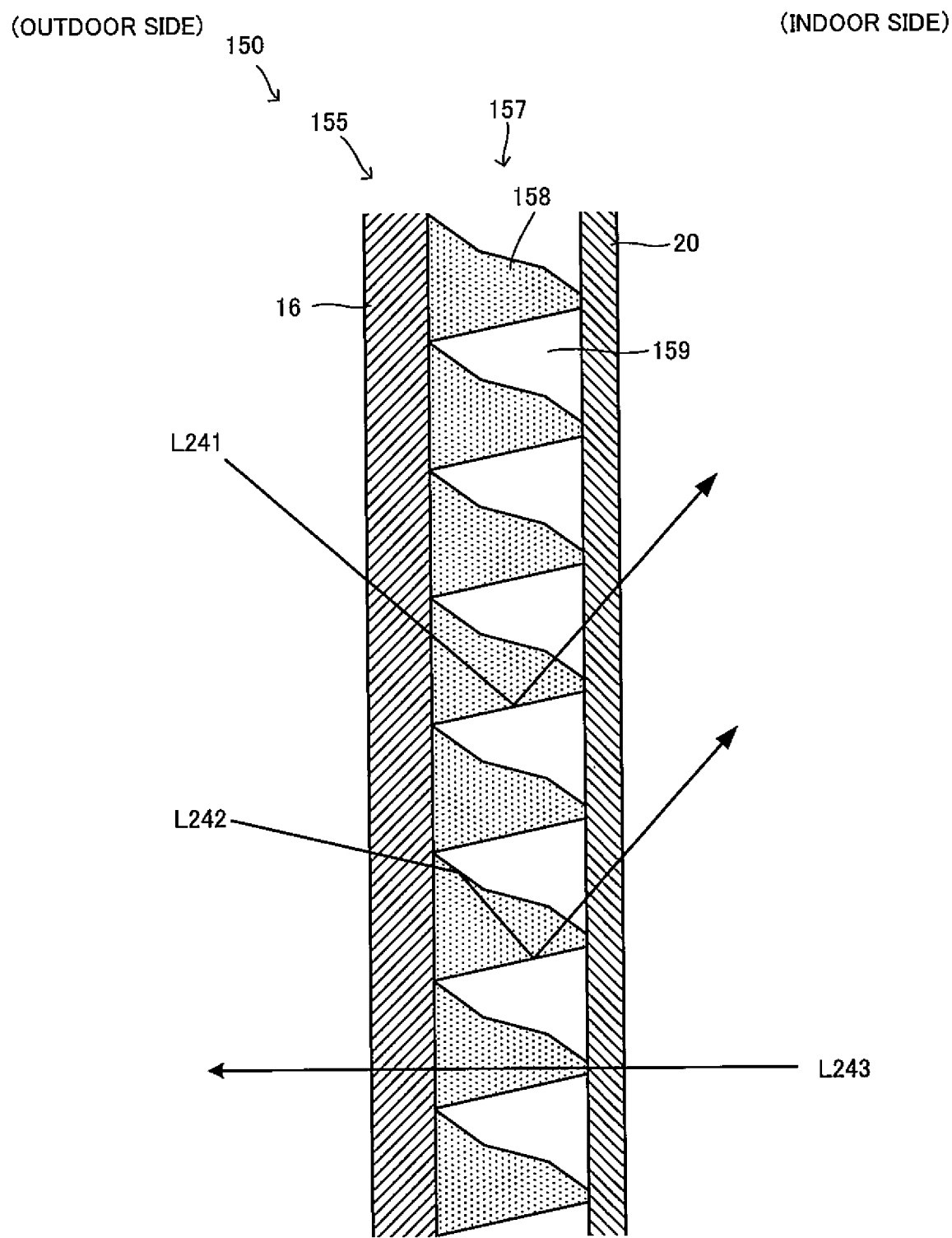
FIG. 24 A diagram illustrating a light deflection layer 157 of a daylighting panel 150.

FIG. 24 is a diagram illustrating an eleventh embodiment, and corresponds to FIG. 22 of a daylighting panel 150. The daylighting panel 150 differs from the daylighting panel 100 in that, instead of the daylighting sheet 105 of the daylighting panel 100 described above, a daylighting sheet 155 is applied. More specifically, the daylighting sheet 155 differs from the daylighting sheet 105 in that, instead of the light deflection layer 107, a light deflection layer 157 is applied. The description of the daylighting sheet 100 applies to the other constituent members, and thus their description will not be repeated.

As shown in FIG. 24, in the light deflection layer 157, a plurality of light transmission portions 158 are aligned. An air gap is formed between adjacent light transmission portions 158 to form a light deflection portion 159. The light transmission portion 158 is provided on the side of the surfaces of the base material layer 16 opposite to the adhesive layer 12, and is formed to protrude from the base material layer 16 so as to be convex. In the present embodiment, the light transmission portion 158 has a shape described below on the cross section in the direction of the thickness in the vertical direction, and is formed to extend in the back/front direction of the plane of the figure (that is, the horizontal direction) with the cross section maintained, and the light transmission portions 158 are aligned in a direction different from the direction of the extension.

While the light deflection portion 159 is formed to be an air gap in the present embodiment, the formation of the light deflection portion 159 is not limited to an air gap but the light deflection portion 159 may be filled with a transparent resin of a lower refractive index than the light transmission portion 158.

Figure 25:
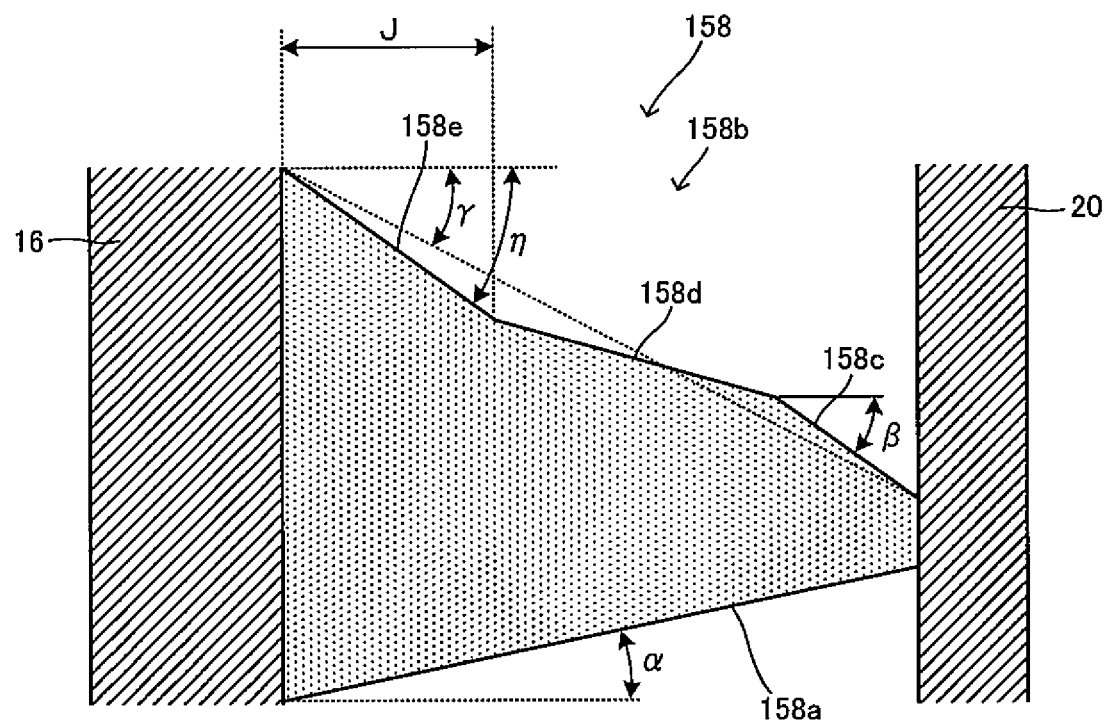
FIG. 25 A diagram illustrating a shape of a light deflection portion 158.

FIG. 25 shows one cross section of the light transmission portion 158. As is seen from FIG. 25, the light transmission portion 158 of the present embodiment has a bottom side surface 158a and a top side surface 158b. The top side surface 158b includes a first top side emission surface 158c, a second top side emission surface 158d and a top side reflection surface 158e in this order from the observer side.

The bottom side surface 158a is a surface where upward total reflection occurs to light that enters the bottom side surface 158a with an entrance angle equal to or more than the critical angle. An angle formed by the bottom side surface 158a together with the normal to the surface of the base material layer 16 is preferably 0° to 12°.

The first top side emission surface 158c and the second top side emission surface 158d of the top side surface 158b are surfaces that transmit and emit the light to which total reflection occurred on the bottom side surface 158a as the light directs upwards. The first emission surface 158c and the second emission surface 158d are continuously formed from the top side reflection surface 158e, to be a shape of a polygonal line on the cross section. This shape of a polygonal line is formed so as to be convex upwards by the first emission surface 158c and the second emission surface 158d.

When it is assumed that an angle formed by the line connecting a point of the top side surface 158b that touches the base material layer 16, and a point of the top side surface 158b that touches the adhesive layer 20 together with the normal to the base material layer 16 is set to be γ, an angle β formed by the first emission surface 158c together with the normal to the surface of the base material layer 16 is preferably γ to 40°.

The top side reflection surface 158e is a surface where reflection to the side of the bottom side surface 158a occurs to light whose entrance angle thereto is equal to or more than the critical angle. Light whose entrance angle thereto is less than the critical angle is refracted by the interface of the top side reflection surface 158e and the light deflection portion 159, to be emitted upwards.

An angle η formed by the top side reflection surface 158e together with the normal to the surface of the base substrate layer 16 is preferably set to be equal to or more than the above described β. If η is less than β, most of the light to which total reflection occurs on the top side reflection surface 158e does not reach the bottom side surface 158a.

The top side reflection surface 158e is preferably structured so as to be concave downwards at a linking portion with the second top side emission surface 158d.

Distance J of the top side reflection surface 158e in the thickness direction is preferably within the range of the following formula:

$$0.7S \leq J \leq 0.9S$$

where S represents P tan(π/2−2α−arcsin(1/n)). P represents a pitch of the light transmission portion 158 (mm) and n represents the refractive index of the light transmission portion 158.

In a case where the distance J is less than 0.7 S, most of light that enters in a direction from obliquely above to down is light whose entrance angle to the top side reflection surface 158e is less than the critical angle, and thus total reflection to the bottom side surface 158a is impossible to occur to most of entering light. In a case where the distance J is beyond 0.9 S, even if light equal to or more than the critical angle enters the top side reflection surface 158e in a direction from obliquely above to down, most of light to which total reflection occurred on the top side reflection surface 158e does not enter the bottom side surface 158a.

Inclusion of such a light deflection layer 157 makes it possible to take light in the outdoor side into the indoor side as light L241 and light L242, which are examples of the optical path in FIG. 24.

Outside light L241 applied to the light deflection layer 157 in a direction from obliquely above to down from which sunlight is assumed to be applied passes through the base material layer 16 and enters the light transmission portion 158 of the light deflection layer 157. The outside light L241 that has entered the light transmission portion 158 reaches the bottom side surface 158a, total reflection occurs thereto on the interface and the outside light L241 is deflected into light which travels upwards. Then, the light passes through the other layers, and enters the indoor side. Here, since the outside light L241 is deflected upwards as compared with the entrance light, the light is applied to the top part of the space in the indoor side.

Another outside light L242 applied to the light deflection layer 157 in a direction from obliquely above to down from which sunlight is assumed to be applied passes through the base material layer 16 and enters the light transmission portion 158 of the light deflection layer 157. The outside light L242 that has entered the light transmission portion 158 reaches the top side reflection surface 158e of the top side surface 158b, total reflection occurs thereto on the interface to change its angle, and the outside light L242 is deflected into light which travels downwards. Then, the outside light L242 reaches the bottom side surface 158a, total reflection occurs thereto on the interface and the outside light L242 is deflected into light which travels upwards. The light passes through the other layers, and enters the indoor side. Here, since the outside light L242 is deflected upwards as compared with the entrance light, the light is applied to the top part of the space in the indoor side. This light L242 would not reach the bottom side surface 158a if there were no top side reflection surface 158e. The top side reflection surface 158e makes it possible to change the direction of the light as described above, to effectively take the light.

According to the daylighting panel including such a light deflection layer, it is also possible to deflect the light entering in a direction from obliquely above to down, upwardly with respect to the angle at which the light has entered, and to take the light into the room. Thus, for example, when it is undesirable to apply direct sunlight to a floor surface or a lower portion of the space, it is possible to take the light into the back of the space without reducing the amount of light.

On the other hand, when the outdoor side is seen from the indoor side, an observer's line of sight corresponds to light L243. In other words, as is the same to the above described embodiments, it is possible to observe the outdoor side through two parallel surfaces of the light transmission portion 158 which are surfaces parallel to the panel. Since in this part, a high degree of refraction is not performed in the interface, it is possible to clearly see scenery on the outdoor side.

Figure 26:
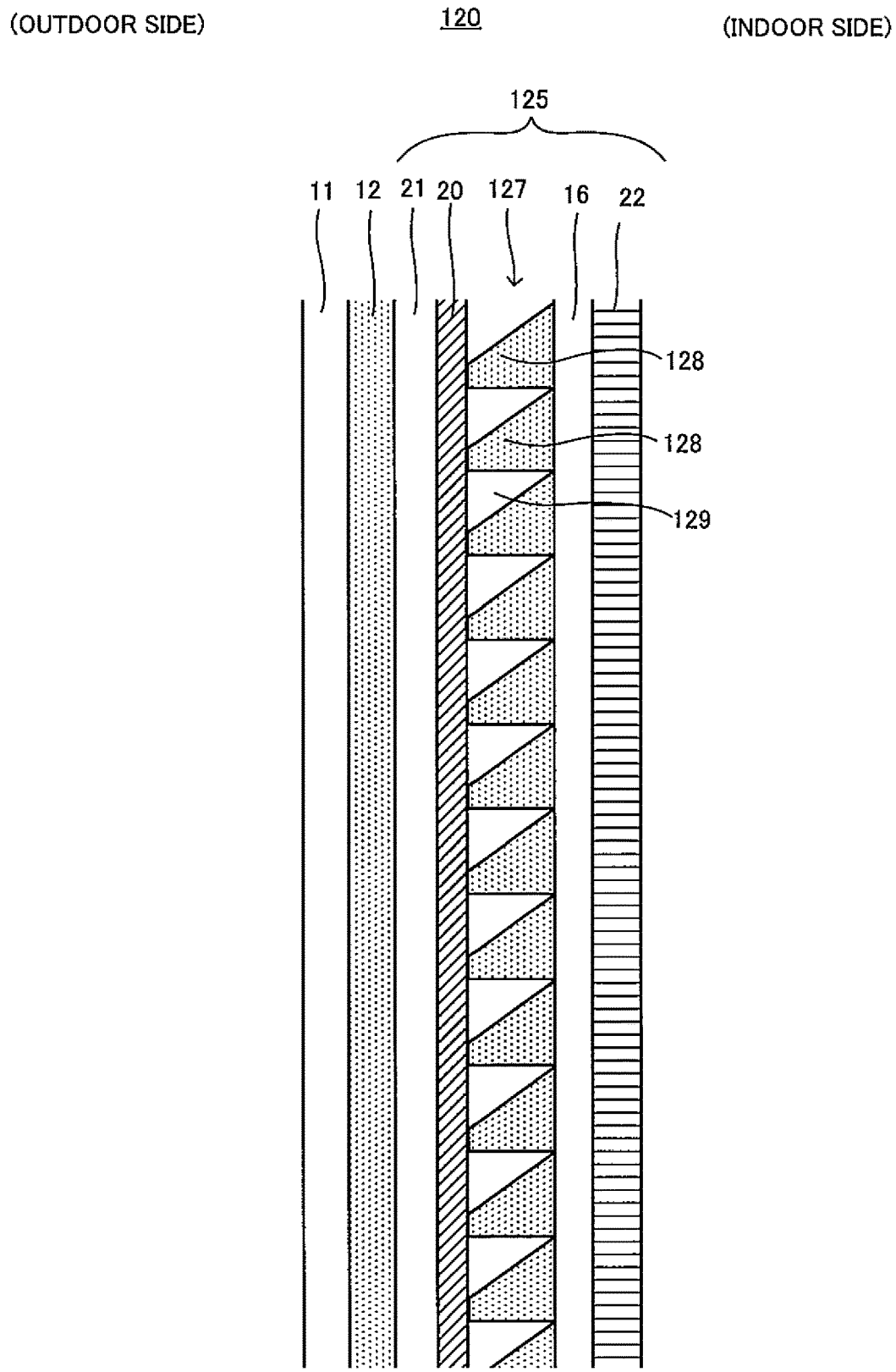
FIG. 26 A diagram showing a cross section of a daylighting panel 120 and schematically showing the configuration of its layers.
Figure 27:
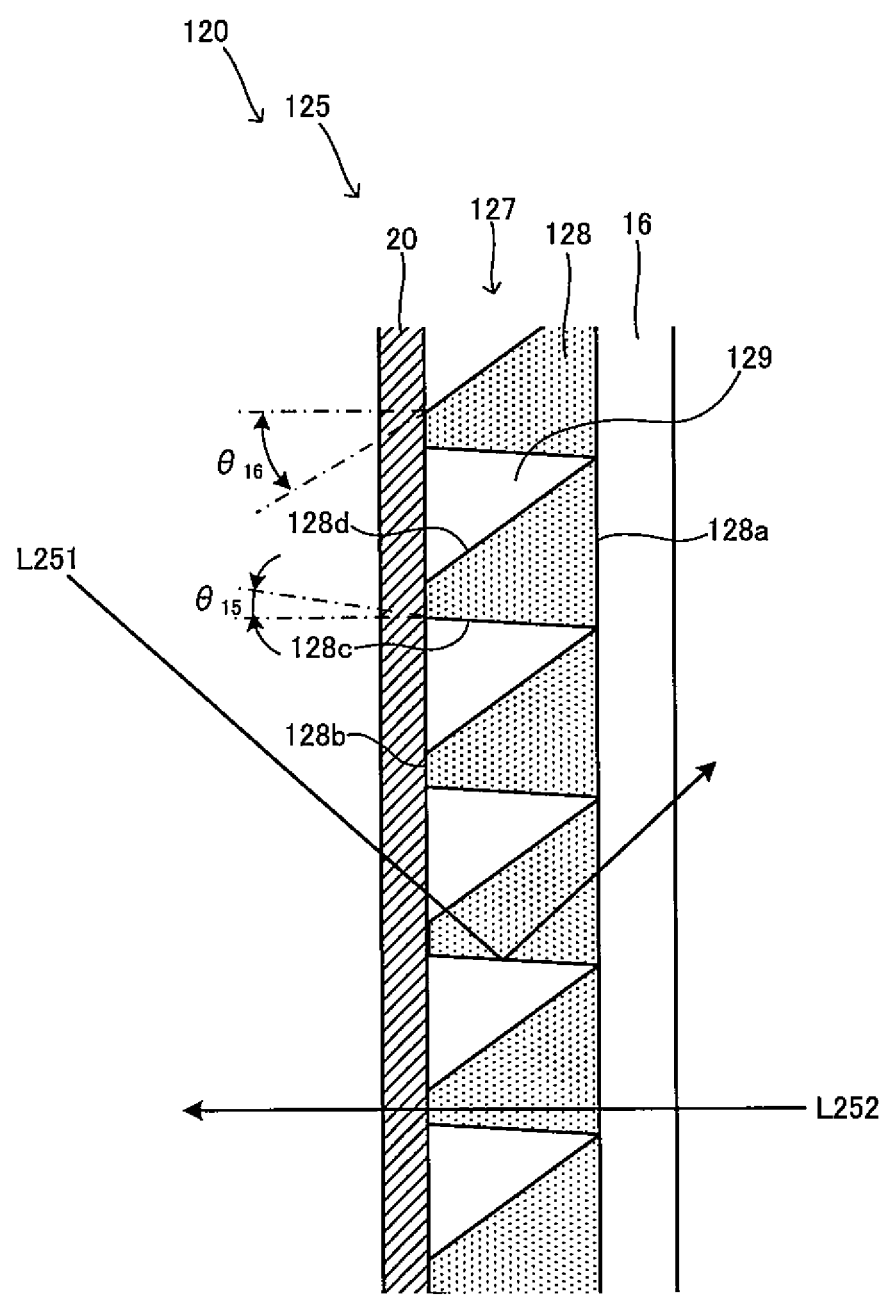
FIG. 27 A diagram obtained by enlarging part of the daylighting panel 120 and illustrating it.

FIG. 26 is a diagram that illustrates a daylighting panel 120 according to a twelfth embodiment and that corresponds to FIG. 21. Hence, FIG. 26 is a diagram schematically showing the configuration of layers of the daylighting panel 120. FIG. 27 shows a part of FIG. 26, that is, an enlarged diagram of a light deflection layer 127 of interest.

The daylighting panel 120 includes the panel 11, the adhesive layer 12 and a daylighting sheet 125. The daylighting sheet 125 includes the protective layer 21, the adhesive layer 20, the light deflection layer 127, the base material layer 16 and the hard coat layer 22. The individual layers will be described below. The same layers as the layers described above are identified with the same symbols, and their description will not be repeated.

The light deflection layer 127 is a layer that has the function of deflecting outside light that is light such as sunlight from the outdoor side and transmitting it to the indoor side. As shown in FIGS. 26 and 27, in the light deflection layer 127, a plurality of light transmission portions 128 are aligned.

The light transmission portion 128 is provided on the side of the surfaces of the adhesive layer 20 opposite to the protective layer 21. In the present embodiment, the light transmission portion 128 has a trapezoid in the cross section in the direction of the thickness in the vertical direction, and is formed to extend in the back/front direction of the plane of the figure (that is, the horizontal direction) with the cross section maintained, and the light transmission portions 128 are aligned in a direction different from the direction of the extension.

In the trapezoidal cross section, the light transmission portion 128 includes a first surface 128a that forms a lower base, a second surface 128b that forms an upper base and a deflection surface 128c that forms a leg in the lower portion and a rising surface 128d that forms a leg in the upper portion among the surfaces that connect the first surface 128a and the second surface 128b. Here, the deflection surface 128c and the rising surface 128d form the interface with the light deflection portion 129.

In the present embodiment, the first surface 128a faces the indoor side, and the second surface 128b faces the outdoor side. The first surface 128a and the second surface 128b are formed substantially parallel to each other. The first surface 128a and the second surface 128b are preferably parallel to the surface of the panel 11.

In the present embodiment, the deflection surface 128c is a surface that totally reflects outside light and that transmits it to the indoor side, and an angle formed with the normal to the surface of the panel 11 is $\theta_{15}$. Although the size of the angle $\theta_{15}$ is not particularly limited as long as outside light is totally reflected and deflected as desired, with consideration given to the fact that outside light is sunlight and enters in a direction from obliquely above to down, the angle $\theta_{15}$ is preferably equal to or more than −87.5 degrees but equal to or less than −36.5 degrees, and more preferably is −49.5 degrees. The range described above is obtained by the same idea as the angle $\theta_{11}$ from the conditions under which the light is totally reflected off the deflection surface 128c.

In other words, as with the angle $\theta_{11}$, the angle $\theta_{15}$ is also preferably adjusted based on the culmination altitude of the area where the daylighting panel 120 is used.

The rising surface 128d is produced by forming the deflection surface 128c. However, the rising surface 128d is preferably formed to be inclined such that outside light entering the light transmission portion 128 is prevented from being reflected off the rising surface 128d. Specifically, the angle formed by the rising surface 128d together with the normal to the surface of the panel 11 is assumed to be an angle $\theta_{16}$. The size of the angle $\theta_{16}$ is preferably equal to or more than 2.5 degrees but equal to or less than 66.5 degrees, and more preferably is 35 degrees. The range described above is also obtained from the conditions under which the light is not totally reflected off the rising surface 128d and enters the light transmission portion 128.

The pitch and the like of the light transmission portion 128 are the same as those of light transmission portion 118. The second surface 128b of the light transmission portion 128 is adhered to the adhesive layer 20. The other configurations such as the material of the light transmission portion 128 are the same as those of the light transmission portion 108 of the daylighting panel 100 described above.

The deflection surface 128c and the rising surface 128d may be a so-called mat surface where minute projections and recesses are formed. In this way, it is possible to take light into the indoor side as the light is diffused.

Then, main optical paths in a case where the windows are formed with the daylighting panels 120 and they are arranged in the opening portions of the building will be described. Schematic examples of the optical path are shown in FIG. 27.

Outside light L251 applied to the daylighting panel 120 in a direction from obliquely above to down from which sunlight is assumed to be applied passes through the panel 11, the adhesive layer 12, the protective layer 21 and the adhesive layer 20 and enters the light deflection portion 128 of the light deflection layer 127. Although the outside light L251 reaches the rising surface 128d when entering the light transmission portion 128, since as described above, the rising surface 128d has the angle $\theta_{16}$, the outside light L251 enters the light transmission portion 128 without being totally reflected here. The outside light L251 that has entered the light transmission portion 128 reaches the deflection surface 128c, is totally reflected off the interface and is deflected into light which travels obliquely upwardly. Then, the outside light L251 passes through the base material layer 16 and the hard coat layer 22 and enters the indoor side. Here, since the outside light L251 is deflected obliquely upwardly, the light is applied to the ceiling and the back of the space in the indoor side.

Depending on the angle of $\theta_{15}$, it is possible to deflect the light toward the horizontal direction or downwardly with respect to the horizontal direction. Even in this case, it is possible to deflect the light upwardly with respect to at least the angle of the entrance light and take the light into the indoor side.

As described above, with the daylighting panel 120, it is possible to deflect the light entering in a direction from obliquely above to down, upwardly with respect to the angle at which the light has entered, and to take the light into the room. Thus, for example, when it is undesirable to apply direct sunlight to a floor surface or a lower portion of the space, it is possible to take the light into an upper portion of the space without reducing the amount of light.

On the other hand, when the outdoor side is seen from the indoor side, an observer's line of sight corresponds to light L252. In other words, it is possible to observe the outdoor side through the second surface 128b and the first surface 128a of the light transmission portion 128 that are surfaces parallel to the panel 11. Since in this part, a high degree of refraction is not performed in the interface, it is possible to clearly see scenery on the outdoor side.

Figure 28:
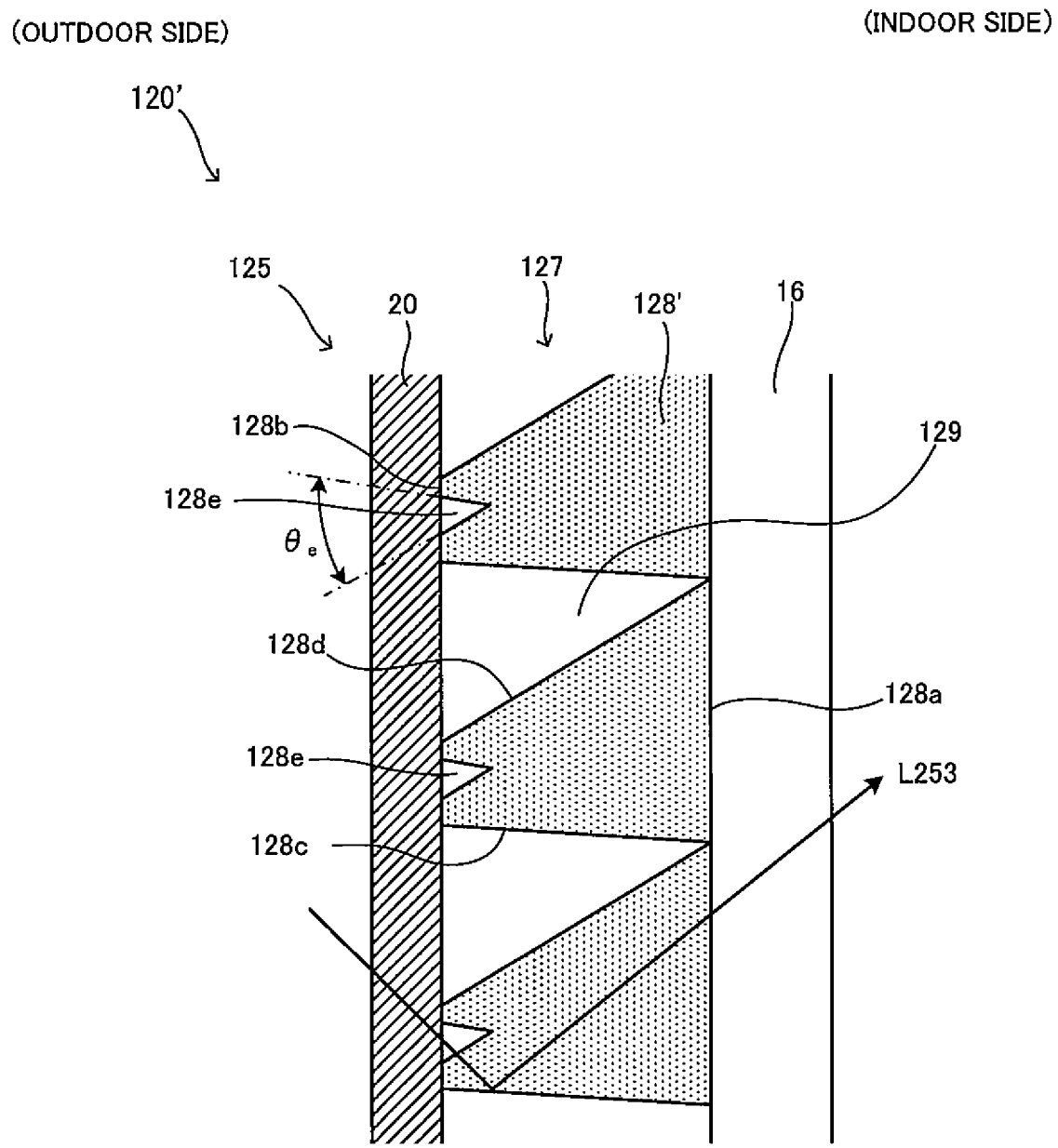
FIG. 28 A diagram obtained by enlarging part of a daylighting panel 120' and illustrating it.

FIG. 28 is a diagram illustrating a daylighting panel 120' which is a modification example of the daylighting panel 120, seen from the same viewpoint as that of FIG. 27. The daylighting panel 120' differs from the daylighting panel 120 in that a groove 128e is provided in parallel with the direction in which a light transmission portion 128' extends on the second surface 128b. The description of the daylighting panel 120 applies to the other constituent members, and thus their description will not be repeated.

By providing the groove 128e on the second surface 120 as described above, it becomes easy for part of the light reached the second surface to enter the light transmission portion 128' as shown as light 253 in FIG. 22, in addition to L251 and L252 shown with the daylighting panel 120 above. This makes it possible for light to be reflected at the deflection surface 128c and enter the room. This achieves further efficient daylighting.

Here, an angle $\theta_e$, which is an angle at the bottom of the groove 128e, is not particularly limited, but preferably 30 degrees to 120 degrees.

The cross-sectional shape of the groove is not particularly limited. The shape may be a triangle like in FIG. 28, or may be a circular arc, other curved shapes, a square shape, and other polygonal shapes.

Figure 29:
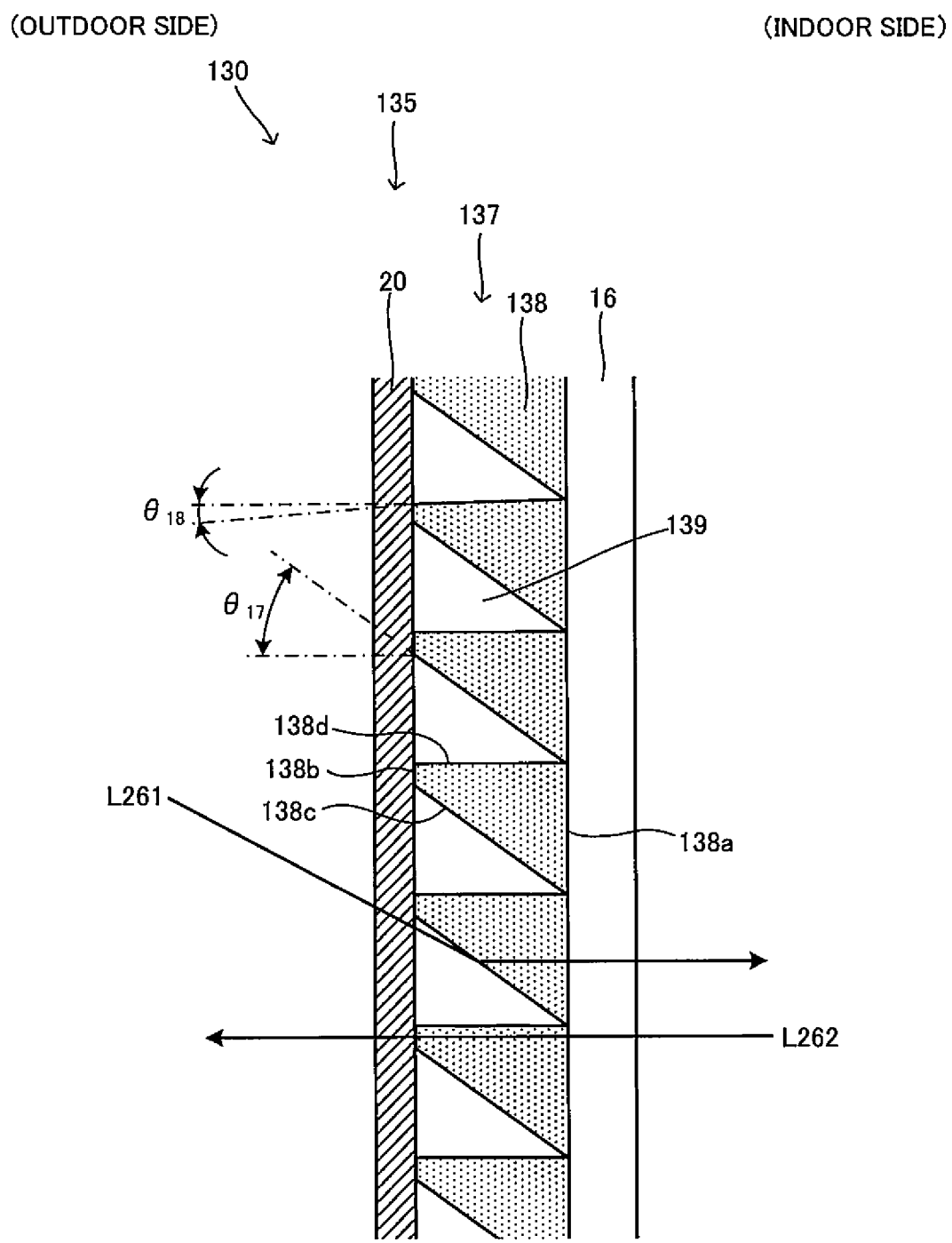
FIG. 29 A diagram obtained by enlarging part of a daylighting panel 130 and illustrating it.

FIG. 29 is a diagram illustrating a daylighting panel 130 according to a thirteenth embodiment, and corresponds to FIG. 27. The daylighting panel 130 differs from the daylighting panel 120 in that, instead of the light deflection layer 127 of the daylighting panel 120 described above, a light deflection layer 137 is applied. The description of the daylighting sheet 120 applies to the other constituent members, and thus their description will not be repeated.

As shown in FIG. 29, in the light deflection layer 137, a plurality of light transmission portions 138 are aligned. An air gap is formed between adjacent light transmission portions 138 to form a light deflection portion 139. The light transmission portion 138 is provided on the side of the surfaces of the base material layer 16 opposite to the hard coat layer 22, and is formed to protrude from the base material layer 16 so as to be convex. In the present embodiment, the light transmission portion 138 has a trapezoid in the cross section in the direction of the thickness in the vertical direction, and is formed to extend in the back/front direction of the plane of the figure (that is, the horizontal direction) with the cross section maintained, and the light transmission portions 138 are aligned in a direction different from the direction of the extension.

In the trapezoidal cross section, the light transmission portion 138 includes a first surface 138a that forms a lower base, a second surface 138b that forms an upper base and a deflection surface 138c that forms a leg in the lower portion and a rising surface 138d that forms a leg in the upper portion among the surfaces that connect the first surface 138a and the second surface 138b. Here, the deflection surface 138c and the rising surface 138d form the interface with the light deflection portion 139.

In the present embodiment, the first surface 138a faces the indoor side, and the second surface 138b faces the outdoor side. The first surface 138a and the second surface 138b are formed substantially parallel to each other. The first surface 138a and the second surface 138b are preferably parallel to the surface of the panel 11.

In the present embodiment, the deflection surface 138c is a surface that refracts outside light and transmits it to the indoor side, and an angle formed with the normal to the surface of the panel 11 is $\theta_{17}$. Although the size of the angle $\theta_{17}$ is not particularly limited as long as outside light is refracted and deflected as desired, with consideration given to the fact that outside light is sunlight and enters in a direction obliquely above to down, the angle $\theta_{17}$ is preferably equal to or more than −87.5 degrees but equal to or less than −23.5 degrees, and more preferably is −55 degrees. This is also based on the idea of the description of the angle $\theta_{11}$, and the range in which appropriate refraction is possible in the deflection surface 138c is determined. In other words, it is possible to perform a setting as necessary based on the culmination altitude of the area where the daylighting panel 130 is used.

The rising surface 138d is produced by forming the deflection surface 138c. In the present embodiment, since the outside light refracted by the deflection surface 138c little reaches the rising surface 138d, the angle $\theta_{18}$ formed by the rising surface 138d together with the normal to the surface of the panel 11 is not particularly limited. However, since machinability when the mold is manufactured, moldability when the light transmission portion is molded with the mold and mold release are poor, and thus a problem in the manufacturing may occur, the angle $\theta_{18}$ is equal to or less than 0 degrees, and preferably is 0 degrees.

The pitch and the like of the light transmission portion 138 are the same as those of light transmission portion 128. The material of the light transmission portion 138 and the form between the adjacent light transmission portions 138 are the same as those of the light deflection layer 127 described above.

Then, main optical paths in a case where the windows are formed with the daylighting panels 130 and they are arranged in the opening portions of the building will be described. Schematic examples of the optical path are shown in FIG. 29.

Outside light L261 applied to the daylighting panel 130 in a direction from obliquely above to down from which sunlight is assumed to be applied passes through the panel 11, the adhesive layer 12, the protective layer 21 and the adhesive layer 20 and reaches the light transmission portion 138 of the light deflection layer 137. In this case, the outside light L261 reaches the deflection surface 138c, is refracted in the interface and is deflected into light which travels more upwardly than before the refraction. Then, the light passes through the base material layer 16 and the hard coat layer 22, and enters the indoor side. Here, since the outside light L261 is deflected upwardly as compared with the entrance light, the light is applied to the back of the space in the indoor side.

As described above, with the daylighting panel 130, it is possible to deflect the light entering in a direction from obliquely above to down, upwardly with respect to the angle at which the light has entered, and to take the light into the room. Thus, for example, when it is undesirable to apply direct sunlight to a floor surface or a lower portion of the space, it is possible to take the light into the back of the space without reducing the amount of light.

On the other hand, when the outdoor side is seen from the indoor side, an observer's line of sight corresponds to light L262. In other words, it is possible to observe the outdoor side through the second surface 138b and the first surface 138a of the light transmission portion 138 that are surfaces parallel to the panel 11. Since in this part, a high degree of refraction is not performed in the interface, it is possible to clearly see scenery on the outdoor side.

Figure 30:
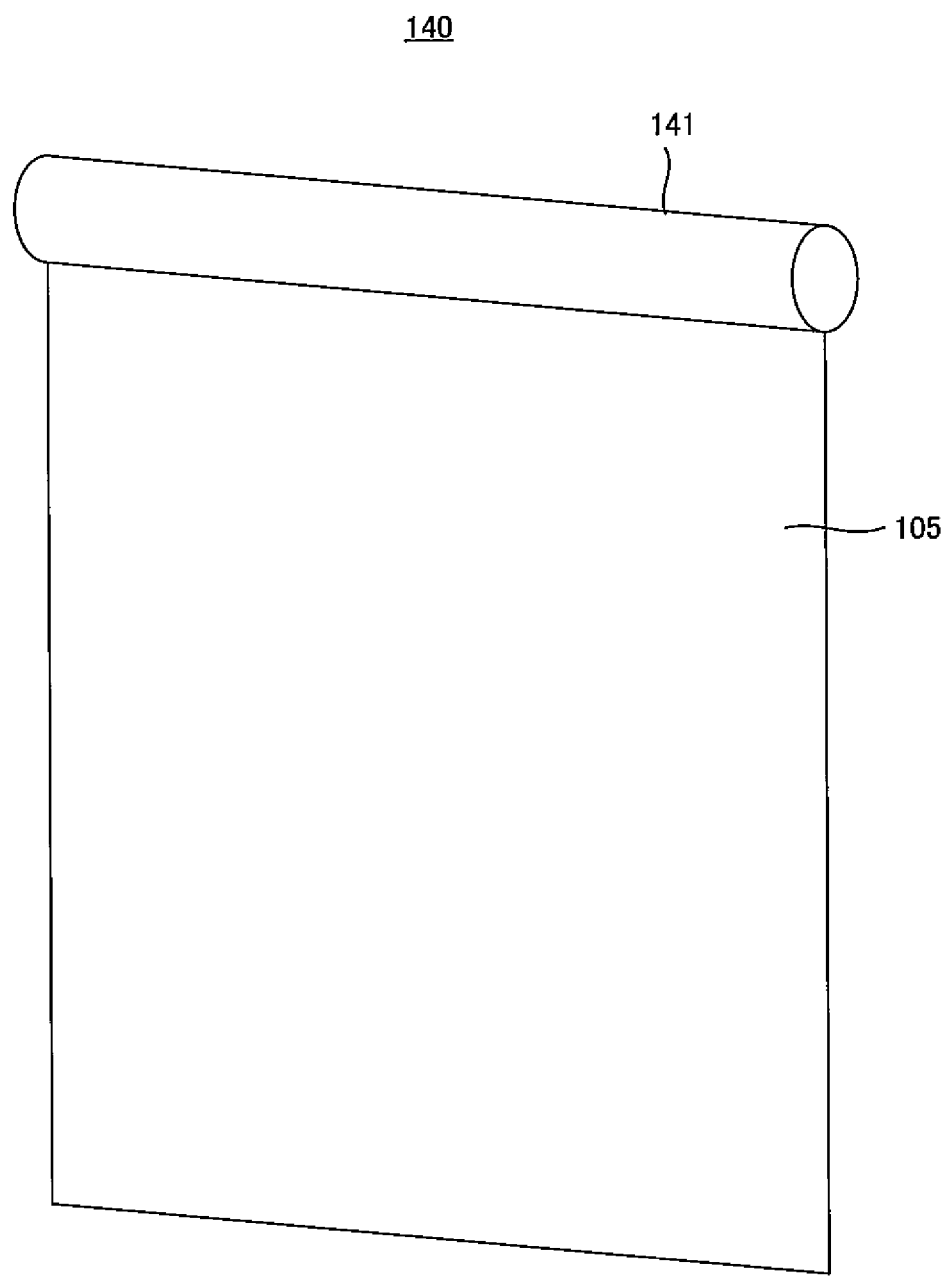
FIG. 30 A perspective view of a roll-up daylighting screen 140.

FIG. 30 is a diagram illustrating the thirteenth embodiment, and is a perspective view of a roll-up daylighting screen 140 to which the daylighting sheet 105 is applied. As described above, the upper end of the daylighting sheet 105 is attached to a shaft member 141, and the daylighting sheet 105 is configured such that the daylighting sheet 105 can be wound and unwound around the shaft, with the result that the roll-up daylighting screen 140 is formed.

The roll-up daylighting screen 140 described above is installed in, for example, the front surface of the window of a building on the indoor side, and controls light entering the room through the window.

As described above, as with the roll-up daylighting screen 90 described above, the roll-up daylighting screen 140 can be configured such that the daylighting sheet 105, 115, 125 or 135 can be wound and unwound.

In each of the embodiments described above, the example where the light transmission portion and the light deflection portion have the predetermined cross section to extend in the horizontal direction, and a plurality of light transmission portions and light deflection portions are aligned in the vertical direction has been described. However, the present invention is not limited to this configuration, and, for example, the light transmission portion and the light deflection portion can have a predetermined cross section to extend in the vertical direction, and a plurality of light transmission portions and light deflection portions can be aligned in the horizontal direction. In this way, it is possible to perform daylighting while reducing direct light from the east side and the west side to a south facing window in the morning and the evening.

LIST OF REFERENCE SYMBOLS

1 window
2 frame
10, 30, 40, 50 daylighting panel
11 panel
12 adhesive layer
15, 35, 45, 55, 105, 125 daylighting sheet
16 base material layer
17, 37, 47, 57, 67, 77, 87, 107, 117, 127, 137, 157 light deflection layer
18, 58, 68, 78, 88, 108, 118, 128, 138, 158 light transmission portion
19, 39, 59, 69, 79, 89, 109, 119, 129, 139, 159 light deflection portion
20 adhesive layer
21 protective layer
22 hard coat layer
90, 140 roll-up daylighting screen

What is claimed is:

1. A daylighting sheet that is arranged in an opening portion of a building and transmits light from an outdoor side to an indoor side,
   wherein the daylighting sheet is formed by stacking a plurality of layers, the layers include:
   a translucent base material layer; and
   a light deflection layer that is formed on the base material layer, and the light deflection layer includes:
   light transmission portions that are aligned along one surface of the base material layer so as to be able to transmit light, each of the light transmission portions including a groove shallower than the light transmission portion and a light deflection portion at a portion being in a light entering side in a position where the light transmission portion is arranged in the opening portion of a building;
   the light deflection portions that are formed between the light transmission portions and filled with a material whose refractive index is lower than that of the light transmission portions; and
   the light deflection portions and the groove are alternatingly aligned on the one surface of the base material layer.

2. The daylighting sheet of claim 1, wherein the light deflection portions are filled with air.

3. The daylighting sheet of claim 1, wherein the light deflection portions are filled with a transparent resin.

4. The daylighting sheet of claim 1,
   wherein at least one of other translucent layers is arranged on a side of the light deflection layer opposite to the base material layer.

5. The daylighting sheet of claim 1,
   wherein the light transmission portions have a predetermined cross section and extend along the one surface of the base material layer, and are aligned in a direction different from the direction in which the light transmission portions extend, and
   the light deflection portions are arranged between the adjacent light transmission portions such that the light deflection portions extend in the same direction as the light transmission portions and are aligned in the direction different from the direction in which the light transmission portions extend.

6. A daylighting panel comprising:
a translucent plate-shaped panel; and
the daylighting sheet of claim 1 that is attached to one surface of the panel.

7. The daylighting panel of claim 6, wherein the panel is a window glass that is provided in the opening portion of the building.

8. A roll-up daylighting screen comprising:
the daylighting sheet of claim 1; and
a shaft member that is arranged in the daylighting sheet such that the daylighting sheet can be wound and unwound.

* * * * *